United States Patent
Lee et al.

(10) Patent No.: US 12,424,733 B2
(45) Date of Patent: Sep. 23, 2025

(54) ANTENNA AND ELECTRONIC DEVICE INCLUDING SAME

(71) Applicant: Samsung Electronics Co., Ltd., Suwon-si (KR)

(72) Inventors: Kookjoo Lee, Suwon-si (KR); Sumin Yun, Suwon-si (KR); Chaejun Lee, Suwon-si (KR); Jinwoo Jung, Suwon-si (KR); Jaebong Chun, Suwon-si (KR); Hochul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 18/171,897

(22) Filed: Feb. 21, 2023

(65) Prior Publication Data

US 2023/0198131 A1 Jun. 22, 2023

Related U.S. Application Data

(63) Continuation of application No. PCT/KR2021/010538, filed on Aug. 10, 2021.

(30) Foreign Application Priority Data

Aug. 25, 2020 (KR) .......................... 10-2020-0107192

(51) Int. Cl.
*H01Q 1/24* (2006.01)
*G06F 1/16* (2006.01)
(Continued)

(52) U.S. Cl.
CPC ........... *H01Q 1/243* (2013.01); *G06F 1/1616* (2013.01); *G06F 1/1652* (2013.01);
(Continued)

(58) Field of Classification Search
CPC ............ H01Q 1/243; H01Q 1/38; H01Q 3/30; H01Q 3/2605; H01Q 21/08; G06F 1/1616;
(Continued)

(56) References Cited

U.S. PATENT DOCUMENTS 4,090,203 A * 5/1978 Duncan .................. H01Q 21/22
343/753
7,453,405 B2 * 11/2008 Nishikido ............ H01Q 9/0407
343/702

(Continued)

FOREIGN PATENT DOCUMENTS

CN 108810204 A 11/2018
CN 109216868 A 1/2019
(Continued)

OTHER PUBLICATIONS

International Search Report dated Nov. 18, 2021, issued in International Patent Application No. PCT/KR2021/010538.
(Continued)

*Primary Examiner* — Dameon E Levi
*Assistant Examiner* — Jordan E. DeWitt
(74) *Attorney, Agent, or Firm* — Jefferson IP Law, LLP

(57) ABSTRACT

An electronic device is provided. The electronic device includes a flexible display comprising a display panel which includes a first portion, a second portion, and a third portion, and is disposed to be at least partially visible in a folded state, an array antenna which is formed on a dielectric sheet disposed on the display panel and includes a first mesh pattern portion disposed at a position corresponding to the first portion, a second mesh pattern portion disposed at a position corresponding to the third portion, and at least one third mesh pattern portion formed at a position spaced apart from the first mesh pattern portion, at a position corresponding to the first portion, a wireless communication circuit
(Continued)

configured to transmit and/or receive a wireless signal through the array antenna, and a phase shifting means disposed in an electrical path between the wireless communication circuit and the array antenna.

17 Claims, 50 Drawing Sheets

(51) Int. Cl.
 *H01Q 1/38* (2006.01)
 *H01Q 3/30* (2006.01)
(52) U.S. Cl.
 CPC ............ *G06F 1/1681* (2013.01); *H01Q 1/38* (2013.01); *H01Q 3/30* (2013.01)
(58) Field of Classification Search
 CPC .... G06F 1/1652; G06F 1/1681; H04M 1/026; H04M 1/0268; H04M 1/0214
 See application file for complete search history.

(56) References Cited

U.S. PATENT DOCUMENTS

| | | | | |
|---|---|---|---|---|
| 10,394,287 | B1* | 8/2019 | Ting | G06F 1/1662 |
| 11,070,279 | B2* | 7/2021 | Raghavan | H04B 7/0417 |
| 11,133,574 | B2* | 9/2021 | Mizunuma | H01Q 25/00 |
| 2004/0183732 | A1* | 9/2004 | Konishi | G06F 1/1698 |
| | | | | 343/702 |
| 2005/0012665 | A1* | 1/2005 | Runyon | H01Q 3/40 |
| | | | | 455/562.1 |
| 2009/0061789 | A1* | 3/2009 | Howard | H04B 7/0837 |
| | | | | 455/73 |
| 2010/0222111 | A1* | 9/2010 | Suetake | H01Q 1/243 |
| | | | | 455/566 |
| 2013/0063321 | A1* | 3/2013 | Ruvinsky | H01Q 5/371 |
| | | | | 343/771 |
| 2015/0380817 | A1* | 12/2015 | Wu | H04Q 3/42 |
| | | | | 342/371 |
| 2016/0093939 | A1 | 3/2016 | Kim et al. | |
| 2017/0110786 | A1 | 4/2017 | Liu | |
| 2018/0159246 | A1* | 6/2018 | Raphaeli | H01Q 21/061 |
| 2018/0210499 | A1* | 7/2018 | Tsubaki | G06F 1/1616 |
| 2018/0375218 | A1* | 12/2018 | Kamo | H01Q 13/0283 |
| 2019/0006736 | A1* | 1/2019 | Hsu | G06F 1/1698 |
| 2019/0036215 | A1* | 1/2019 | Shahmohammadian | |
| | | | | H01Q 3/40 |
| 2019/0058264 | A1 | 2/2019 | Jung et al. | |
| 2019/0103656 | A1* | 4/2019 | Shi | H01Q 1/521 |
| 2019/0109387 | A1* | 4/2019 | Samadi Taheri | H01Q 9/42 |
| 2019/0252755 | A1* | 8/2019 | Shamsinejad | H01P 5/19 |
| 2019/0273315 | A1* | 9/2019 | Hu | H01Q 21/0006 |
| 2020/0021015 | A1 | 1/2020 | Yun et al. | |
| 2020/0076062 | A1 | 3/2020 | Lee et al. | |
| 2020/0161753 | A1* | 5/2020 | Pan | H01Q 21/28 |
| 2020/0259245 | A1 | 8/2020 | Kim et al. | |
| 2021/0066790 | A1* | 3/2021 | Park | H01Q 1/405 |
| 2021/0104582 | A1 | 4/2021 | Kim et al. | |
| 2021/0181806 | A1 | 6/2021 | Hung et al. | |
| 2022/0083172 | A1* | 3/2022 | Kim | G06F 3/0443 |
| 2024/0030586 | A1* | 1/2024 | Lai | H01Q 1/2266 |
| 2024/0266742 | A1* | 8/2024 | Jong | H01Q 1/38 |

FOREIGN PATENT DOCUMENTS

| | | | |
|---|---|---|---|
| CN | 109244674 A | 1/2019 | |
| CN | 110138938 A | 8/2019 | |
| EP | 3800523 A2 * | 4/2021 | ........... G06F 1/1652 |
| JP | 4414245 B2 | 11/2009 | |
| JP | 2010-087637 A | 4/2010 | |
| KR | 10-0450969 B1 | 9/2004 | |
| KR | 10-2017-0089192 A | 8/2017 | |
| KR | 10-2019-0019802 A | 2/2019 | |
| KR | 10-1962820 B1 | 3/2019 | |
| KR | 10-2020-0007377 A | 1/2020 | |
| KR | 10-2020-0027734 A | 3/2020 | |
| WO | 2018/194558 A1 | 10/2018 | |

OTHER PUBLICATIONS

European Search Report dated Jan. 18, 2024, issued in European Application No. 21861938.5.
Korean Office Action dated Aug. 22, 2024, issued in Korean Application No. 10-2020-0107192.

* cited by examiner

ANTENNA AND ELECTRONIC DEVICE INCLUDING SAME

CROSS-REFERENCE TO RELATED APPLICATION(S)

This application is a continuation application, claiming priority under § 365(c), of an International application No. PCT/KR2021/010538, filed on Aug. 10, 2021, which is based on and claims the benefit of a Korean patent application number 10-2020-0107192, filed on Aug. 25, 2020, in the Korean Intellectual Property Office, the disclosure of each of which is incorporated by reference herein in its entirety.

BACKGROUND

1. Field

The disclosure relates to an antenna and an electronic device including the same.

2. Description of Related Art

With the development of wireless communication technology, electronic devices (e.g., electronic devices for communication) are commonly used in daily life, and consequently, the use of contents is increasing. Due to the rapid increase of use of contents, network capacity is gradually increasing. After the commercialization of 4th generation (4G) communication systems, in order to meet the increasing demand for wireless data traffic, communication systems (e.g., a 5th generation (5G) communication system, a pre-5G communication system, or a new radio (NR)) that transmit and/or receive signals using a frequency of a high-frequency (e.g., the millimeter wave (mmWave)) band (e.g., a band in the range of 3 gigahertz (GHz) to 300 GHz)) are being researched.

The electronic devices are being transformed into various shapes, departing from a uniform rectangular shape. An electronic device may include a deformable display that is convenient to carry and capable of using a large screen.

The above information is presented as background information only to assist with an understanding of the disclosure. No determination has been made, and no assertion is made, as to whether any of the above might be applicable as prior art with regard to the disclosure.

SUMMARY

An electronic device may include an antenna (e.g., an array antenna) capable of transmitting and/or receiving a signal by using a frequency substantially ranging from about 3 GHz to about 300 GHz. Antennas are being developed in an efficient mounting structure for overcoming high free space loss in terms of high-frequency characteristics and increasing gain, and in various forms corresponding thereto. An antenna may be restricted in a radiation direction due to a conductor (e.g., a conductive frame or a bezel) included in an electronic device. For example, the radiation performance of an antenna may be degraded due to a conductor (e.g., a conductive frame or a bezel) included in an electronic device. In addition, when a display including a conductive layer occupies most of the front surface of the electronic device, an antenna disposed in the inner space of the electronic device may have difficulty in forward radiation. An antenna may be disposed between a display panel and a front surface cover (e.g., a window layer or a front surface plate) for radiation to the front side the display of the electronic device faces. In this case, in order to implement predetermined radiation performance while securing visibility of the display, the antenna may have a mesh structure configured with a plurality of conductive lines on a dielectric sheet. A plurality of antennas spaced apart from each other each including a mesh pattern portion may be configured as array antennas.

Electronic devices may be configured to be structurally changeable in various ways so as to enhance portability and use a large screen display when in use. Such electronic devices may include, for example, a foldable electronic device configured to use a display via two or more housings through folding and unfolding operations of the housings relative to each other, a slidable electronic device configured such that the display is expandable via a slide body that is slid in or out of a housing, and/or a rollable electronic device configured such that a display is selectively rolled into at least one housing.

However, when an array antenna in which a beam pattern is formed toward the front side through a display is applied to an electronic device having a structure capable of performing the above-described state change, predetermined radiation characteristics may not be maintained depending on the transformed state of the display.

Aspects of the disclosure are to address at least the above-mentioned problems and/or disadvantages and to provide at least the advantages described below. Accordingly, an aspect of the disclosure is to provide an antenna capable of always maintaining excellent radiation performance regardless of state change of a display, and an electronic device including the antenna.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing foldably connected to the first housing via a first hinge module, a flexible display disposed to be supported by the first housing and the second housing, wherein the flexible display includes a display panel including a first portion corresponding to the first housing, a second portion corresponding to the second housing, a third portion extending from the first portion to the second portion and corresponding to the first hinge module, and a display panel disposed to be at least partially visible in a folded state, an array antenna provided on a dielectric sheet disposed on the display panel, wherein the array antenna includes a first mesh pattern portion disposed at a position corresponding to the first portion, a second mesh pattern portion disposed at a position corresponding to the third portion, and at least one third mesh pattern portion provided at a position spaced apart by a first separation distance from the first mesh pattern portion disposed at the position corresponding to the first portion, a wireless communication circuit configured to transmit and/or receive a wireless signal via the array antenna, and a phase conversion mechanism disposed in an electrical path between the wireless communication circuit and the array antenna.

In accordance with another aspect of the disclosure, an electronic device is provided. The electronic device includes at least one housing, a flexible display disposed to be at least partially visible from the outside through the at least one housing, wherein the flexible display includes a display panel including a first portion, and a second portion extending from the first portion and configured to be transformable when the at least one housing is changed from a first state to a second state, and the display panel is disposed such that the first portion and the second portion is visible from the outside in the first state, a dielectric sheet disposed on the display panel, an antenna array provided on the dielectric sheet, wherein the antenna array includes a first mesh pattern portion disposed at a position corresponding to the first portion, a second mesh pattern portion disposed at a position corresponding to the second portion, and at least one third mesh pattern portion provided at a position spaced apart by a first separation distance from the first mesh pattern portion disposed at the position corresponding to the first portion, a wireless communication circuit configured to transmit and/ or receive a wireless signal via the array antenna, and a phase conversion mechanism disposed in an electrical path between the wireless communication circuit and the array antenna.

According to various embodiments of the disclosure, even when disposed in a display that is transformed depending on a change in the state of an electronic device, an array antenna is capable of maintaining a predetermined radiation performance, and capable of helping secure beam coverage by inducing a radiation direction of a beam pattern to a predetermined direction depending on the change in the state of the electronic device. According to various embodiments of the disclosure, when applied to an electronic device having a structure capable of perform a stage change, an array antenna, which forms a beam pattern to the front side through a display, is capable of maintaining a predetermined radiation characteristic depending on a transformed state of the display.

In addition, various effects directly or indirectly identified through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
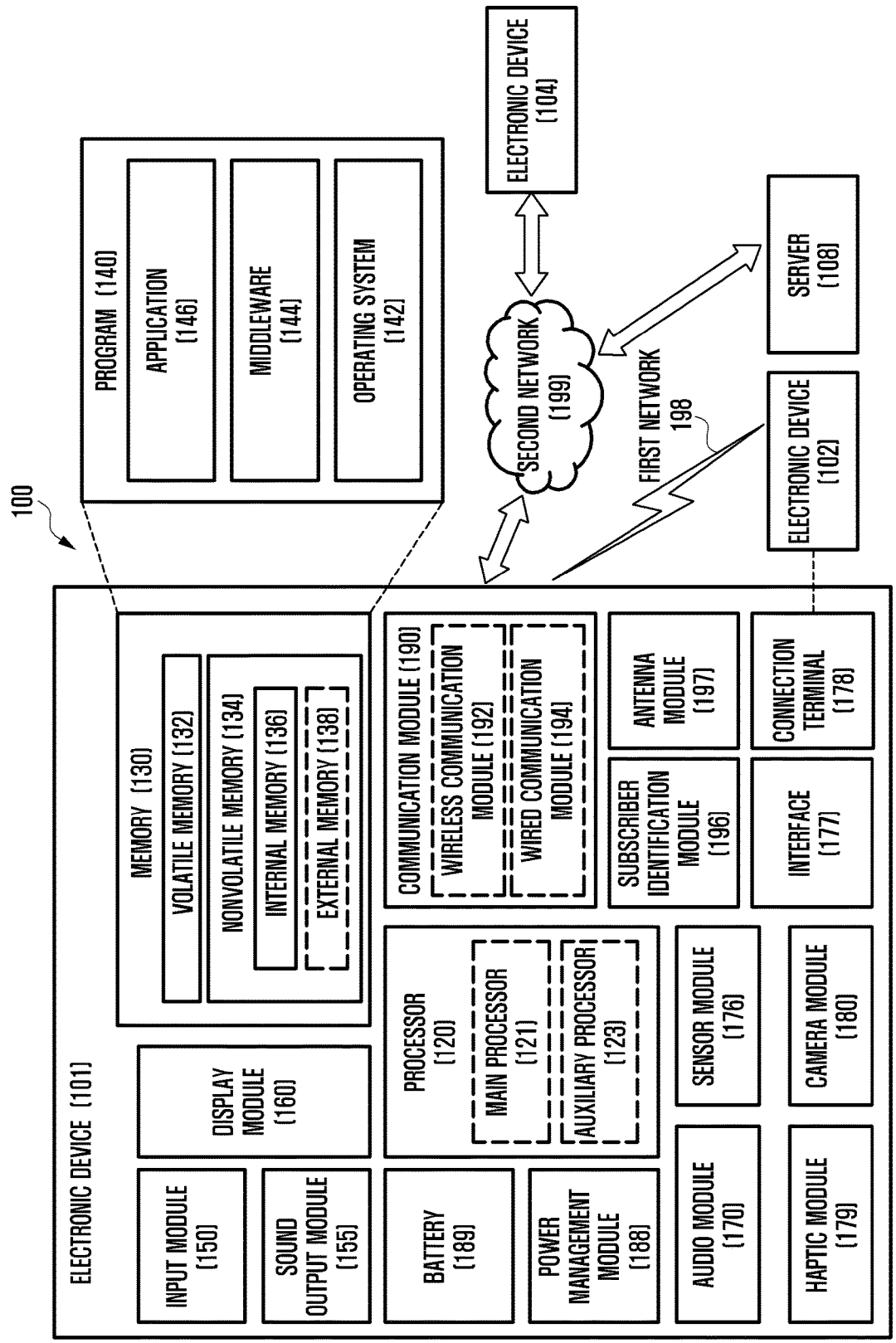
FIG. 1 is a block diagram of an electronic device in a network environment according to an embodiment of the disclosure.

FIG. 1 is a block diagram illustrating an example electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an audio output module 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. the non-volatile memory 134 may include internal memory 136 and external memory 138.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record, and the receiver may be used for incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture an image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
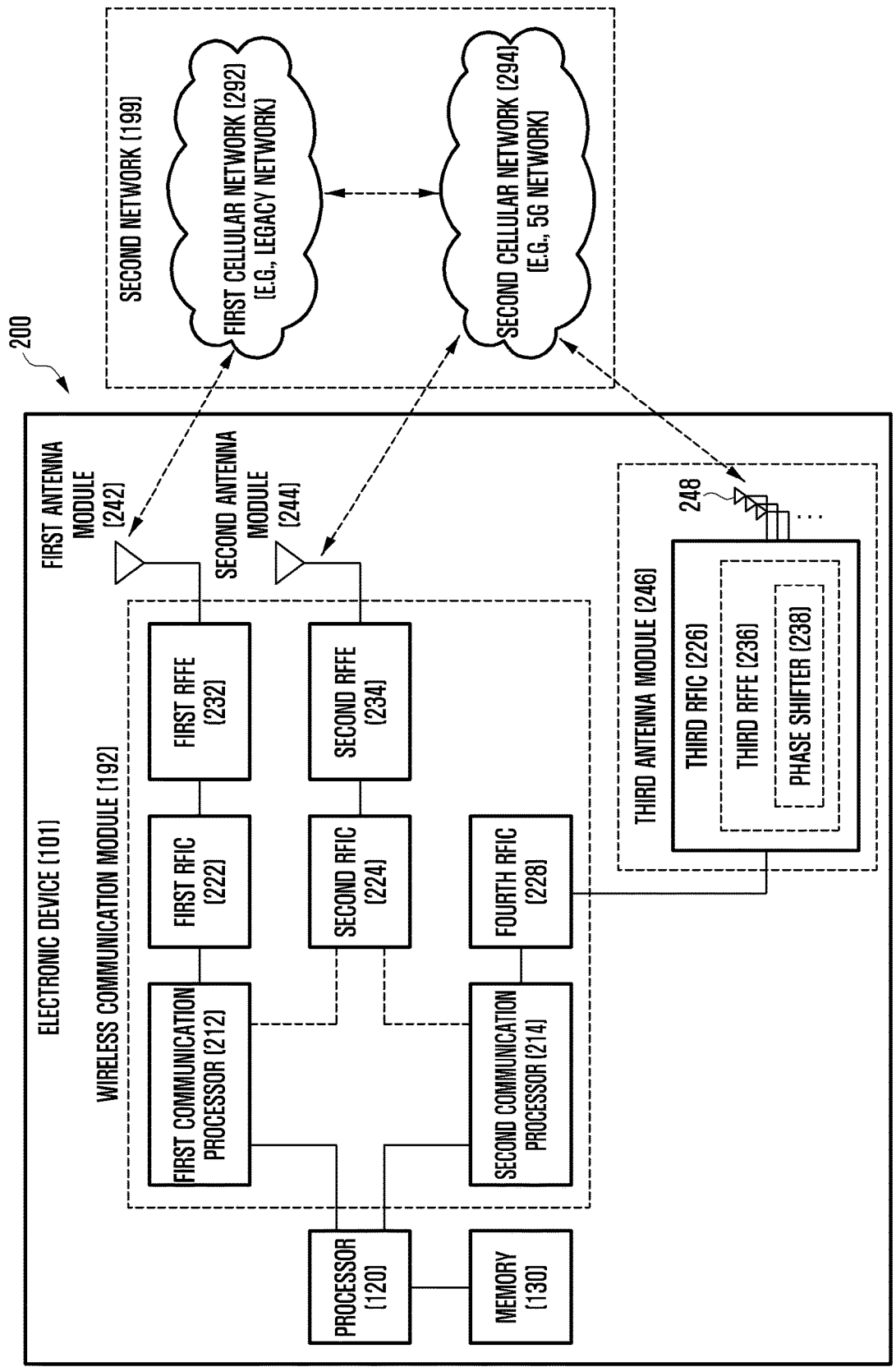
FIG. 2 is a block diagram of an electronic device configured to support a legacy network communication and a 5G network communication, according to an embodiment of the disclosure.

FIG. 2 is a block diagram illustrating an example configuration of an electronic device in a network environment including a plurality of cellular networks according to an embodiment of the disclosure.

Referring to FIG. 2, the electronic device 101 a network environment 200 may include a first communication processor (e.g., including processing circuitry) 212, second communication processor (e.g., including processing circuitry) 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to an embodiment, the electronic device 101 may further include at least one of the components described with reference to FIG. 1, and the second network 199 may further include at least one other network. According to an embodiment, the first communication processor 212, second communication processor 214, first RFIC 222, second RFIC 224, fourth RFIC 228, first RFFE 232, and second RFFE 234 may form at least part of the wireless communication module 192. According to an embodiment, the fourth RFIC 228 may be omitted or included as part of the third RFIC 226.

The first communication processor 212 may include various processing circuitry and establish a communication channel of a band to be used for wireless communication with the first cellular network 292 and support legacy network communication through the established communication channel. According to various embodiments, the first cellular network may be a legacy network including a second generation (2G), third generation (3G), 4G, or long term evolution (LTE) network. The second communication processor 214 may include various processing circuitry and establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in third generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 megahertz (MHz) to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to an embodiment, the first RFIC 222 and the second RFIC 224 may be implemented into at least part of a single package or a single chip. According to an embodiment, the first RFFE 232 and the second RFFE 234 may be implemented into at least part of a single package or a single chip. According to an embodiment, at least one of the first antenna module 242 or the second antenna module 244 may be omitted or may be combined with another antenna module to process RF signals of a corresponding plurality of bands.

According to an embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
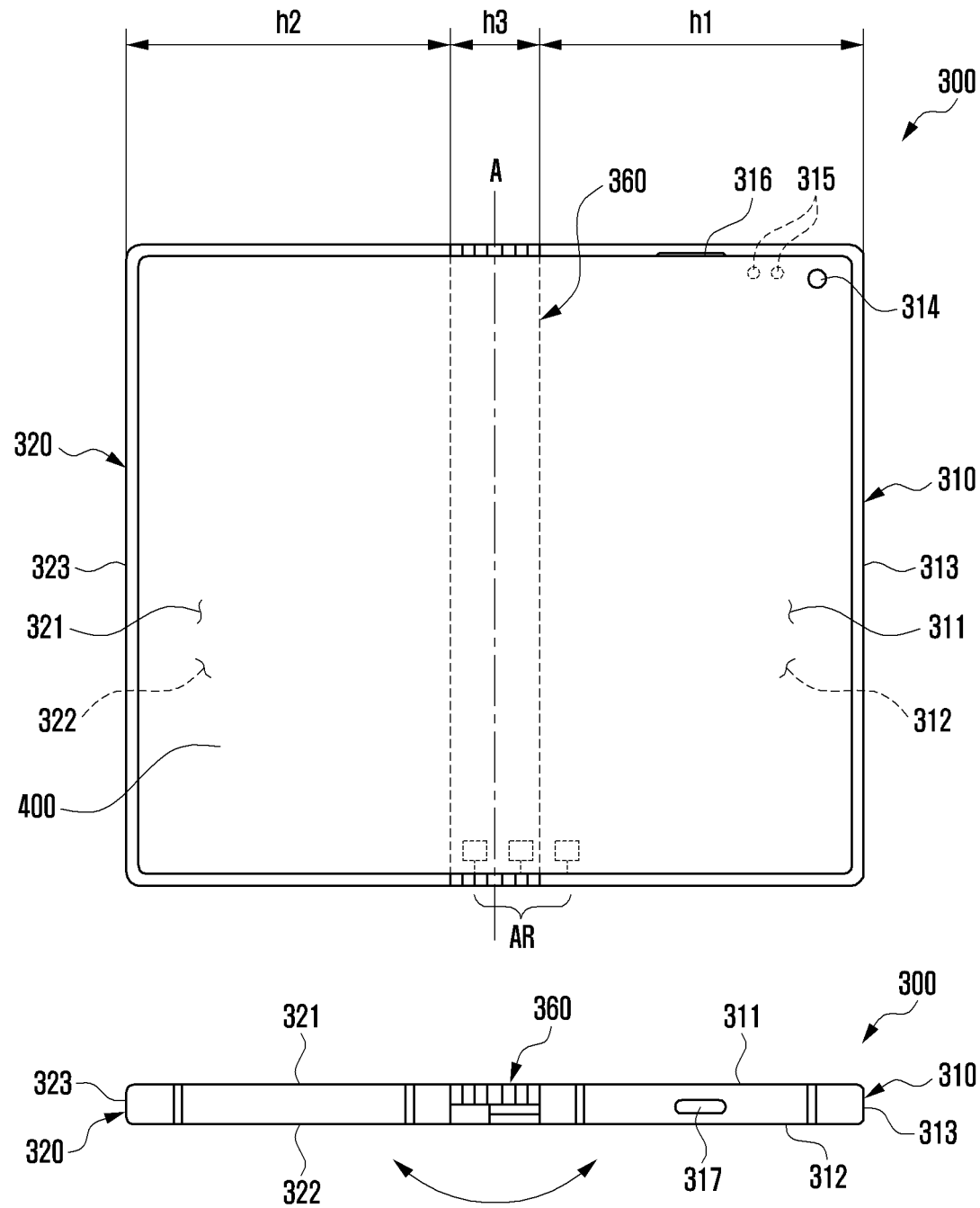
FIG. 3A is a view illustrating a foldable electronic device in an unfolded state according to an embodiment of the disclosure.
Figure 3B:
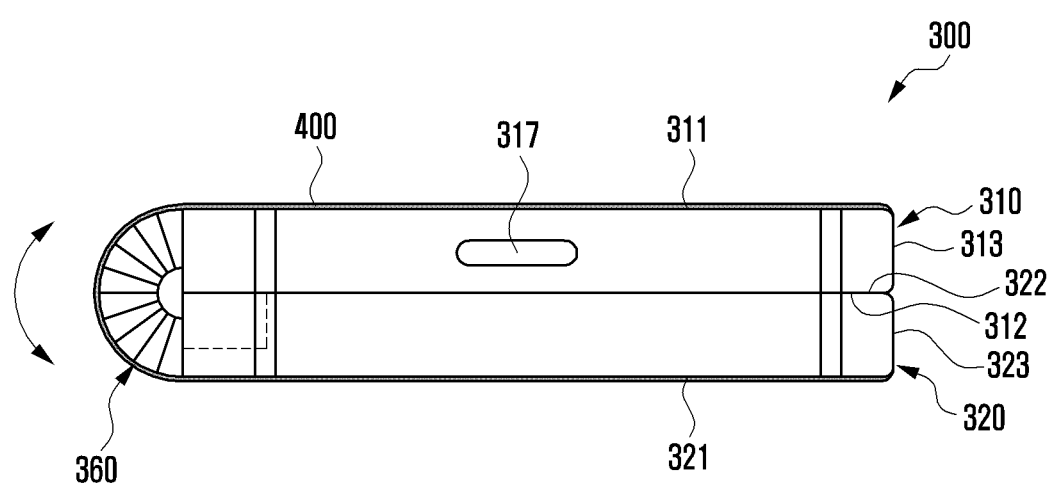
FIG. 3B is a view illustrating the foldable electronic device in a folded state according to an embodiment of the disclosure.

FIG. 3A is a view illustrating a foldable electronic device 300 in an unfolded state according to an embodiment of the disclosure. FIG. 3B is a view illustrating the foldable electronic device 300 in a folded state according to an embodiment of the disclosure.

The electronic device 300 of FIGS. 3A and 3B may be at least partially similar to the electronic device 101 of FIG. 1 or may include other embodiments of the electronic device.

Referring to FIG. 3A, the electronic device 300 may include a pair of housings 310 and 320 (e.g., a foldable housing or a housing structure) coupled to each other to be rotatable relative to each other about a rotation axis A via a hinge module 360 (e.g., a hinge structure or a hinge device), and a flexible display 400 (e.g., a foldable display) disposed in a space defined by the pair of housings 310 and 320. The first housing 310 and/or the second housing 320 may be at least partially made of a metal material or a non-metal material having rigidity of a level selected in order to support the flexible display 400. When made of a metal material, the first housing 310 and/or the second housing 320 may include at least partially electrically split unit conductive members and may be electrically connected to a wireless communication circuit (e.g., the wireless communication module 192 in FIG. 1) of the electronic device, thereby serving as an antenna operating in a predetermined frequency band.

The pair of housings 310 and 320 may operate in an out-folding type via the hinge module 360 such that the flexible display 400 is visible from the outside. The hinge module 360 may include a rail-type hinge module configured to be bendable and at least partially slidable in order to support the out-folding type.

In the unfolded state of the electronic device 300, the first housing 310 may include a first surface 311 connected to the hinge module 360 and arranged to face the front side of the electronic device 300, a second surface 312 facing away from the first surface 311, and a first side surface member 313 surrounding at least a portion of the space between the first surface 311 and the second surface 312. In the unfolded state of the electronic device 300, the second housing 320 may include a third surface 321 connected to the hinge module 360 and arranged to face the front side of the electronic device 300, a fourth surface 322 facing away from the third surface 321, and a second side surface member 323 surrounding at least a portion of the space between the third surface 321 and the fourth surface 322.

The first surface 311 and the third surface 321 may include at least one support plate provided as portions of the first housing 310 and the second housing 320 or structurally coupled to the first and second housings to support the flexible display 400. The second surface 312 and the fourth surface 322 may include a rear surface cover provided as portions of the first housing 310 and the second housing 320 or structurally coupled to the first and second housings. The rear surface cover may be made of, for example, coated or colored glass, ceramic, polymer, metal (e.g., aluminum, stainless steel (STS), or magnesium), or a combination of at least two of these materials.

The electronic device 300 may include a recess (not illustrated) provided on the side of the first surface 311 of the first housing 310 and the third surface 321 of the second housing 320. The flexible display 400 may be disposed in the recess (not illustrated) to form at least portions of the first surface 311 and the third surface 321. For example, the flexible display 400 may include a transparent window layer (e.g., the window layer 410 of FIG. 4, or a glass plate or a polymer plate including various coating layers).

The electronic device 300 may include at least one electronic component disposed under at least a partial area of the flexible display 400 or exposed through an opening provided in at least a portion of the flexible display 400. An area in which the flexible display 400 and at least one camera module 314 correspond to each other may be configured as a transmission area having a predetermined transmittance as a portion of a content display area. The transmission area may have a transmittance ranging from about 5% to about 20%. The transmission area may include an area overlapping the effective area (e.g., a view angle area) of the least one camera module 314 through which light imaged by an image sensor to generate an image passes. For example, the transmission area of the flexible display 400 may include an area having a lower pixel density than the periphery. For example, the transmission area may replace the opening.

The at least one electronic component may include at least one camera module 314 exposed through the opening or the transmission area in the flexible display 400 and/or at least one sensor 315 disposed on the rear surface of the flexible display 400 and configured to detect an external environment. The at least one camera module 314 may include an under-display camera (UDC). The at least one sensor 315 may include at least one of a proximity sensor, an illuminance sensor, an iris recognition sensor, an ultrasonic sensor, a fingerprint recognition sensor, or an indicator.

According to an embodiment of the disclosure, the at least one electronic component may be disposed in the first housing 310. According to another embodiment, the at least one electronic component may be disposed in the second housing 320.

The electronic device 300 may include a receiver 316 or an interface connector port 317 disposed through at least a portion of the first housing 310. Although not illustrated, the electronic device 300 may also include an ear jack hole, an external speaker module, a SIM card tray, or at least one key button disposed through the first housing 310 and/or the second housing 320.

The flexible display 400 may include a first portion h1 (e.g., a first flat portion) located in the first housing 310, a second portion h2 (e.g., a second flat portion) located in the second housing 320, and a third portion h3 (e.g., a bendable portion) extending from the first portion h1 to the second portion h2 and located in the hinge module 360. The foldable electronic device 300 may include an array antenna AR configured to form a beam pattern in a direction in which the flexible display 400 is oriented in the unfolded state. The array antenna AR may include, as antenna elements, a plurality of mesh pattern portions (e.g., the first mesh pattern portion 510, the second mesh pattern portion 520, and/or the third mesh pattern portion 530 of FIG. 5) provided on a dielectric sheet (e.g., the dielectric sheet 500 of FIG. 5) disposed in the flexible display 400. A plurality of mesh pattern portions may be arranged at predetermined intervals. At least some of the plurality of mesh patterns (e.g., the first mesh pattern portion 510 in FIG. 5) may be arranged at a position corresponding to the first portion h1 in the dielectric sheet 500, and the remaining mesh pattern portions (e.g., the second mesh pattern portion 520 and the third mesh pattern portion 530 in FIG. 5) may be arranged at a position corresponding to the third portion h3 in the dielectric sheet 500. When the foldable electronic device 300 is in the folded state, the flexible display 400 may be transformed such that at least some of the plurality of mesh pattern portions (e.g., the first mesh pattern portion 510 in FIG. 5) is oriented in a direction different from a direction in which the remaining mesh pattern portions (e.g., the second mesh pattern portion 520 and the third mesh pattern portion 530 of FIG. 5) are oriented.

Figure 5:
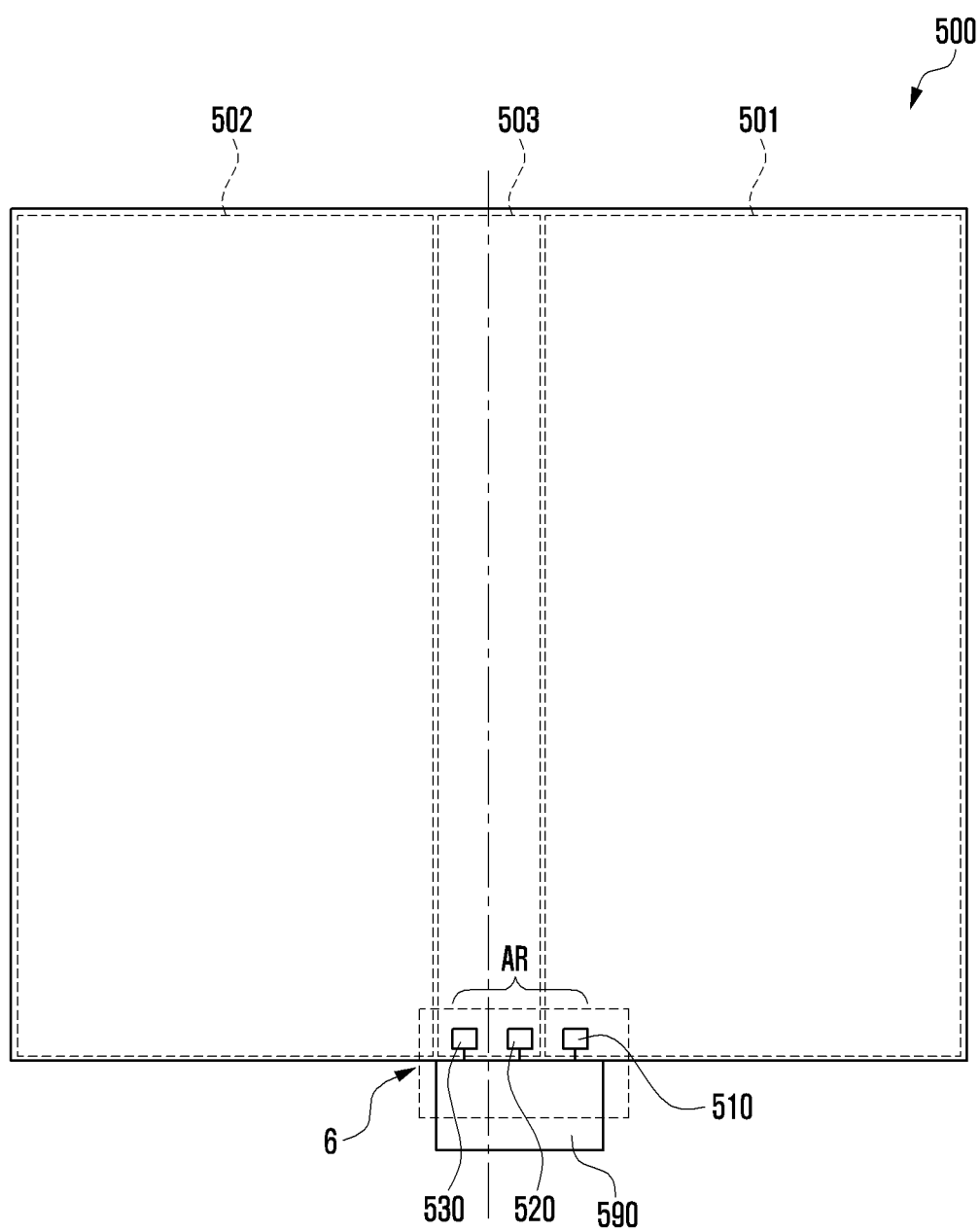
FIG. 5 is a view illustrating a configuration of a dielectric sheet according to an embodiment of the disclosure.

FIG. 3A, illustrates that one mesh pattern portion (e.g., the first mesh pattern portion 510 of FIG. 5) is arranged at a position corresponding to the first portion h1 in the dielectric sheet 500 and two mesh pattern portions (e.g., the second mesh pattern portion 520 and the third mesh pattern portion 530 in FIG. 5) are disposed at positions corresponding to the third portion h3 in the dielectric sheet 500. However, the disclosure is not limited thereto, and two mesh pattern portions (e.g., the first mesh pattern portion 510 and the second mesh pattern portion 520 in FIG. 5) may be disposed at positions in the dielectric sheet 500 and one mesh pattern portion (e.g., the third mesh pattern portion 530) disposed at a position corresponding to the third portion h3 in the dielectric sheet 500.

Antenna elements included in the array antenna AR are described only as mesh patterns, but antenna elements in the form of conductive plates (e.g., conductive patterns) may also be included.

In various embodiments of the disclosure, when the foldable electronic device 300 is in a folded state, the phases of one or more beam pattern portions may be corrected to induce beam patterns to be formed to a predetermined direction, which may help prevent degradation of radiation performance of the array antenna AR and secure beam coverage.

Figure 4:
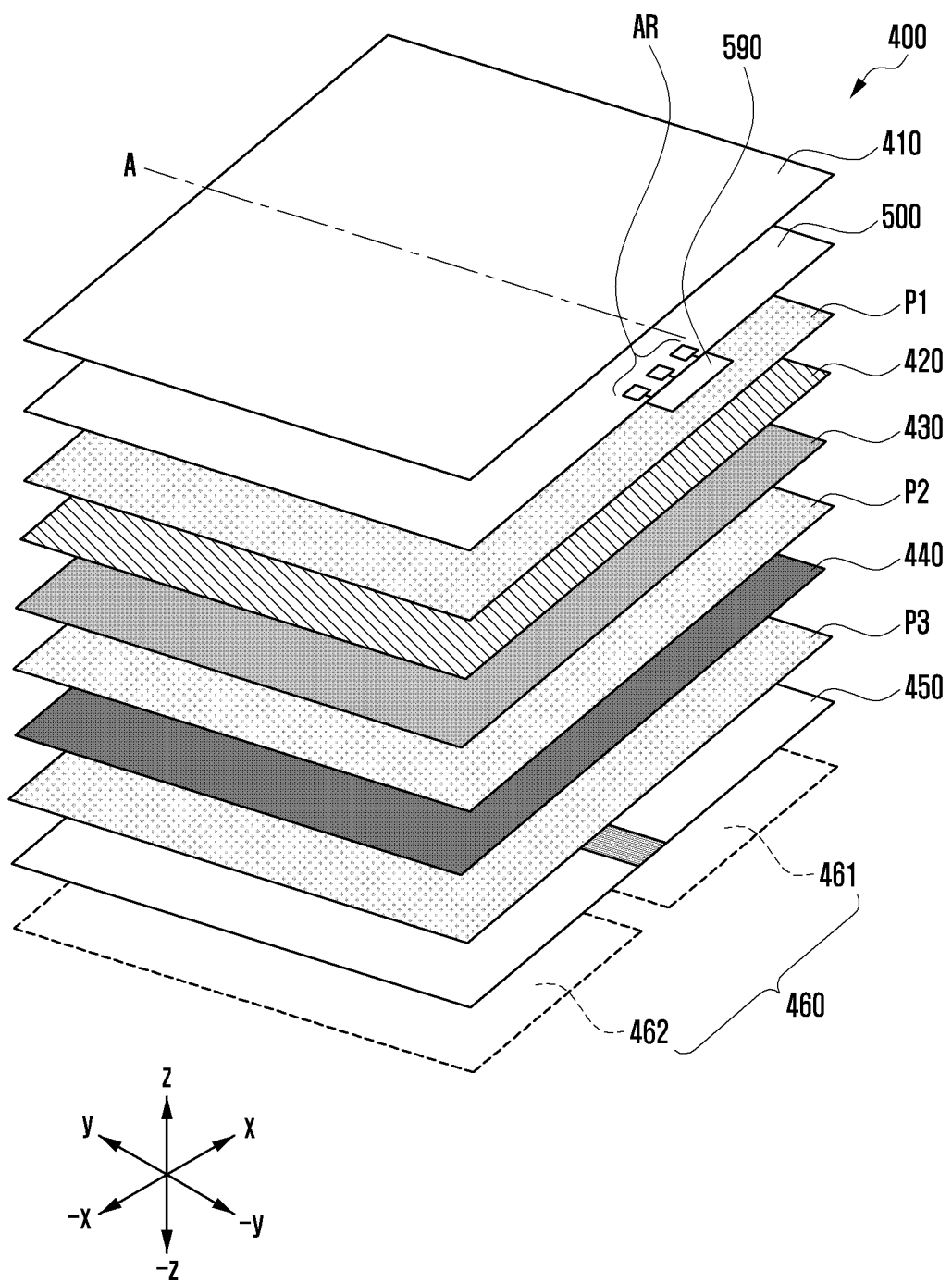
FIG. 4 is an exploded perspective view of a flexible display according to an embodiment of the disclosure.

FIG. 4 is an exploded perspective view of a flexible display 400 according to an embodiment of the disclosure.

Referring to FIG. 4, the flexible display 400 may include a window layer 410, a dielectric sheet 500, a polarizer (POL) 420 (e.g., a polarizing film), a display panel 430, a polymer member 440, and/or a metal sheet layer 450 which are disposed in a direction (e.g., the −z axis direction) in which the rear surface of the window layer 410 is oriented. The window layer 410 may include a polymer layer and a glass layer laminated with the polymer layer. The window layer 410 may include a polymer layer (e.g., polyethylene terephthalate (PET) and/or polyimide (PI)) and/or a glass layer (e.g., ultra-thin glass (UTG)), The flexible display 400 including the window layer 410, the dielectric sheet 500, the polarizer 420, the display panel 430, the polymer member 440, and/or the metal sheet layer 450 may configure a first surface (e.g., the first surface 311 of FIG. 3A) of a first housing (e.g., the first housing 310 of FIG. 3A) and a third surface (e.g., the third surface 321 of FIG. 3A) of a second housing (e.g., the second housing 320 of FIG. 3A). The window layer 410, the dielectric sheet 500, the polarizer 420, the display panel 430, the polymer member 440, and/or the metal sheet layer 450 may be bonded to each other via adhesives P1, P2, and P3. For example, the adhesives P1, P2, and P3 may include at least one of an optical clear adhesive (OCA), a pressure-sensitive adhesive (PSA), a heat-responsive adhesive, a general adhesive, and a double-sided tape. According to an embodiment of the disclosure, the flexible display 400 may include another adhesive member (e.g., a double-sided tape or a waterproof member) at least partially disposed on one surface of the conductive sheet layer 450. The flexible display 400 may be bonded to housings (e.g., the housings 310 and 320 of FIGS. 3A and 3B) of an electronic device (e.g., the electronic device 300 of FIGS. 3A and 3B) via another adhesive member.

A dark color (e.g., black) may be applied to the polymer member 440 to help display a background when the display is turned off. The polymer member 440 may act as a cushion that absorbs shock from the outside of a foldable electronic device (e.g., the foldable electronic device 300 of FIG. 3A) to prevent breakage of the flexible display 400.

The metal sheet layer 450 may be helpful for reinforcing the rigidity of the foldable electronic device, and may be used to block noise and to dissipate heat emitted from a heat emission component. According to an embodiment of the disclosure, the metal sheet layer 450 may include at least one of steel use stainless (SUS) (e.g., stainless steel (STS)), Cu, Al, or a metal CLAD (e.g., a layered member in which SUS and Al are alternately disposed). According to another embodiment, the metal sheet layer 450 may include other alloy materials. A first portion (e.g., the first portion h1 in FIG. 3A) corresponding to a first housing (e.g., the first housing 310 of FIG. 3A) of a foldable electronic device (e.g., the foldable electronic device 300 of FIG. 3A) and a second portion (e.g., the second portion h2 in FIG. 3A) corresponding to a second housing (e.g., the second housing 320 of FIG. 3A) may be connected to a third portion (e.g., the third part h3 in FIG. 3A) (e.g., a folding area) provided in a portion corresponding to a hinge module (e.g., the hinge module 360 of FIG. 3A), whereby the metal sheet layer 450 may be integrally configured.

The flexible display 400 may further include reinforcing plates 460 disposed under the metal sheet layer 450 in order to reinforce rigidity. For example, the reinforcing plates 460 may include a metal material. The reinforcing plates 460 may include a first reinforcing plate 461 corresponding to the first housing (e.g., the first housing 310 of FIG. 3A) or a second reinforcing plate 462 corresponding to the second housing (e.g., the second housing 320 of FIG. 3A).

The flexible display 400 may include at least one functional member (not illustrated) disposed between the polymer member 440 and the metal sheet layer 450. The functional member may include a graphite sheet for heat dissipation, a force touch flexible printed circuit board (FPCB), a fingerprint sensor FPCB, an antenna radiator for communication, a heat dissipation sheet, a conductive/non-conductive tape, and/or an open cell sponge. According to an embodiment of the disclosure, when the functional member is bendable, the functional member may be disposed from the first housing (e.g., the first housing 310 of FIG. 3A) to at least a portion of the second housing (e.g., the second housing 320 of FIG. 3A) across the hinge module (e.g., the hinge module 360 of FIG. 3A). According to another embodiment of the disclosure, when the functional member is not bendable, the first housing (e.g., the first housing 310 in FIG. 3A) and the second housing (e.g., the second housing 320 in FIG. 3A) may be individually arranged.

The flexible display 400 may further include a detection member (not illustrated) configured to detect an input by an electromagnetic induction-type writing member. The detection member may include a digitizer. The detection member may be disposed between at least one polymer member 440 and the functional member. The detection member may be disposed between the display panel 430 and at least one polymer member 440. The detection member may be disposed under the metal sheet layer 450, and the metal sheet layer 450 may have a structural shape (e.g., a plurality of openings) detectable by the detecting member. The detection member may be disposed between the metal sheet layer 450 and the reinforcing plate 460.

Figure 6:
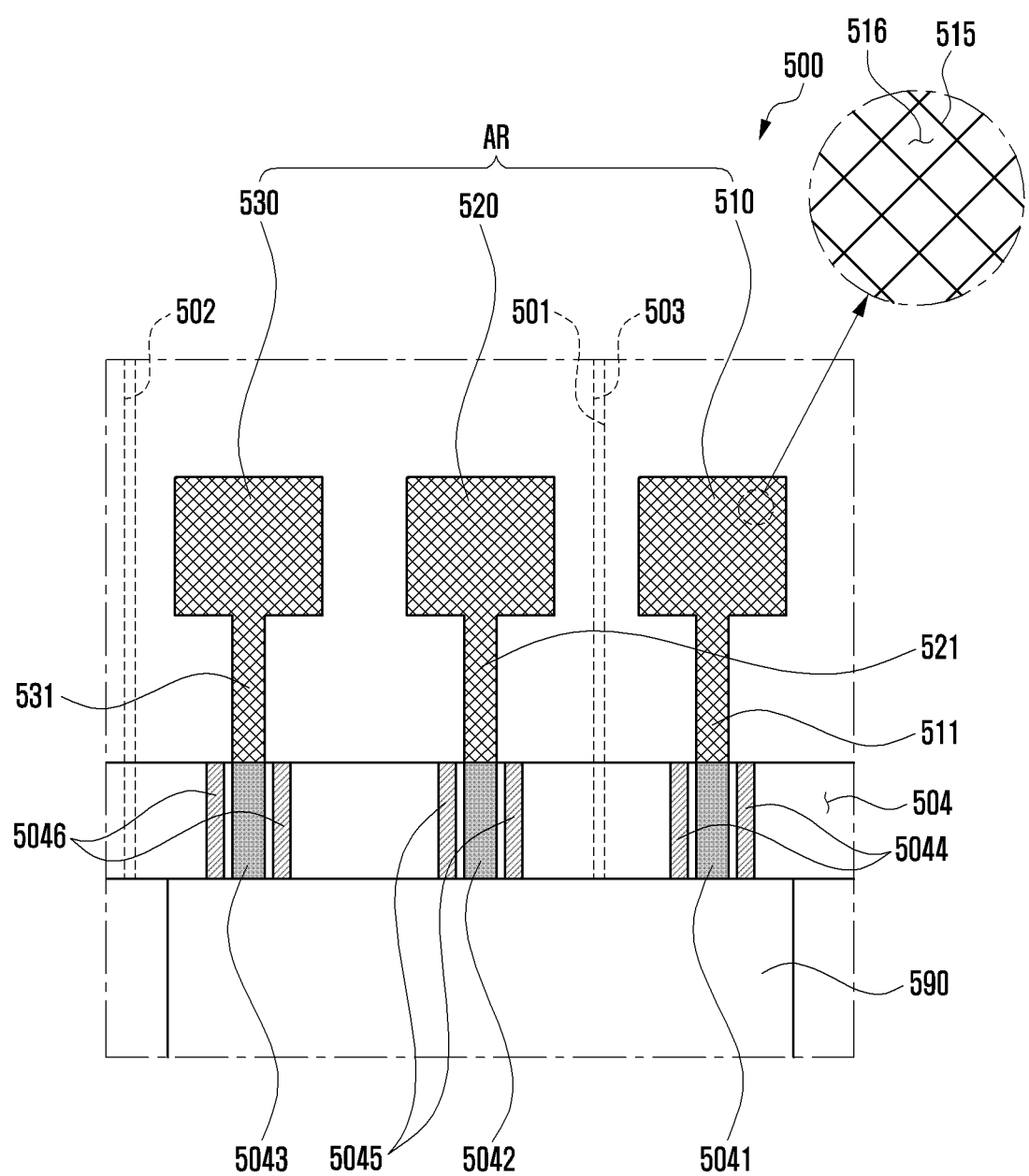
FIG. 6 is an enlarged view of area 6 of FIG. 5 according to an embodiment of the disclosure.

The dielectric sheet 500 may include an array antenna AR including a plurality of mesh pattern portions (e.g., the mesh pattern portions 510, 520, and 530 in FIG. 6) configured with a plurality of conductive lines (e.g., the conductive lines 515 of FIG. 6). A plurality of mesh pattern portions (e.g., the mesh pattern portions 510, 520, and 530 of FIG. 6) included in the dielectric sheet 500 may be electrically connected to a flexible printed circuit board (FPCB) 590 and electrically connected to a wireless communication circuit (e.g., the wireless communication module 192 of FIG. 1) of a foldable electronic device (e.g., the foldable electronic device 300 of FIG. 3A), thereby operating as an array antenna AR. The wireless communication circuit 192 may be configured to transmit and/or receive a wireless signal in a predetermined frequency band (e.g., about 3 GHz to about 300 GHz) via the array antenna AR. The array antenna AR may be disposed at a position that at least partially overlaps an active area (display area) of the display panel 430 when the flexible display 400 is viewed from above. For example, the active area may be an area where content is displayed or an area where pixels are arranged. In some embodiments, the array antenna AR may be disposed in an area that at least partially overlaps a non-active area (non-display area) of the display panel 430 when the flexible display 400 is viewed from above.

FIG. 5 is a view illustrating a configuration of a dielectric sheet 500 according to an embodiment of the disclosure.

FIG. 6 is an enlarged view of area 6 of FIG. 5 according to an embodiment of the disclosure.

Referring to FIGS. 5 and 6, the dielectric sheet 500 may be disposed between a window layer (e.g., the flexible window layer 410 of FIG. 4) of a flexible display (e.g., the flexible display 400 of FIG. 4) and a display panel (e.g., the display panel 430 of FIG. 4). The dielectric sheet 500 may be disposed between a window layer (e.g., the window layer 410 of FIG. 4) and a polarizer (e.g., the polarizer 420 of FIG. 4). The dielectric sheet 500 may be disposed at a position that substantially overlaps a display panel (e.g., the display panel 430 of FIG. 4) when the flexible display (e.g., the flexible display 400 of FIG. 4) is viewed from above. The dielectric sheet 500 may be made of a transparent polymer material. According to an embodiment of the disclosure, the dielectric sheet 500 may have a rectangular shape. According to another embodiment, the dielectric sheet 500 may have a shape corresponding to the display panel (e.g., the display panel 430 of FIG. 4).

The dielectric sheet 500 may include a first area 501 corresponding to a first portion (e.g., the first portion h1 in FIG. 3A) of the flexible display (e.g., the flexible display 400 of FIG. 4), a second area 502 corresponding to a second portion (e.g., the second portion h2 in FIG. 3A), and a third area 503 interconnecting the first area 501 and the second area 502 and corresponding to a third portion (e.g., the third part h3 of FIG. 3A). The third area 503 may be configured to be bendable depending on the folding state of the foldable electronic device (e.g., the foldable electronic device 300 of FIG. 3A), together with the third portion (e.g., the third portion h3 of FIG. 3A) of the flexible display (e.g., the flexible display 400 of FIG. 4).

The array antenna AR may be disposed to overlap at least a portion of the non-active area (non-display area) of the display panel (e.g., the display panel 430) when the flexible display (e.g., the flexible display 400 of FIG. 4) is viewed from above. The array antenna AR may be disposed to overlap at least a portion of the active area (display area) of the display panel (e.g., the display panel 430 of FIG. 4) when the flexible display (e.g., the flexible display 400 of FIG. 4) is viewed from above. The array antenna AR may be disposed at a position that includes the non-active area of the display panel (e.g., the display panel 430 of FIG. 4) and overlaps at least a portion of the active area when the flexible display (e.g., the flexible display 400 of FIG. 4) is viewed from above. The array antenna AR may include a first mesh pattern portion 510 disposed in the first area 501, and a second mesh pattern portion 520 and a third mesh pattern portion 530 disposed in the third area 503 to be spaced apart from the first mesh pattern portion 510. The array antenna AR may form a beam pattern in a first direction (e.g., direction ① in FIG. 7A) in which the flexible display (e.g., the flexible display 400 of FIG. 4) is oriented when the foldable electronic device (e.g., the foldable electronic device 300 of FIG. 3A) is in the unfolded state. The first mesh pattern portion 510, the second mesh pattern portion 520, and the third mesh pattern portion 530 may operate as a patch antenna, a monopole antenna, a dipole antenna, a parallel plate waveguide antenna, or a tapered slot antenna.

According to an embodiment of the disclosure, when the electronic device (e.g., the electronic device 300 of FIG. 3B) is in the folded state, the array antenna AR may correct the phase of the first mesh pattern portion 510 such that a beam pattern may be formed in a second direction (e.g., direction ② in FIG. 7B) in which the third region 503 is oriented. According to another embodiment, when the electronic device (e.g., the electronic device 300 of FIG. 3B) is in the folded state, the array antenna AR may correct the phases of the second mesh pattern portion 520 and the third mesh pattern portion 530 such that a beam pattern may be formed in a first direction (e.g., direction ① in FIG. 7B) in which the first area 501 is oriented. In the array antenna AR including the first mesh pattern portion 510, the second mesh pattern portion 520, and the third mesh pattern portion 530, in the case where the second mesh pattern portion 520 and the third mesh pattern portion 530 are oriented in the second direction (e.g., direction ② in FIG. 7B) and the first mesh pattern portion 510 is oriented in the first direction (e.g., direction ① in FIG. 7B) substantially perpendicular to the second direction (e.g., direction ② in FIG. 7B), the performance obtained by correcting the phases of the second mesh pattern portion 520 and the third mesh pattern portion 530 to form a beam pattern in the first direction (e.g., direction ① in FIG. 7B) may be superior to the performance by correcting the first mesh pattern portion 510 to form a beam pattern in the second direction (e.g., direction ② in FIG. 7B). The first mesh pattern portion 510, the second mesh pattern portion 520, and the third mesh pattern portion 530 may be integrally configured, and the illustrated mesh pattern portions 510, 520, and 530 may be those logically separated for making a description with reference to the drawing.

The plurality of mesh pattern portions 510, 520, and 530 of the array antenna AR may be configured with a plurality of conductive lines 515 arranged on the dielectric sheet 500. The plurality of mesh pattern portions 510, 520, and 530 may be provided by arranging a plurality of unit patterns 516 configured with a plurality of conductive lines 515. In FIG. 6, only one of a plurality of unit patterns 516 is indicated, but a configuration having substantially the same form as the indicated one may be included in the plurality of unit patterns 516. With the plurality of unit patterns 516, it is possible to secure visibility such that a display panel (e.g., the display panel 430 of FIG. 4) is visible from the outside. Such visibility may be determined via the shape of the plurality of unit patterns 516. A flexible printed circuit board (FPCB) 590 (e.g., a flexible substrate) may be attached at an edge of the dielectric sheet 500 near the array antenna AR to be electrically connected to the array antenna AR. The FPCB 590 may have a length to be capable of being electrically connected to a printed circuit board (not illustrated) of the electronic device (e.g., the electronic device 300 of FIG. 3A). According to an embodiment, the FPCB 590 may include a wireless communication circuit (e.g., the third RFIC 226 of FIG. 2). The wireless communication circuit may be mounted on a printed circuit board of the electronic device (e.g., the electronic device 300 of FIG. 3A) and may be electrically connected to the array antenna AR via the FPCB 590. The wireless communication circuit (e.g., the third RFIC 226 in FIG. 2) may be configured to transmit and/or receive a wireless signal in a frequency band ranging from about 3 GHz to about 300 GHz via the array antenna AR.

The array antenna AR may include a first mesh pattern portion 510 disposed in the first area 501 of the dielectric sheet 500, and a second mesh pattern portion 520 and a third mesh pattern portion 530 disposed in the third area 503 to be spaced apart from the first mesh pattern portion 510 by a predetermined distance. A first feed line 511 may extend from the first mesh pattern portion 510. A second feed line 521 may extend from the second mesh pattern portion 520. A third feed line 531 may extend from the third mesh pattern portion 530. The dielectric sheet 500 may include a first feed pad 5041 provided in an edge area 504 (e.g., a wiring area) around the array antenna AR and electrically connected to the first feed line 511, a second feed pad 5042 electrically connected to the second feed line 521, and/or a third feed pad 5043 electrically connected to the third feed line 531. The dielectric sheet 500 may help block noise from each of the feed pads 5041, 5042, and 5043 by including first conductive pads 5044 disposed on the left and right sides of the feed pad 5041, second conductive pads 5045 disposed on the left and right sides of the second feed pad 5042, and third conductive pads 5046 disposed on the left and right sides of the third feed pad 5043.

According to an embodiment of the disclosure, the FPCB 590 is bonded to an edge area 504 of the dielectric sheet 500 through soldering and/or conductive bonding, and may be electrically connected to the feed pads 5041, 5042, and 5043 and the conductive pads 5044, 5045, and 5046. According to another embodiment, the feed pads 5041, 5042, and 5043 may be electrically connected to a wireless communication circuit (e.g., the third RFIC 226 of FIG. 2), and the conductive pads 5044, 5045, and 5046 may be electrically connected to the ground. For example, the feed pads 5041, 5042, and 5043 and the conductive pads 5044, 5045, and 5046 may configure a coplanar waveguide (CPW) or microstrip line.

By configuring at least some of the mesh pattern portions 510, 520, and 530 to have two feed lines for forming horizontal and vertical polarized waves that cross perpendicular to each other, the array antenna AR may operate as a dual polarization array antenna.

The mesh pattern portions 510, 520, and 530 may be configured in various shapes such as a rectangle, a square, a rhombus, a regular hexagon, or a circle. For example, the mesh pattern portions 510, 520, and 530 may be configured in a rhombus shape in which the length of a first diagonal line parallel to a longer diagonal line of the diagonal lines of the plurality of unit patterns 516 is longer than a second diagonal line which intersects the first diagonal line.

Figure 7A:
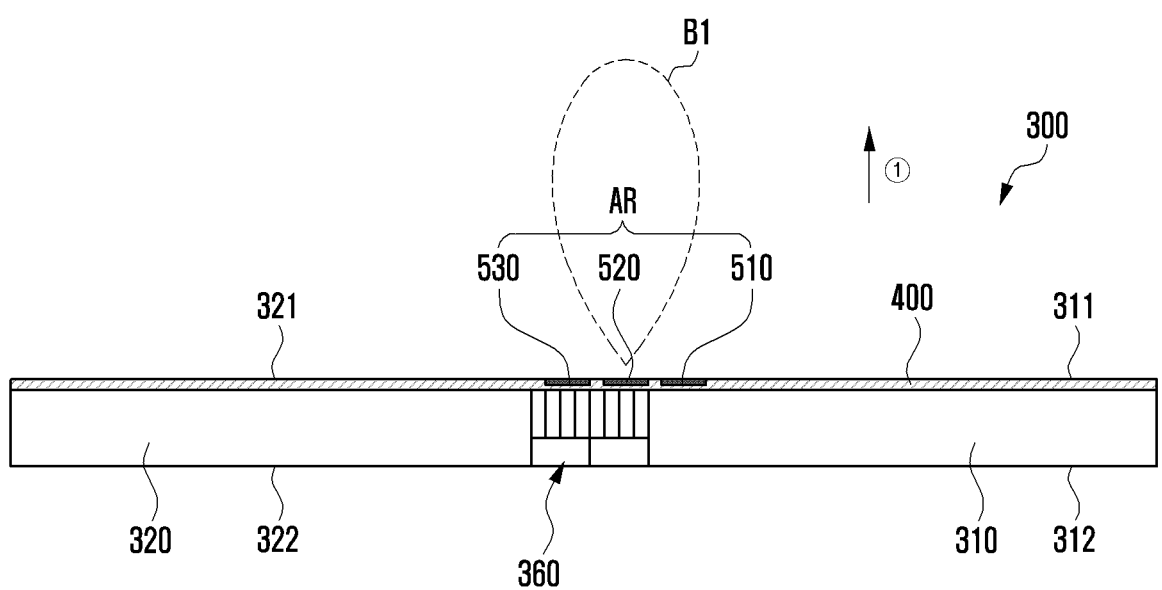
FIGS. 7A and 7B are views illustrating directions of beam patterns of an array antenna when the foldable electronic device of FIG. 6 is in an unfolded state and a folded state, respectively according to various embodiments of the disclosure.
Figure 7B:
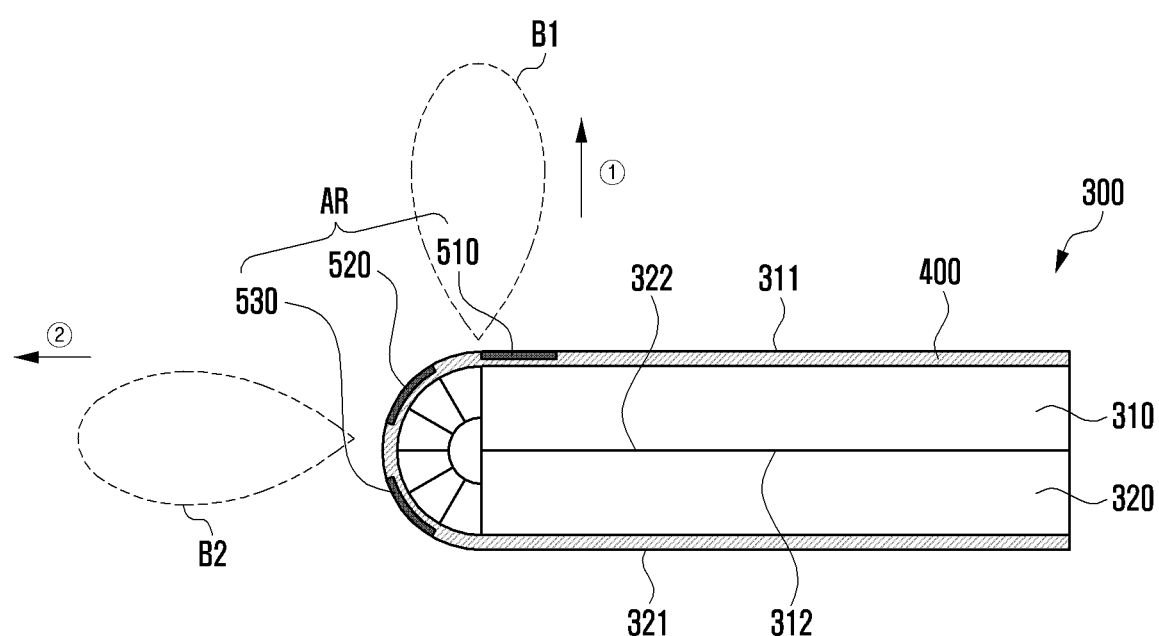

FIGS. 7A and 7B are views illustrating directions of beam patterns of the array antenna AR of FIG. 6 when the foldable electronic device 300 is in the unfolded state and the folded state, respectively according to various embodiments of the disclosure.

Referring to FIG. 7A, when the foldable electronic device 300 is in the unfolded state, all of the mesh pattern portions 510, 520, and 530 of the array antenna AR may be oriented in a first direction (direction ①) in which the flexible display 400 is oriented. The mesh pattern portions 510, 520, and 530 may operate as patch antennas. Accordingly, the array antenna AR may form a beam pattern in the first direction (direction ①) in which the flexible display 400 is oriented.

Referring to FIG. 7B, when the foldable electronic device 300 is in the folded state in which the flexible display 400 is visible to the outside (e.g., an out-folding type), the first mesh pattern portion 510 of the array antenna AR may be disposed to be oriented in the first direction (direction ①) in which the first area (e.g., the first area 501 of FIG. 5) of the dielectric sheet (e.g., the dielectric sheet 500 of FIG. 5) is oriented, and the second mesh pattern portion 520 and the third mesh pattern portion 530 may be oriented in the second direction (direction ②) (e.g., a direction substantially perpendicular to the first direction (direction ①)) in which the third area (e.g., the third area 503 of FIG. 5) of the dielectric sheet (e.g., the dielectric sheet 500 of FIG. 5) is oriented. In this case, the radiation performance of the array antenna AR may be degraded since the directions in which respective mesh pattern portions (the first mesh pattern portion 510, the second mesh pattern portion 520, and the third mesh pattern portion 530) are oriented become different from each other.

According to an embodiment of the disclosure, when the foldable electronic device (e.g., the foldable electronic device 300 of FIG. 3A) is in the folded state and/or the unfolded state, the array antenna AR may suppress the degradation of radiation performance by correcting the phase of at least one mesh pattern portion (e.g., the first mesh pattern portion 510) so that a beam pattern is formed in one direction (e.g., the second direction (direction ②)).

The array antenna AR may form a beam pattern B1 concentrated in the first direction (direction ①) in which the first mesh pattern portion 510 is oriented by correcting the phases of the second mesh pattern portion 520 and the third mesh pattern portion 530 which are oriented in a direction different from the direction in which the first mesh pattern portion 510 is oriented. The array antenna AR may form a beam pattern B2 concentrated in the second direction (direction ②) by correcting the phase of the first mesh pattern portion 510 which is oriented in a direction different from the direction in which the second mesh pattern portion 520 and the third mesh pattern portion 530 are oriented.

According to various embodiments of the disclosure, when the foldable electronic device (e.g., the foldable electronic device 300 of FIG. 3A) is in the folded state and/or the unfolded state, the array antenna AR may suppress the degradation of radiation performance by correcting the phases of at least two mesh pattern portions (e.g., the second mesh pattern portion 520 and the third mesh pattern portion 530) so that a beam pattern is formed in one direction (e.g., the first direction (direction ①). For example, as illustrated in FIGS. 7A and 7B, in order to cause a beam pattern to concentrate in the first direction (① direction), the array antenna AR may be induced to form a beam pattern in the first direction (direction ①) by correcting the phases of the second mesh pattern portion 520 and the third mesh pattern portion 530 which are oriented in a direction different from the direction in which the first mesh pattern portion 510 is oriented.

In some embodiments, the array antenna AR may be configured such that a beam pattern is concentrated in a predetermined direction between the first direction (direction ①) and the second direction (direction ②) by applying a corrected phase value to the first mesh pattern portion 510, the second mesh pattern portion 520, and/or the third mesh pattern portion 530.

In the array antenna AR, a phase value corrected to the first mesh pattern portion 510, the second mesh pattern portion 520, and/or the third mesh pattern portion 530 based on the folded angle or the unfolded angle of the foldable electronic device 300 may be changed. For example, in the array antenna AR, a phase value corrected to the first mesh pattern portion 510, the second mesh pattern portion 520, and/or the third mesh pattern portion 530 such that a beam pattern is concentrated in the second direction (direction ②) when the foldable electronic device 300 is folded about 30 degrees may differ from a phase value corrected to the first mesh pattern portion 510, the second mesh pattern portion 520, and/or the third mesh pattern portion 530 such that a beam pattern is concentrated in the second direction (direction ②) when the foldable electronic device 300 is folded about 60 degrees.

Figure 7C:
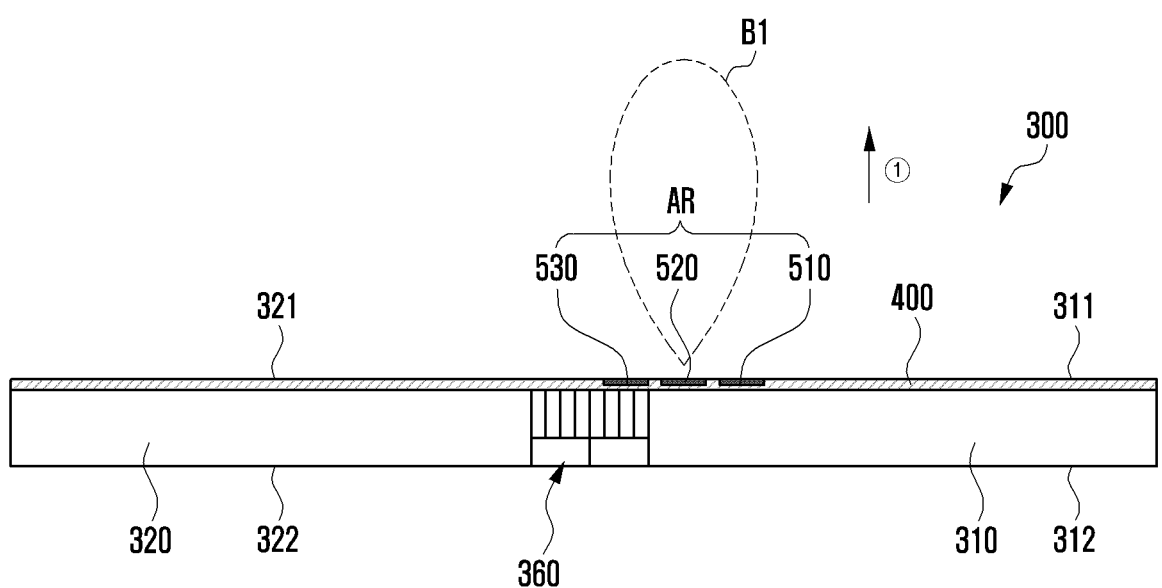
FIGS. 7C and 7D are views illustrating directions of beam patterns of an array antenna when a foldable electronic device is in the unfolded state and the folded state, respectively according to various embodiments of the disclosure.
Figure 7D:
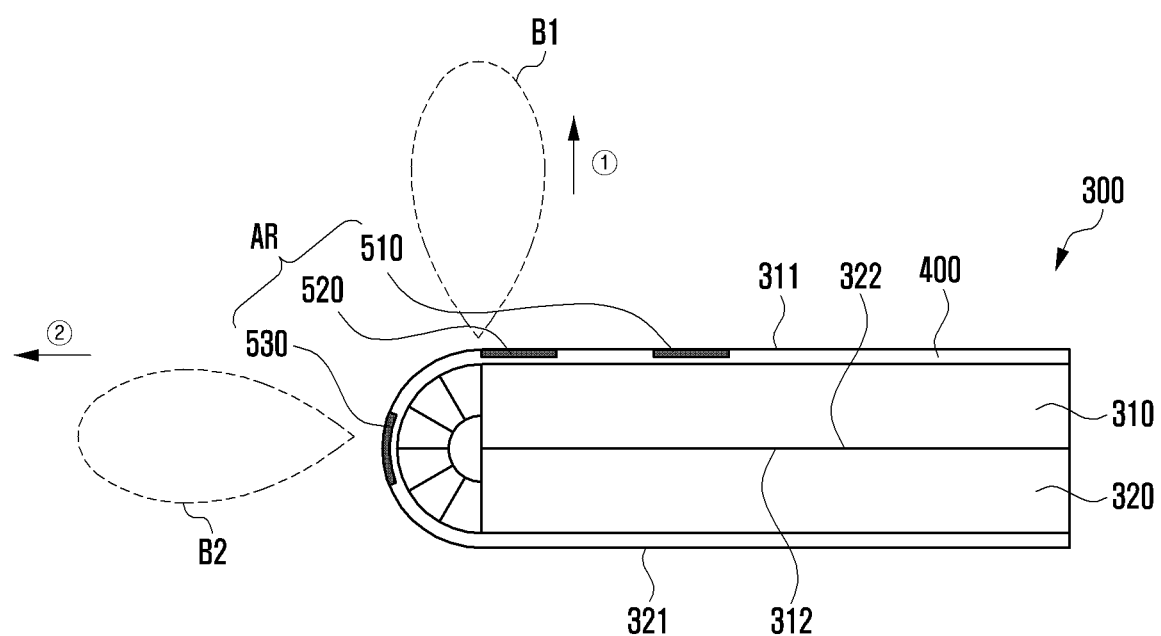

FIGS. 7C and 7D are views illustrating directions of beam patterns of an array antenna when a foldable electronic device is in the unfolded state and the folded state, respectively according to various embodiments of the disclosure.

Referring to FIGS. 7C and 7D, an array antenna AR may include a first mesh pattern portion 510 and a second mesh pattern portion 520 disposed in a first area (e.g., the first area 501 of FIG. 5) of a dielectric sheet (e.g., the dielectric sheet 500 of FIG. 5) disposed to correspond to the flexible display 400, and a third mesh pattern portion 530 disposed in a third area (e.g., the third area 503 of FIG. 5) of the dielectric sheet (e.g., the dielectric sheet 500 in FIG. 5).

Referring to FIG. 7A, when the foldable electronic device 300 is in the unfolded state, all of the mesh pattern portions 510, 520, and 530 of the array antenna AR may be oriented in a first direction (direction ①) in which the flexible display 400 is oriented. Accordingly, the array antenna AR may form a beam pattern B1 concentrated in the first direction (direction ①) via the mesh pattern portions 510, 520, and 530.

Referring to FIG. 7D, when the foldable electronic device 300 is in the folded state (e.g., an out-folding type), the first mesh pattern portion 510 and the second mesh pattern portion 520 of the array antenna AR may be disposed to be oriented in the first direction (direction ①) in which the first area (e.g., the first area 501 of FIG. 5) of the dielectric sheet (e.g., the dielectric sheet 500 of FIG. 5) is oriented, and the third mesh pattern portion 530 may be oriented in the second direction (direction ②) (e.g., a direction substantially perpendicular to the first direction (direction ①)) in which the third area (e.g., the third area 503 of FIG. 5) of the dielectric sheet (e.g., the dielectric sheet 500 of FIG. 5) is oriented. In this case, the array antenna AR may form a beam pattern B1 concentrated in the first direction (direction ①) in which the first mesh pattern portion 510 is oriented by correcting the phase of the third mesh pattern portion 530 which is oriented in a direction different from the direction in which the first mesh pattern portion 510 and the second mesh pattern portion 520 are oriented. The array antenna AR may form a beam pattern B2 concentrated in the second direction (direction ②) by correcting the phases of the first mesh pattern portion 510 and the second mesh pattern portion 520 which are oriented in a direction different from the direction in which the third mesh pattern portion 530 is oriented.

The array antenna AR may be configured such that a beam pattern is concentrated in a predetermined direction between the first direction (direction ①) and the second direction (direction ②) by applying a corrected phase value to the first mesh pattern portion 510, the second mesh pattern portion 520, and the third mesh pattern portion 530.

Figure 8:
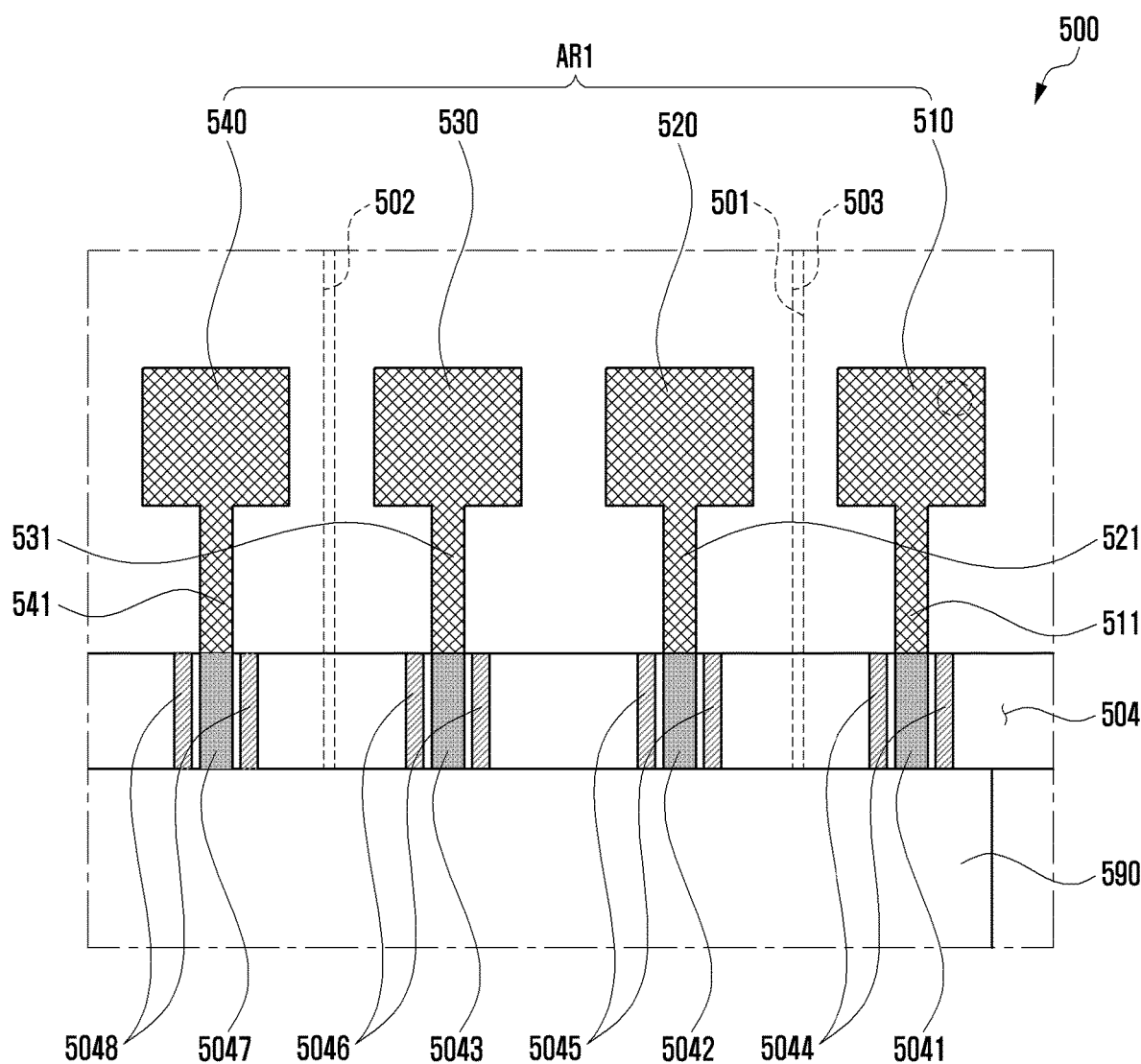
FIG. 8 is a view illustrating a configuration of an array antenna according to an embodiment of the disclosure.

FIG. 8 is a view illustrating a configuration of an array antenna AR1 according to an embodiment of the disclosure.

In describing the array antenna AR1 of FIG. 8, substantially the same components as those of the array antenna AR of FIG. 6 are given the same reference numerals, and detailed description thereof may be omitted.

Referring to FIG. 8, the array antenna AR1 may include a first mesh pattern portion 510 disposed in the first region 501 of the dielectric sheet 500, a second mesh pattern portion 520 disposed in the third area 503 to be spaced apart from the first mesh pattern portion 510, a third mesh pattern portion 530 disposed in the third area 503 to be spaced apart from the second mesh pattern portion 520, and a fourth mesh pattern portion 540 disposed in the second area 502 to be spaced apart from the third mesh pattern portion 530. The fourth mesh pattern portion 540 may include a fourth feed line 541 extending to the peripheral area 504 of the dielectric sheet 500. The fourth feed line 541 may be electrically connected to a fourth feed pad 5047 disposed between the fourth conductive pads 5048 in the peripheral area 504 of the dielectric sheet 500. The fourth feed pad 5047 may be electrically connected to a wireless communication circuit (e.g., the third RFIC 226 of FIG. 2) disposed inside the foldable electronic device (e.g., the foldable electronic device 300 of FIG. 3A) via the FPCB 590 attached to the peripheral area 504. As another example, the fourth feed pad 5047 and the fourth conductive pads 5048 may configure a coplanar waveguide (CPW) or microstrip line.

Figure 9A:
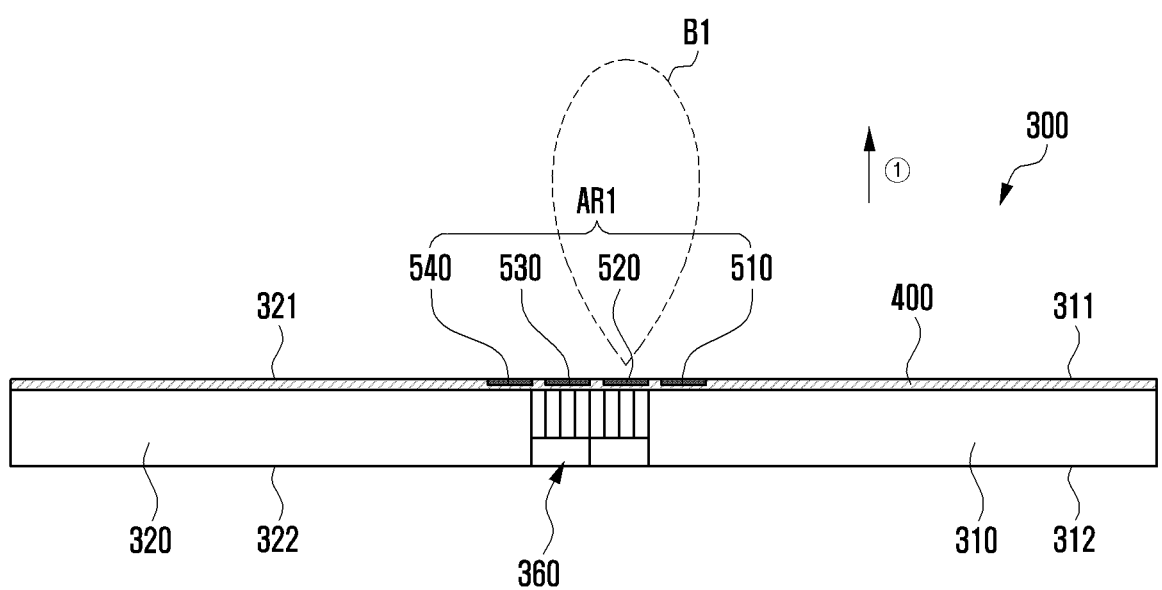
FIGS. 9A and 9B are views illustrating directions of beam patterns of an array antenna when the foldable electronic device of FIG. 8 is in an unfolded state and a folded state, respectively according to various embodiments of the disclosure.
Figure 9B:
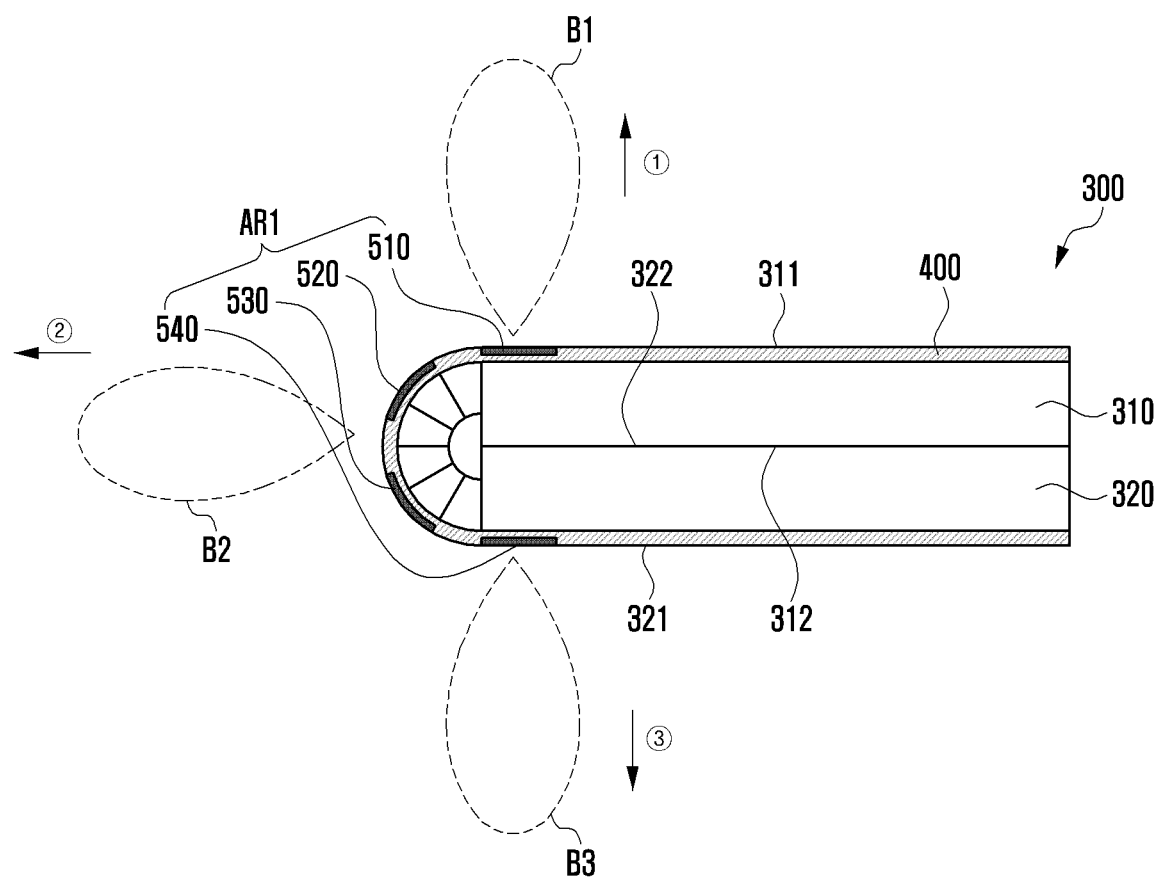

FIGS. 9A and 9B are views illustrating directions of beam patterns of the array antenna AR1 of FIG. 8 when the foldable electronic device 300 is in the unfolded state and the folded state, respectively according to various embodiments of the disclosure.

Referring to FIGS. 9A and 9B, the array antenna AR1 may include a first mesh pattern portion 510 disposed in the first area (e.g., the first area 501 of FIG. 5) of the dielectric sheet (e.g., the dielectric sheet 500 of FIG. 5), a second mesh pattern portion 520 and a third mesh pattern portion 530 disposed in the third area (e.g., the third area 503 of FIG. 5) of the dielectric sheet (e.g., the dielectric sheet 500 of FIG. 5), and a fourth mesh pattern portion 540 disposed in the second area (e.g., the second area 502 of FIG. 5) of the dielectric sheet (e.g., the dielectric sheet 500 of FIG. 5).

Referring to FIG. 9A, when the foldable electronic device 300 is in the unfolded state, all of the mesh pattern portions 510, 520, 530, and 540 of the array antenna AR1 may be oriented in the first direction (direction ①) in which the flexible display 400 is oriented. Accordingly, the array antenna AR1 may form a beam pattern B1 concentrated in the first direction (direction ①) via the mesh pattern portions 510, 520, 530, and 540.

Referring to FIG. 9B, when the foldable electronic device 300 is in the folded state (e.g., an out-folding type), the first mesh pattern portion 510 of the array antenna AR1 may be disposed to be oriented in the first direction (direction ①) in which the first area (e.g., the first area 501 of FIG. 5) of the dielectric sheet (e.g., the dielectric sheet 500 of FIG. 5) is oriented, the second mesh pattern portion 520 and the third mesh pattern portion 530 may be disposed to be oriented in the second direction (direction ②) in which the third area (the third area 503) of the dielectric sheet (e.g., the dielectric sheet 500 of FIG. 5) is oriented, and the fourth mesh pattern portion 540 may be disposed to be oriented in a third direction (direction ③) in which the second area (e.g., the third area 502) of the dielectric sheet (e.g., the dielectric sheet 500 of FIG. 5) is oriented. In this case, the array antenna AR1 may form a beam pattern B1 concentrated in the first direction (direction ①) in which the first mesh pattern portion 510 is oriented by correcting the phases of the second mesh pattern portion 520 and the third mesh pattern portion 530. In some embodiments, the array antenna AR1 may form a beam pattern B2 concentrated in the second direction (direction ②) in which the second mesh pattern portion 520 and the third mesh pattern portion 530 are oriented by correcting each of the phases of the first mesh pattern portion 510 and the fourth mesh pattern portion. In this case, based on the second direction (direction ②), the phase of the second mesh pattern portion 520 or the third mesh pattern portion 530 is corrected, although the corrected degree is smaller than the corrected degree of the phases of the first mesh pattern portion 510 and the fourth mesh pattern portion. In this case, the array antenna AR1 may form a beam pattern B3 concentrated in the third direction (direction ③) in which the fourth mesh pattern portion 540 is oriented by correcting the phases of the second mesh pattern portion 520 and the third mesh pattern portion 530.

When the foldable electronic device (e.g., the foldable electronic device 300 of FIG. 3A) is in the folded state and/or the unfolded state, the array antenna AR1 may suppress the degradation of radiation performance by correcting the phases of at least two mesh pattern portions (e.g., the second mesh pattern portion 520 and the third mesh pattern portion 530) so that the array antenna AR1 forms a beam pattern in one direction (e.g., the first direction (direction ①) or the third direction ②). For example, as illustrated in FIGS. 9A and 9B, in order to form a beam pattern in the first direction (direction ①) or the third direction (direction ③), by correcting the phases of the second mesh pattern portion 520 and the third mesh pattern portion 530, the array antenna AR1 may form a beam pattern in the first direction (direction ①) or the third direction (direction ③).

The array antenna AR1 may be configured such that a beam pattern is concentrated in a predetermined direction between the first direction (direction ①) and the second direction (direction ②) and/or between the second direction (direction ②) and the third direction (direction ③) by applying a corrected phase value to the first mesh pattern portion 510, the second mesh pattern portion 520, the third mesh pattern portion 530, and the fourth mesh pattern portion 540.

Figure 9C:
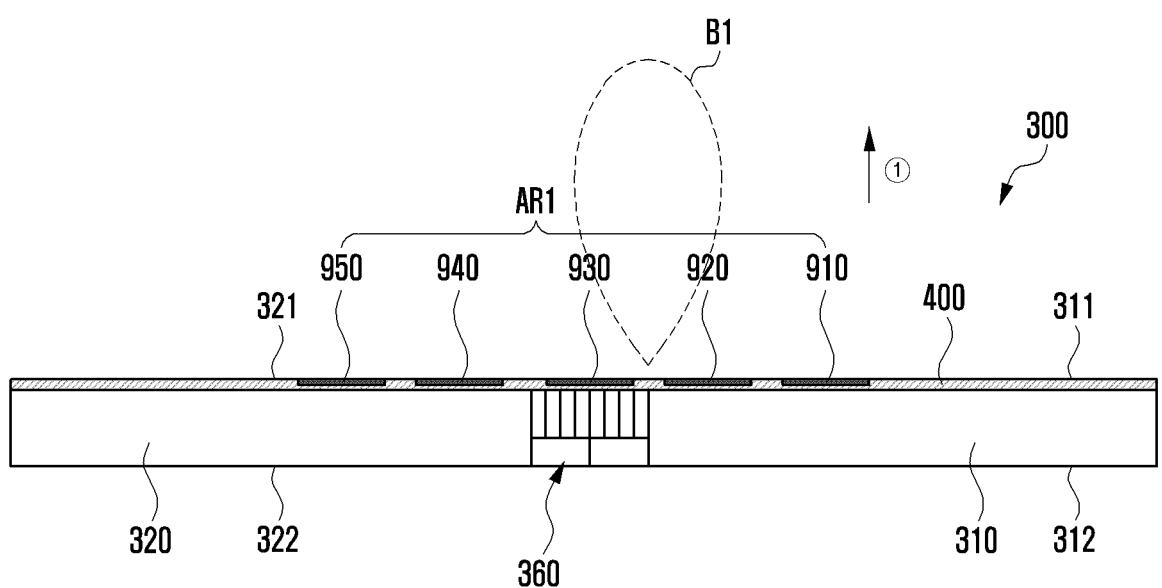
FIGS. 9C and 9D are views illustrating directions of beam patterns of an array antenna when a foldable electronic device is in the unfolded state and the folded state, respectively according to various embodiments of the disclosure.
Figure 9D:
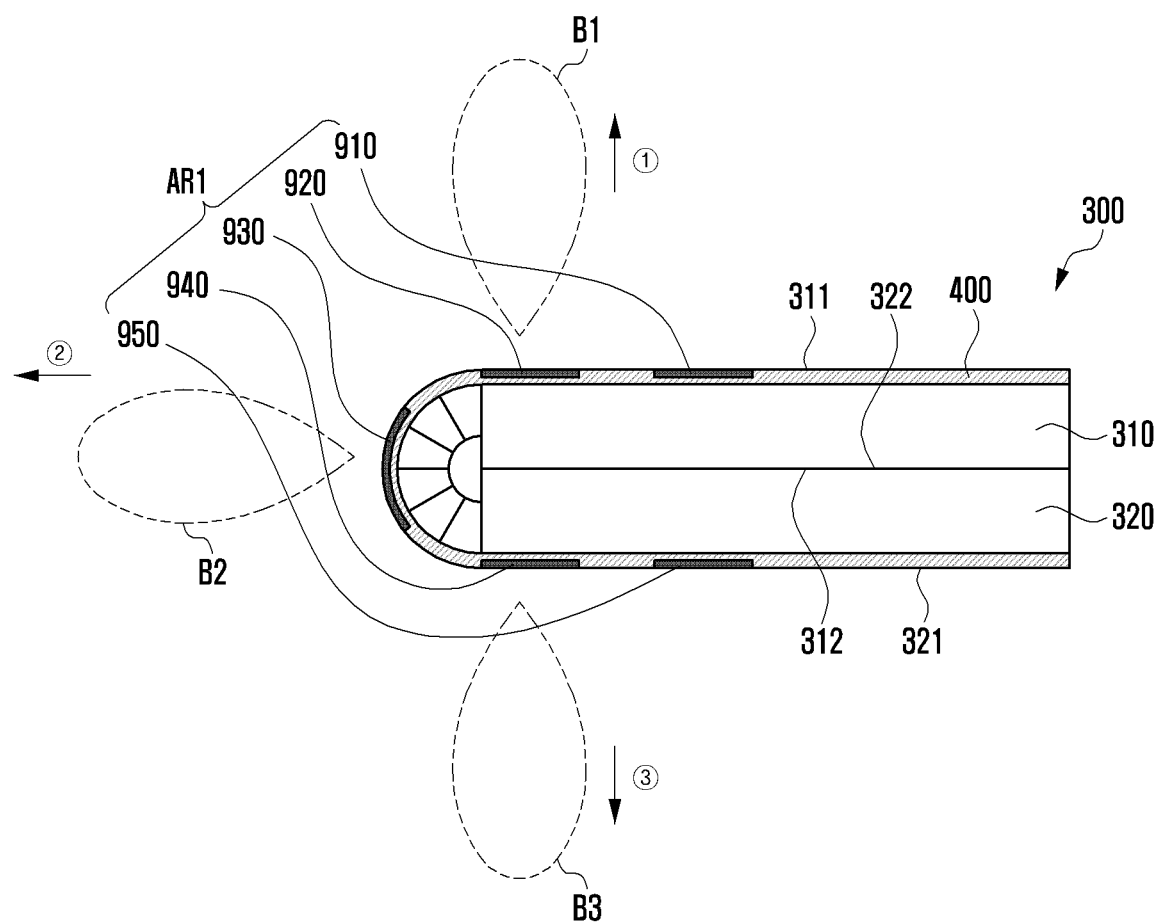

FIGS. 9C and 9D are views illustrating directions of beam patterns of an array antenna when a foldable electronic device is in the unfolded state and the folded state, respectively according to various embodiments of the disclosure.

Referring to FIGS. 9C and 9B, the mesh pattern portions 910, 920, 930, 940, and 950 may be configured in a substantially similar manner to that for configuring the mesh pattern portions 510, 520, and 530 of FIG. 6.

Referring to FIGS. 9C and 9D, the array antenna AR1 may include a first mesh pattern portion 910 and a second mesh pattern portion 920 disposed in the first area (e.g., the first area 501 of FIG. 5) of the dielectric sheet (e.g., the dielectric sheet 500 of FIG. 5), a third mesh pattern portion 930 disposed in the third area (e.g., the third area 503 of FIG. 5) of the dielectric sheet (e.g., the dielectric sheet 500 of FIG. 5), and a fourth mesh pattern portion 940 and a fifth mesh pattern portion 950 disposed in the second area (e.g., the second area 502 of FIG. 5) of the dielectric sheet (e.g., the dielectric sheet 500 of FIG. 5).

Referring to FIG. 9C, when the foldable electronic device 300 is in the unfolded state, all of the mesh pattern portions 910, 920, 930, 940, and 950 of the array antenna AR1 may be oriented in the first direction (direction ①) in which the flexible display 400 is oriented. Accordingly, the array antenna AR1 may form a beam pattern B1 concentrated in the first direction (direction ①) via the mesh pattern portions 910, 920, 930, 940, and 950.

Referring to FIG. 9D, when the foldable electronic device 300 is in the folded state (e.g., an out-folding type), the first mesh pattern portion 910 and the second mesh pattern portion 920 of the array antenna AR1 may be disposed to be oriented in the first direction (direction ①) in which the first area (e.g., the first area 501 of FIG. 5) of the dielectric sheet (e.g., the dielectric sheet 500 of FIG. 5) is oriented, the third mesh pattern portion 930 may be disposed to be oriented in the second direction (direction ②) in which the third area (the third area 503 of FIG. 5) of the dielectric sheet (e.g., the dielectric sheet 500 of FIG. 5) is oriented, and the fourth mesh pattern portion 940 and the fifth mesh pattern portion 950 may be disposed to be oriented in the third direction (direction ③) in which the second area (e.g., the second area 502) of the dielectric sheet (e.g., the dielectric sheet 500 of FIG. 5) is oriented. In this case, the array antenna AR1 may form a beam pattern B1 concentrated in the first direction (direction ①) in which the first mesh pattern portion 910 and the second mesh pattern portion 920 are oriented by correcting the phase of the third mesh pattern portion 930. The array antenna AR1 may form a beam pattern B2 concentrated in the second direction (direction ②) in which the third mesh pattern portion 930 is oriented by correcting each of the phases of the first mesh pattern portion 910, the second mesh pattern portion 920, the fourth mesh pattern 940, and the fifth mesh pattern portion 950. The array antenna AR1 may form a beam pattern B3 concentrated in the third direction (direction ③) in which the fourth mesh pattern portion 940 and the fifth mesh pattern portion 950 are oriented by correcting the phase of the third mesh pattern portion 930.

According to an embodiment of the disclosure, the array antenna AR1 may exhibit the best radiation performance when each of the phases of the first mesh pattern portion 910, the second mesh pattern portion 920, the fourth mesh pattern portion 940, and the fifth mesh pattern portion is corrected and a beam pattern B2 is concentrated in the second direction (direction ②) in which the third mesh pattern portion 930 is oriented.

The array antenna AR1 may be configured such that a beam pattern is concentrated in a predetermined direction between the first direction (direction ①) and the second direction (direction ②) and/or between the second direction (direction ②) and the third direction (direction ③) by applying a corrected phase value to the first mesh pattern portion 910, the second mesh pattern portion 920, the third mesh pattern portion 930, the fourth mesh pattern portion 940, and the fifth mesh pattern portion 950.

Figure 10:
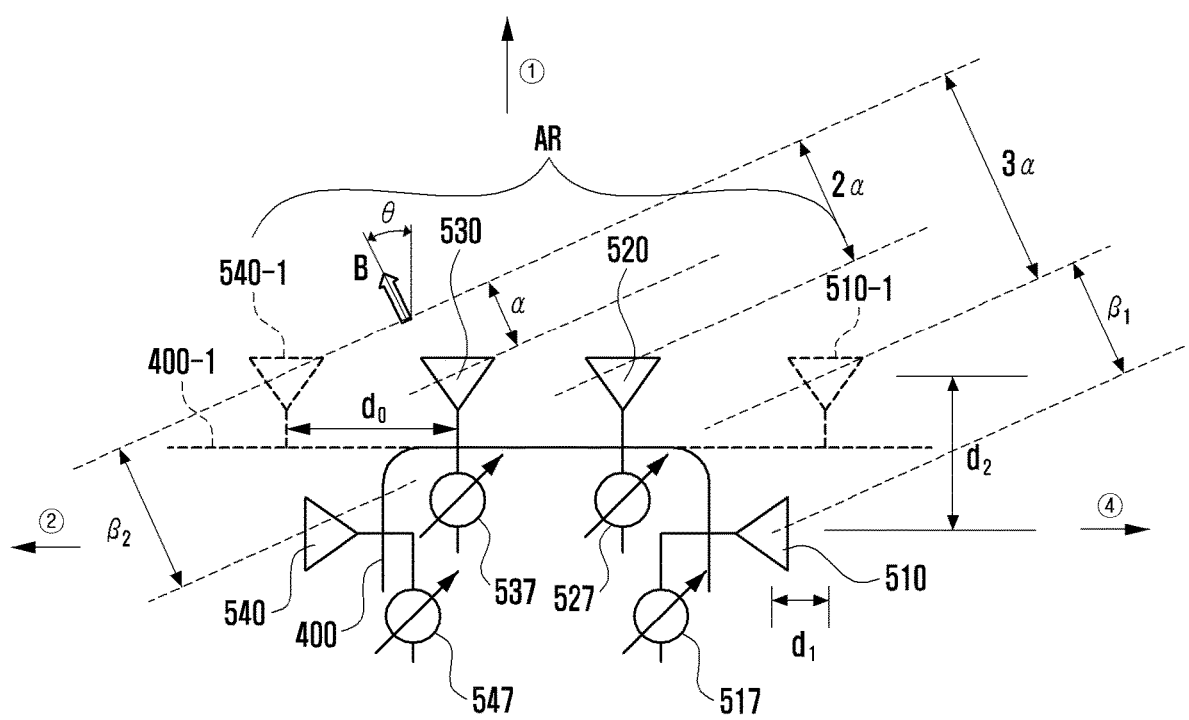
FIG. 10 is a view illustrating a principle of phase correction of an array antenna according to an embodiment of the disclosure.

FIG. 10 is a view illustrating a principle of phase correction of an array antenna AR according to an embodiment of the disclosure.

The array antenna AR of FIG. 10 may be substantially similar to the array antenna AR1 of FIG. 8 or may include another embodiment of the array antenna.

Referring to FIG. 10, the flexible display 400-1 may include a first mesh pattern portion 510-1, a second mesh pattern portion 520, a third mesh pattern portion 530, or a fourth mesh pattern portion 540-1 disposed to form a beam pattern in the same first direction (direction ①) in the unfolded state. The first mesh pattern portion 510-1, the second mesh pattern portion 520, the third mesh pattern portion 530, or the fourth mesh pattern portion 540-1 may operate as a patch antenna. The phase of the first mesh pattern portion 510-1 may be changed by a first phase converter 517. The phase of the second mesh pattern portion 520 may be changed by a second phase converter 527. The phase of the third mesh pattern portion 530 may be changed by a third phase conversion converter 537. The phase of the fourth mesh pattern portion 540-1 may be changed by a fourth phase converter 547. In the state in which the flexible display 400-1 is unfolded, the array antenna AR may form a beam pattern in a B direction tilted by a predetermined angle θ with respect to the first direction (direction ①) when the third mesh pattern portion 530 is provided with a phase value by a with respect to the fourth mesh pattern portion 540-1, the second mesh pattern portion 520 is provided with a phase value by 2α with respect to the fourth mesh pattern portion 540-1, and the first mesh pattern portion 510-1 is provided with a phase value by 3α with respect to the fourth mesh pattern portion 540-1.

In this case, the phase value α may be calculated by Equation 1 below.

$$\alpha = \frac{2\pi}{\lambda} d_0 \sin\theta \qquad \text{Equation 1}$$

In Equation 1, d0 represents a separation distance between the mesh pattern portions 510-1, 520, 530, and 540-1, and θ represents a tilt angle θ of a beam pattern of the array antenna AR, In the flexible display 400, in the folded state, the second mesh pattern portion 520 and the third mesh pattern portion 530 are disposed to be oriented in the same direction, but the first mesh pattern portion 510 may be oriented in a fourth direction (direction ④) substantially perpendicular to the first direction (direction ①), and the fourth mesh pattern portion 540 may be oriented in the second direction (direction ②) substantially perpendicular to the first direction and opposite to the fourth direction (direction ④)). Therefore, the first mesh pattern portion 510 and the fourth mesh pattern portion 540 may be respectively provided with phase values β1 and β2 for compensating for positions changed according to the folded state of the flexible display 400. The corrected first phase value β1 for the first mesh pattern portion 510 may be calculated by Equation 2 below.

$$\beta 1 = -\frac{2\pi}{\lambda}(d_1 \sin\theta - d_2 \cos\theta) \qquad \text{Equation 2}$$

In Equation 2, d1 is the horizontal distance between the first mesh pattern portion 510-1 in the unfolded state and the first mesh pattern portion 510 in the folded state, d2 may be the perpendicular distance between the first mesh pattern is portion 510-1 in the unfolded state and the first mesh pattern portion 510 in the folded state, and θ indicates the tilt angle θ of a beam pattern of the array antenna AR.

The corrected second phase value β2 for the fourth mesh pattern portion 540 may be calculated by Equation 3 below.

$$\beta 2 = -\frac{2\pi}{\lambda}(d_1 \sin\theta + d_2 \cos\theta) \qquad \text{Equation 3}$$

In Equation 3, d1 is the horizontal distance between the fourth mesh pattern portion 540-1 in the unfolded state and the fourth mesh pattern portion 540 in the folded state, d2 is the perpendicular distance between the fourth pattern fourth portion 540-1 in the unfolded state and the fourth mesh pattern portion 540 in the folded state, and θ indicates the tilt angle θ of a beam pattern of the array antenna AR.

Accordingly, when the foldable electronic device is in the folded state, the beam pattern may be tilted to a predetermined angle θ by applying phase correction values according to the position change of the first mesh pattern portion 510 and the fourth mesh pattern portion 540 through Equation 2 and Equation 3 above.

According to an embodiment of the disclosure, the phase conversion mechanism may use the length of a feed line connected to an antenna radiator in addition to using phase converters (e.g., the first to fourth phase converters 517 to 547).

Figure 11:
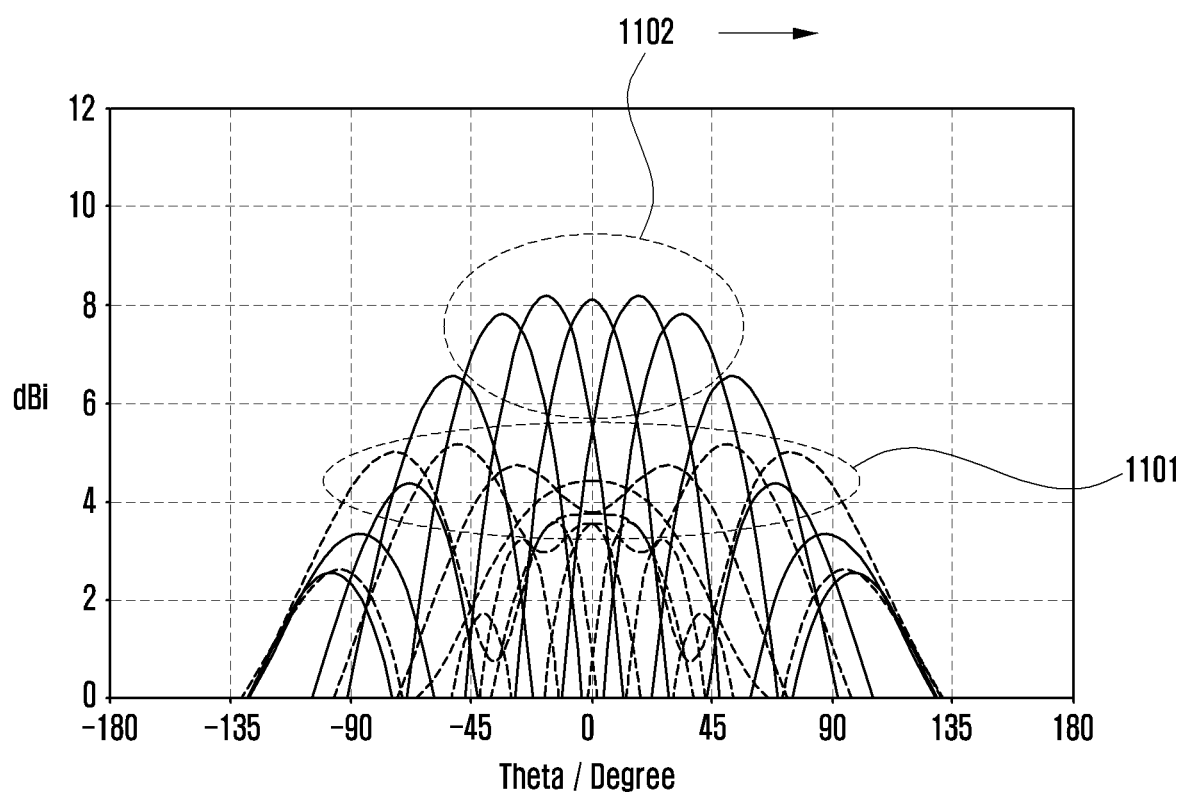
FIG. 11 is a graph showing, in comparison, radiation characteristics before and after phase correction of the array antenna of FIG. 10 when the foldable electronic device is in the folded state according to an embodiment of the disclosure.

FIG. 11 is a graph showing, in comparison, radiation characteristics before and after phase correction of the array antenna AR of FIG. 10 when the foldable electronic device is in the folded state according to an embodiment of the disclosure.

Referring to FIGS. 10 and 11, it may be seen that when the foldable electronic device (e.g., the electronic device 300 of FIGS. 3A, and 3B) is in the folded state, the gain of the array antenna AR (part 1102) after phase value correction of the first mesh pattern portion 510 and the fourth mesh pattern portion 540 is higher than the gain (part 1101) before the phase value correction. This may mean that when the foldable electronic device is in the folded state, the radiation performance of the array antenna AR is improved when the phase values of the first pattern portion 510 and the fourth mesh pattern portion 540, the positions of which are changed with respect to the other mesh pattern portions (e.g., the second mesh pattern portion 520 and the third mesh pattern portion 530), are corrected.

Figure 12:
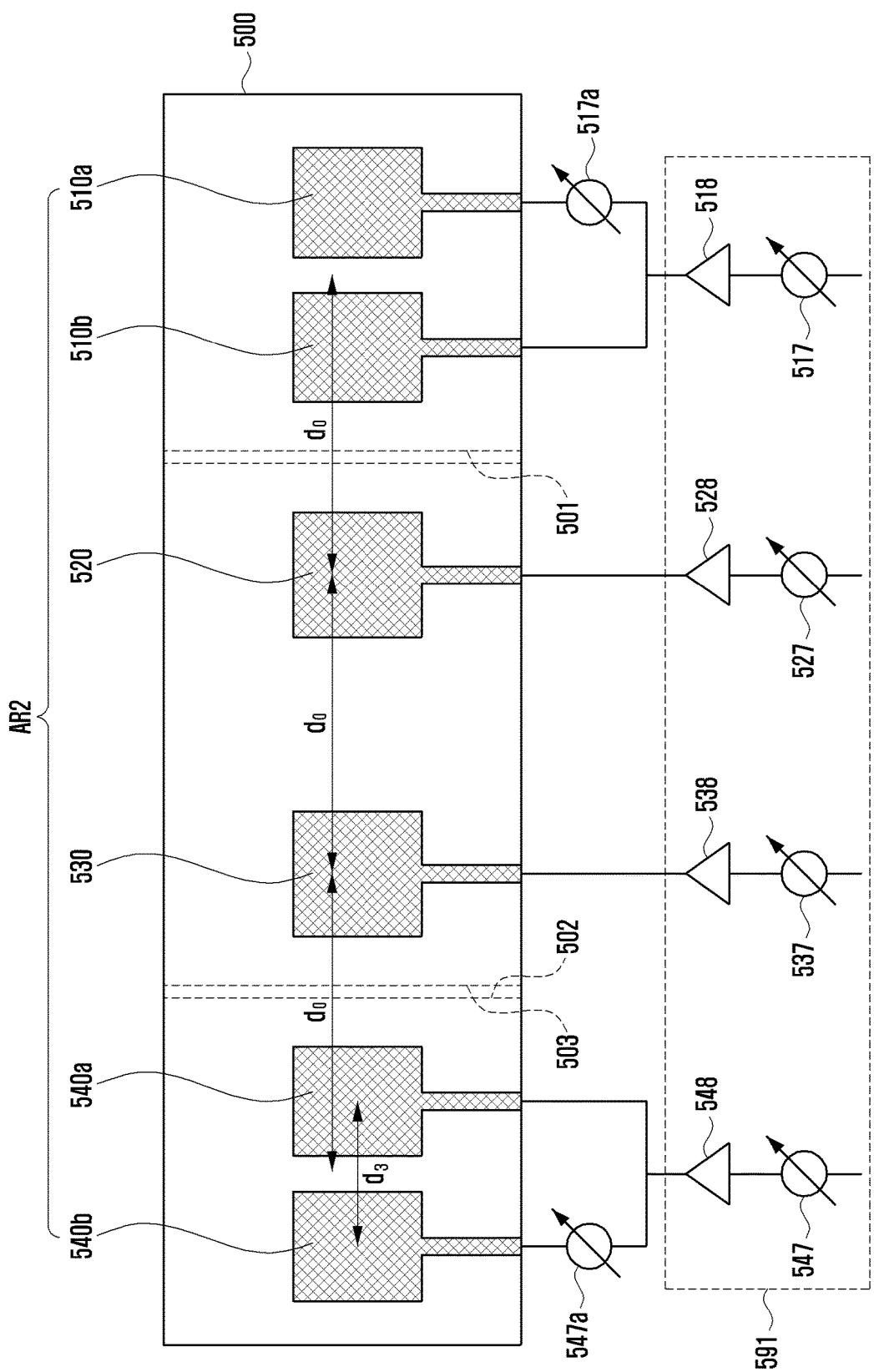
FIG. 12 is a view illustrating a configuration of an array antenna in which at least one mesh pattern portion is replaced with dual pattern portions according to an embodiment of the disclosure.

FIG. 12 is a view illustrating a configuration of an array antenna AR in which at least one mesh pattern portion is replaced with dual pattern portions according to an embodiment of the disclosure.

In describing the array antenna AR2 of FIG. 12, substantially the same components as those of the array antenna AR1 of FIG. 8 are given the same reference numerals, and detailed description thereof may be omitted.

Referring to FIG. 12, the array antenna AR2 may include first dual pattern portions disposed in the first area 501 of the dielectric sheet 500, a second mesh pattern portion 520 and a third mesh pattern portion 530 disposed in the third area 503, and second dual pattern portions disposed in the second area 502. The first dual pattern portions may include a first pattern portion 510*a* and a second pattern portion 510*b* spaced apart from each other. The second dual pattern portions may include a third pattern portion 540*a* and a fourth pattern portion 540*b* spaced apart from each other.

The second mesh pattern portion 520 may be disposed to have a first predetermined separation distance d0 from the third mesh pattern portion 530. The first separation distance d0 may include a distance from the center of the second mesh pattern portion 520 to the center of the third mesh pattern portion 530. The first and second pattern portions 510*a* and 510*b* may also be disposed to have the first separation distance from the second mesh pattern portion 520. For example, the first and second pattern portions 510*a* and 510*b* may be disposed to have the first separation distance d0 from the center between the first pattern portion 510*a* and the second pattern portion 510*b* to the center of the second mesh pattern portion 520. The third and fourth pattern portions 540*a* and 540*b* may be disposed to have the first separation distance d0 from the center between the third pattern portion 540*a* and the fourth pattern portion 540*b* to the center of the third mesh pattern portion 530. The first pattern portion 510*a* and the second pattern portion 510*b* may be disposed to have a second separation distance d3 therebetween. The second separation distance d3 may include a distance from the center of the first pattern portion 510*a* to the center of the second pattern portion 510*b*. The third pattern portion 540*a* and the fourth pattern portion 540*b* may be disposed to have a second separation distance d3 therebetween. The second separation distance d3 may be shorter than the first separation distance d0. The second separation distance d3 may include a length of about λ/4.

According to various embodiments of the disclosure, a foldable electronic device (e.g., the foldable electronic device 300 of FIG. 3A) may include a wireless communication circuit 591 (e.g., the third RFIC 226 of FIG. 2) electrically connected to the array antenna AR2. The wireless communication circuit 591 may include a first phase converter 517 and a first power amplifier 518 connected to the first dual pattern portions 510a and 510b, a second phase converter 527 and a second power amplifier 528 connected to the second mesh pattern portion 520, a third phase converter 537 and a third power amplifier 538 connected to the third mesh pattern portion 530, and/or a fourth phase converter 547 and a fourth amplifier 548 connected to the second dual pattern portions 540a and 540b. The first and second pattern portions 510a and 510b may be configured such that by branching the output terminal of the first power amplifier 518 to the first pattern portion 510a and the second pattern portion 510b via a power divider (not illustrated), half of the power output from the first power amplifier 518 is provided to each of the first pattern portion 510a and the second pattern portion 510b. The third and fourth pattern portions 540a and 540b may also be configured such that by branching the output terminal of the fourth amplifier 548 via a power divider (not illustrated), half of the power output from the fourth power amplifier 548 is provided to each of the third pattern portion 540a and the fourth pattern portion 540b.

A fifth phase converter 517a may be disposed between the first pattern portion 510a and the first power amplifier 518. A sixth phase converter 547 may be disposed between the fourth pattern portion 540b and the fourth power amplifier 548. For example, when the same phase is applied to the first pattern portion 510a and the second pattern portion 510b, the first and second pattern portions 510a and 510b may form a radiation pattern similar to that of a single mesh pattern portion (e.g., the first mesh pattern of FIG. 8). As another example, when the phase difference between the first pattern portion 510a and the second pattern portion 510b is changed by using the fifth phase shifter 517a, the radiation direction of signals (e.g., radio waves) may be changed. For example, when the phase difference between the first pattern portion 510a and the second pattern portion 510b is formed as 90 degrees by using the fifth phase converter 517a, signals radiated to the side surface instead of the front surface may be increased. For example, when the same phase is applied to the third pattern portion 540a and the fourth pattern portion 540b of the second dual pattern portions 540a and 540b, a radiation pattern similar to that of a single mesh pattern portion (e.g., the fourth mesh pattern 540 of FIG. 8) may be formed. As another example, when the phase difference between the third pattern portion 540a and the fourth pattern portion 540b is changed by using the sixth phase shifter 547a, the radiation direction of signals may be changed. For example, when the phase difference between the third pattern portion 540a and the fourth pattern portion 540b is formed as 90 degrees by using the sixth phase converter 547a, signals radiated to the side surface instead of the front surface may be increased.

When a foldable electronic device (e.g., the electronic device 300 of FIG. 3B) is in the folded state, the phases of the first and second pattern portions 510a and 510b may be converted by the first phase converter 517 and the fifth phase converter 517a connected to the first pattern portion 510a, and the phases of the third and fourth pattern portions 540a and 540b are converted by the fourth phase converter 547 and the sixth phase converter 547a connected to the fourth pattern portion 540b, whereby the array antenna AR2 may have a high gain and may form a beam pattern in a predetermined direction.

The wireless communication circuit 591 may include a fifth phase converter 517a or a sixth phase converter 547a. As another example, the fifth phase converter 517a or the sixth phase converter 547a may be disposed as a separate configuration without being included in the wireless communication circuit 591.

The first pattern portion 510a, the second pattern portion 510b, the third pattern portion 540a, or the fourth pattern portion 540b may be connected to a wireless communication circuit 591 (e.g., the third RFIC 226 of FIG. 2) via respective RF chains, each of which has a phase converter. For example, an RF chain may be provided between a communication processor (e.g., the second communication processor 214 of FIG. 2) and an antenna (e.g., the second mesh pattern portion 520), and may include at least one power amplifier (e.g., the second power amplifier 528) or at least one phase converter (e.g., the second phase converter 527). For example, the second power amplifier 528 or the second phase converter 527 provided between the communication processor (e.g., the second communication processor 214 of FIG. 2) and the second mesh pattern portion 520 may be included in a single RF chain. In some embodiments, the second mesh pattern portion 520 and/or the third mesh pattern portion 530 may also be provided as dual pattern portions.

According to an embodiment of the disclosure, the size of the first pattern portion 510a, the second pattern portion 510b, the third pattern portion 540a, or the fourth pattern portion 540b may be smaller than that of the second mesh pattern portion 520 and/or the third mesh pattern portion 530. The first pattern portion 510a, the second pattern portion 510b, the third pattern portion 540a or the fourth pattern portion 540b may support substantially the same frequency band as the second mesh pattern portion 520 and/or the third mesh pattern portion 530.

Figure 13:
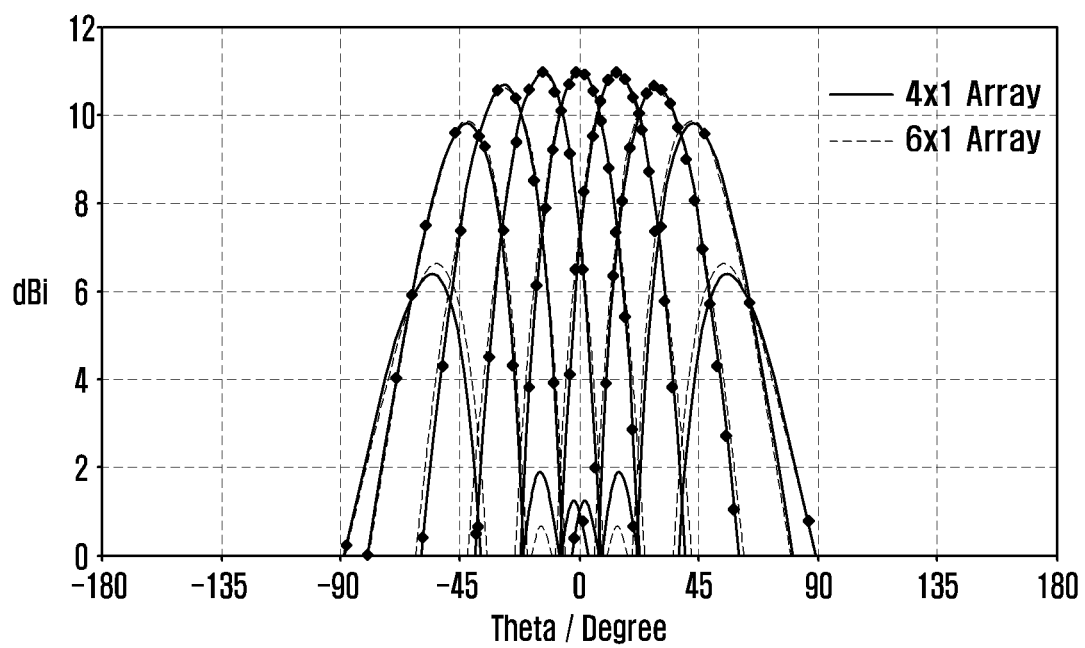
FIG. 13 is a graph showing in comparison radiation characteristics before and after application of dual pattern portions of an array antenna when a foldable electronic device is in an unfolded state according to an embodiment of the disclosure.

FIG. 13 is a graph showing in comparison radiation characteristics before and after application of dual pattern portions of an array antenna when a foldable electronic device is in the unfolded state according to an embodiment of the disclosure.

Referring to FIG. 13, it may be seen that, when the foldable electronic device (e.g., the foldable electronic device 300 of FIGS. 3A and 3B) is in the unfolded state, the radiation performance of an array antenna AR1 (a 4×1 array antenna) including the four mesh pattern portions 510, 520, 530, and 540 of FIG. 8 and the radiation performance of an array antenna AR2 (6×1 array antenna) including two mesh pattern portions 520 and 530 and two set of dual pattern portions 510a and 510b and/or 540a and 540b are substantially equal to each other.

Figure 14A:
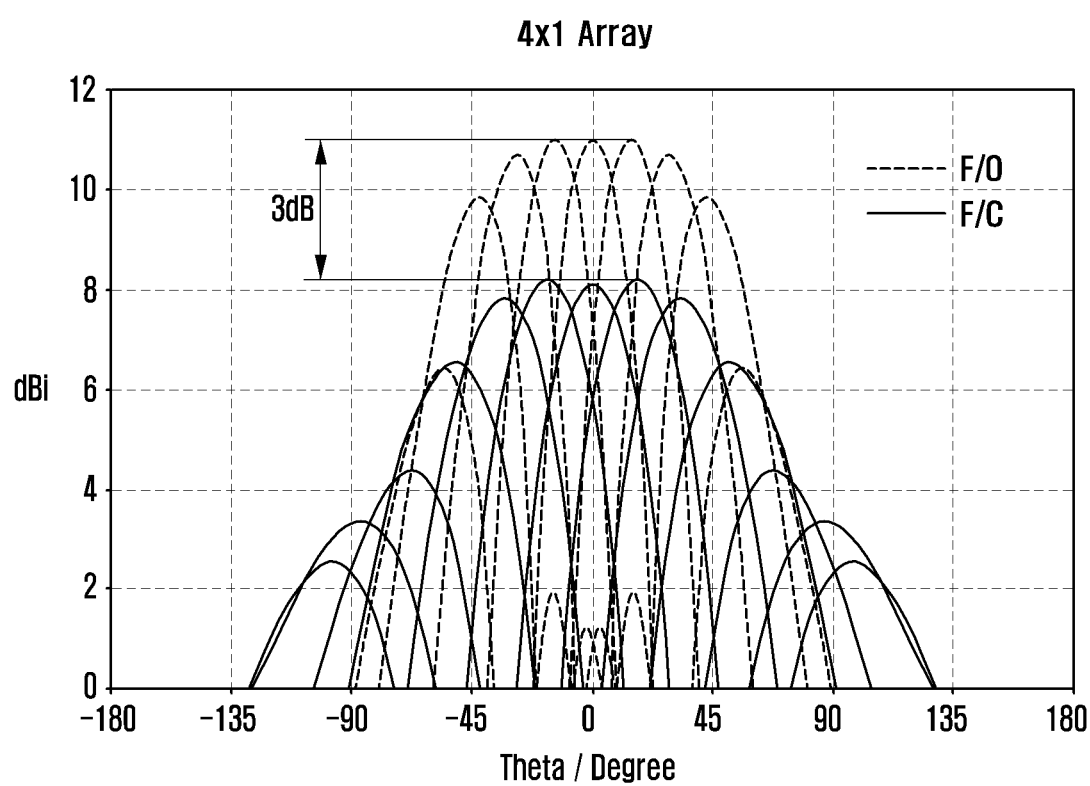
FIG. 14A is a view showing in comparison radiation characteristics of an array antenna before application of dual patterns when a foldable electronic device including the array antenna is in the folded state (a folder close (F/C)) and in the unfolded state (folder open (F/O)) according to an embodiment of the disclosure.
Figure 14B:
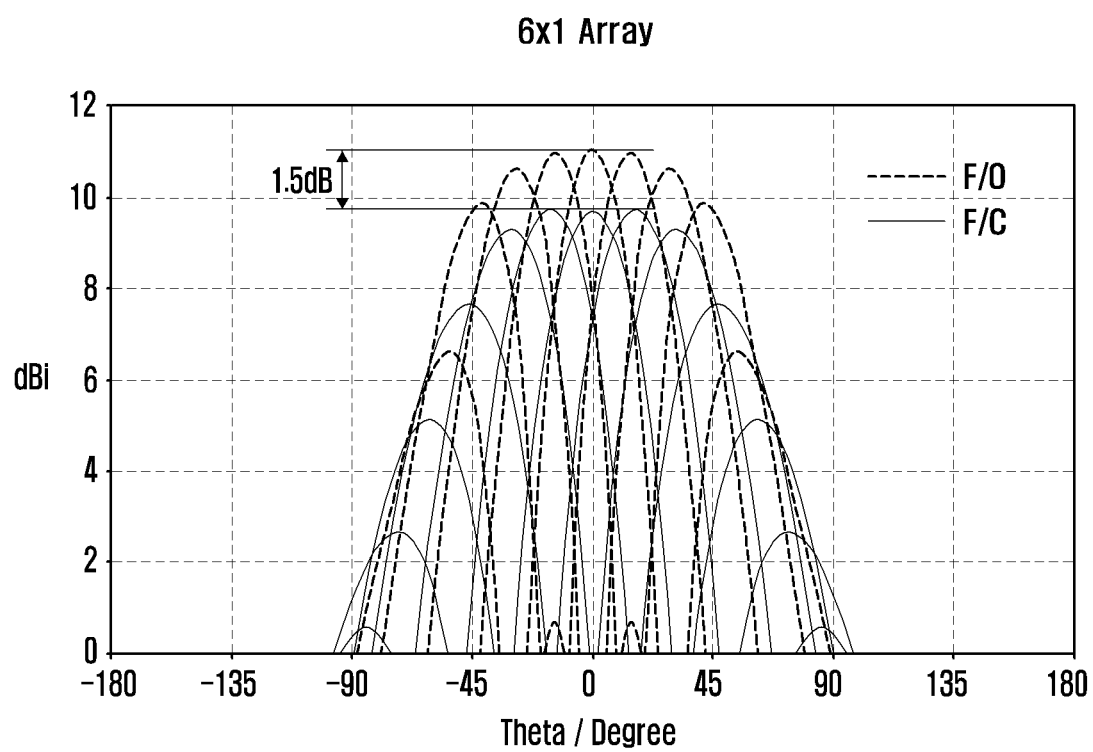
FIG. 14B is a view showing in comparison radiation characteristics of an array antenna after application of dual patterns when a foldable electronic device including the array antenna is in the folded state (a folder close (F/C)) and in the unfolded state (folder open (F/O)) according to an embodiment of the disclosure.

FIG. 14A is a view showing in comparison radiation characteristics of an array antenna to which dual patterns are not applied when a foldable electronic device including the array antenna is in a folded state (a folder close (F/C)) and in an unfolded state (folder open (F/O)) according to an embodiment of the disclosure. FIG. 14B is a view showing in comparison radiation characteristics of an array antenna to which antenna patterns are not applied when a foldable electronic device including the array antenna is in a folded state (a folder close (F/C)) and in an unfolded state (folder open (F/O)) according to an embodiment of the disclosure.

Referring to FIGS. 14A and 14B, it may be seen that, even if a corrected phase value is applied to the array antenna AR1 (a 4×1 array antenna) including the four mesh pattern portions 510, 520, 530, and 540 of FIG. 8, a difference in gain depending on the folded and unfolded states of the foldable electronic device (e.g., the foldable electronic device 300 of FIG. 3A) is a level of about 3 dB, whereas, when a corrected phase value is applied to an array antenna AR2 (a 6×1 array antenna) including the two mesh pattern portions 520 and 530 and the two sets of dual pattern portions 510a and 510b and/or 540a and 540b in FIG. 12, a difference in gain depending on the folded and unfolded states of the foldable device (e.g., the foldable electronic device 300 of FIG. 3A is improved to a level of about 1.5 dB.

Figure 15A:
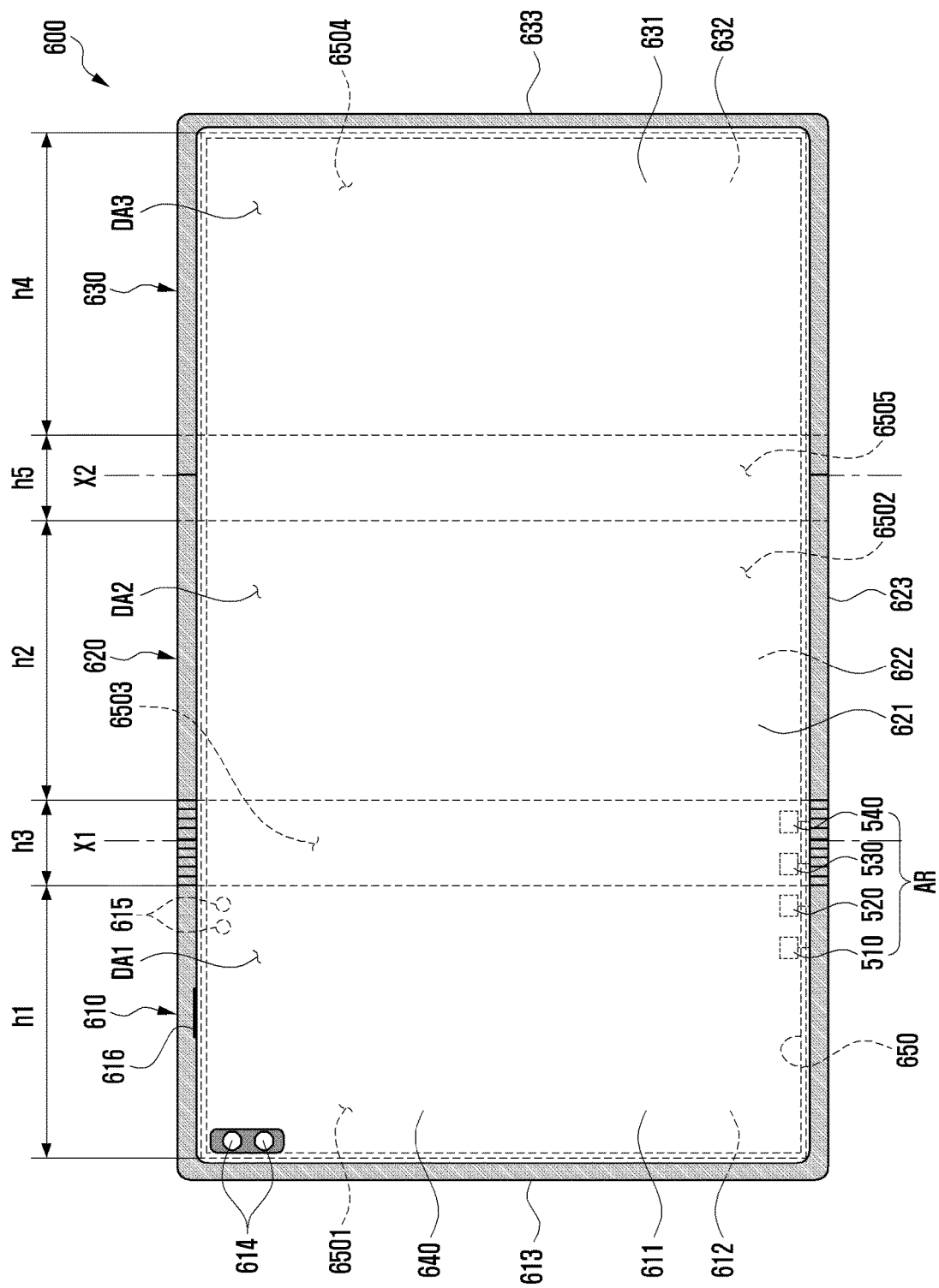
FIGS. 15A and 15B are front and rear views of a multi-foldable electronic device in the unfolded state according to various embodiments of the disclosure.
Figure 15B:
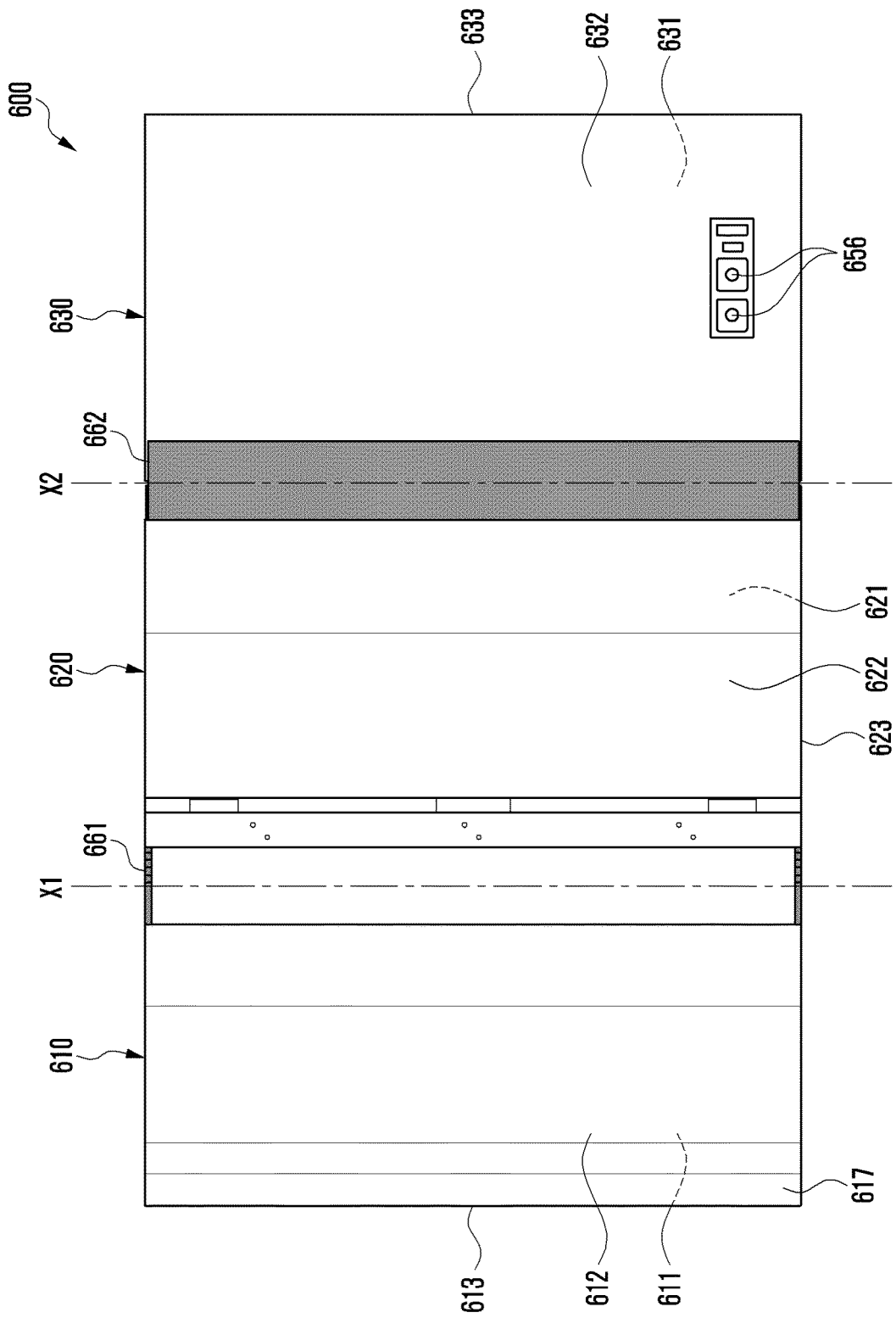

FIGS. 15A and 15B are front and rear views of a multi-foldable electronic device in the unfolded state according to various embodiments of the disclosure.

Referring to FIGS. 15A and 15B, the multi-foldable electronic device 600 may be at least partially similar to the electronic device 101 of FIG. 1 or may include other embodiments of the electronic device.

Referring to FIGS. 15A and 15B, the electronic device 600 may include a first housing 610, a second housing 620, and a third housing 630, which are disposed to be rotatable disposed with respect to each other. The first housing 610 and the second housing 620 may be connected to each other to be rotatable about a first rotation axis X1 via a first hinge structure 661. The second housing 620 and the third housing 630 may be connected to each other to be rotatable about a second rotation axis X2 via a second hinge structure 662. The first housing 610 and the second housing 620 may be operated in a first folding type (e.g., an out-folding type) via the first hinge structure 661. For example, when the first housing 610 and the second housing 620 are in the folded state, the display areas (e.g., a first display area DA1 and a second display area DA2), which are located on the respective housings 610 and 620, may be arranged to face away from each other to be visible from the outside. The second housing 620 and the third housing 630 may be operated in a second folding type (e.g., an in-folding type) via the second hinge structure 662. For example, when the second housing 620 and the third housing 630 are in the folded state, the display areas (e.g., the second display area DA2 and the third display area DA3), which are located on the respective housings 620 and 630)), may be disposed to face each other. The multi-foldable electronic device 600 may be operated in a state in which the first housing 610, the second housing 620, and the third housing 630 are at least partially unfolded. According to an embodiment of the disclosure, in the multi-foldable electronic device 600, only the first housing 610 and the second housing 620 may be operated in the folded state. According to another embodiment, the multi-foldable electronic device 600 may be operated in a state in which all of the first housing 610, the second housing 620, and the third housing 630 are in the folded state. In this case, the multi-foldable electronic device 600 may be folded such that, when viewed from above, the first housing 610, the second housing 620, and the third housing 630 overlap each other via the out-folding-type hinge structure 661 and the in-folding-type hinge structure 662. According to an embodiment, the first display area DA1 located on the first housing 610 may be disposed to face the outside of the electronic device to be visible to the user in the completely folded state.

The first housing 610 may include a first surface 611, a second surface 612 facing away from the first surface 611, and a first side member 613 surrounding at least a portion of the space between the first surface 611 and the second surface 612. The second housing 620 may include a third surface 621, a fourth surface 622 facing away from the third surface 621, and a second side member 623 surrounding at least a portion of the space between the third surface 621 and the fourth surface 622. The third housing 630 may include a fifth surface 631, a sixth surface 632 facing away from the fifth surface 631, and a third side member 633 surrounding at least a portion of the space between the fifth surface 631 and the sixth surface 632. The first housing 610, the second housing 620, and/or the third housing 630 may be at least partially made of a metal material or a non-metal material having rigidity of a level selected in order to support the flexible display 640. Portions corresponding to the first surface 611, the third surface 621, and the fifth surface 631 may be configured with a support plate (e.g., a support member or a support structure) for supporting the flexible display 640. According to an embodiment of the disclosure, when the first housing 610, the second housing 620, and/or the third housing 630 are made of a metal material, each of the side members 613, 623, and 633 may include conductive portions, which are at least partially electrically split from each other, and the split conductive portions may be operated as at least one antenna operating in a predetermined frequency band by being electrically connected to a wireless communication circuit. The second surface 612, the fourth surface 622, and the sixth surface 632 may be configured as portions of the first housing 610, the second housing 620, and the third housing 630, or may include a structurally coupled rear surface cover. The rear surface cover may be made of, for example, coated or colored glass, ceramic, polymer, metal (e.g., aluminum, stainless steel (STS), or magnesium), or a combination of at least two of these materials.

In the state in which the multi-foldable electronic device 600 is completely unfolded, the flexible display 640 may be located from the first surface 611 to at least a portion of the fifth surface 631 across the third surface 621. The flexible display 640 may include a first display area DA1 located on the first housing 610, a second display area DA2 located on the second housing 620, and a third display area DA3 located on the third housing 630. The display areas DA1, DA2, and DA3 may be transformed to face each other or face away from each other depending on the operation of the housings 610, 620, and 630.

The first housing 610 and the second housing 620 may be operated such that the second surface 612 corresponds to the fourth surface 622 in the folded state, and the first surface 611 and the third surface 621 are oriented in substantially the same direction in the unfolded state. In this case, the flexible display 640 may be disposed such that the first display area DA1 and the second display area DA2 are visible from the outside when the first housing 610 and the second housing 620 are in the folded state. The second housing 620 and the third housing 630 may be operated such that the third surface 621 and the fifth surface 631 correspond to each other in the folded state and are oriented in substantially the same direction in the unfolded state. In this case, the flexible display 640 may be disposed such that the second display area DA2 and the third display area DA3 correspondingly face each other when the second housing 620 and the third housing 630 are in the folded state.

According to an embodiment of the disclosure, the first hinge structure 661 may include a rail-type multi joint hinge module for operating the first housing 610 and the second housing 620 in an out-folding type. According to another embodiment, the first hinge structure 661 may include a general multi joint hinge module applied when the display is moved according to the out-folding operation of the first housing 610 and the second housing 620. For example, the multi joint module may include a single-axis, two-axis, or multi-axis hinge module. The second hinge structure 662 may include a two-axis hinge module and/or a single-axis hinge module for operating the second housing 620 and the third housing 630 in an in-folding type.

The multi-foldable electronic device 600 may include at least one electronic component disposed under at least a partial area of the flexible display 640 or exposed through an opening (e.g., a punch hole) provided in at least a portion of the flexible display 640. An area in which the flexible display 640 and at least one camera module 614 correspond to each other may be configured as a transmission area having a predetermined transmittance as a portion of a content display area. The transmission area may have a transmittance ranging from about 5% to about 20%. The transmission area may include an area overlapping the effective area (e.g., a view angle area) of the least one camera module 614 through which light imaged by an image sensor to generate an image passes. For example, the transmission area of the flexible display 640 may include an area having a lower pixel density than the periphery. The transmission area may replace the opening. The at least one electronic component may include at least one camera module 614 (e.g., a front surface module) exposed through the opening or the transmission area in the flexible display 640 and/or at least one sensor module 615 disposed on the rear surface of the flexible display 640 and configured to detect an external environment. The at least one camera module 614 may include an under-display camera (UDC). According to an embodiment of the disclosure, at least one camera module 614 may be disposed in the first display area DA1. According to another embodiment, the at least one camera module 614 may be disposed in the second display area DA2 and/or the third display area DA3. The at least one sensor module 615 may include at least one of a proximity sensor, an illuminance sensor, an iris recognition sensor, an ultrasonic sensor, a fingerprint recognition sensor, a distance detection sensor (TOF sensor), or an indicator. The at least one electronic component may be disposed in the second display area DA2 and/or the third display area DA3. The electronic device 600 may include a receiver 616 disposed through at least a portion of the first housing 610. Although not illustrated, the multi-foldable electronic device 600 may include an interface connector port, an ear jack hole, an external speaker module, an external card (SIM, UIM, or SD card) tray, or at least one key button disposed through the first housing 610, the second housing 620, and/or the third housing 630. The multi-foldable electronic device 600 may further include at least one camera module 656 (e.g., a rear camera module) disposed through the sixth surface 632 of the third housing 630 to be exposed to the outside in the folded state.

The flexible display 640 may include a first portion h1 located in at least a portion of the first housing 610, a second portion h2 located in at least a portion of the second housing 620, a third portion h3 interconnecting the first portion h1 and the second portion h2 and located in the first hinge structure 661, a fourth portion h4 located in at least a portion of the third housing 630, and a fifth portion h5 interconnecting the third portion h3 and the fourth portion h4 and located in the second hinge structure 662. The multi-foldable electronic device 600 may include a dielectric sheet 650 disposed to overlap the flexible display 640 in the inner space, and an array antenna AR disposed on the dielectric sheet 650 to form a beam pattern in a direction in which the flexible display 640 is oriented in the unfolded state. The dielectric sheet 650 may have substantially the same arrangement structure as the dielectric sheet 500 disposed in the flexible display 400 of FIG. 4. The dielectric sheet 650 may include a first area 6501 located at a position corresponding to the first portion h1, a second area 6502 located at a position corresponding to the second portion h2, a third area 6503 located at a position corresponding to the third portion h3, a fourth area 6504 located at a position corresponding to the fourth portion h4, and/or a fifth area 6505 located at a position corresponding to the fifth portion h5. The array antenna AR may have a structure similar to that of the array antenna AR1 of FIG. 8 and/or the array antenna AR2 of FIG. 12 described above.

The array antenna AR may be disposed on the first area 6501 corresponding to the first portion h1, the second area 6502 corresponding to the second portion h2, and/or the third area 6503 corresponding to the third part h3 in which the flexible display 640 is exposed to the outside even in the state in which the multi-foldable electronic device 600 is in the folded state through a first folding operation. The array antenna AR may include a first mesh pattern portion 510 and a second mesh pattern portion 520 disposed on the first area 6501 of the dielectric sheet 650, and a third mesh pattern portion 530 and/or a fourth mesh pattern portion 540 disposed on the third area 6503. Accordingly, when the multi-foldable electronic device 600 is in the unfolded state, the array antenna AR may form a beam pattern in a direction in which the flexible display 640 is oriented.

Figure 16A:
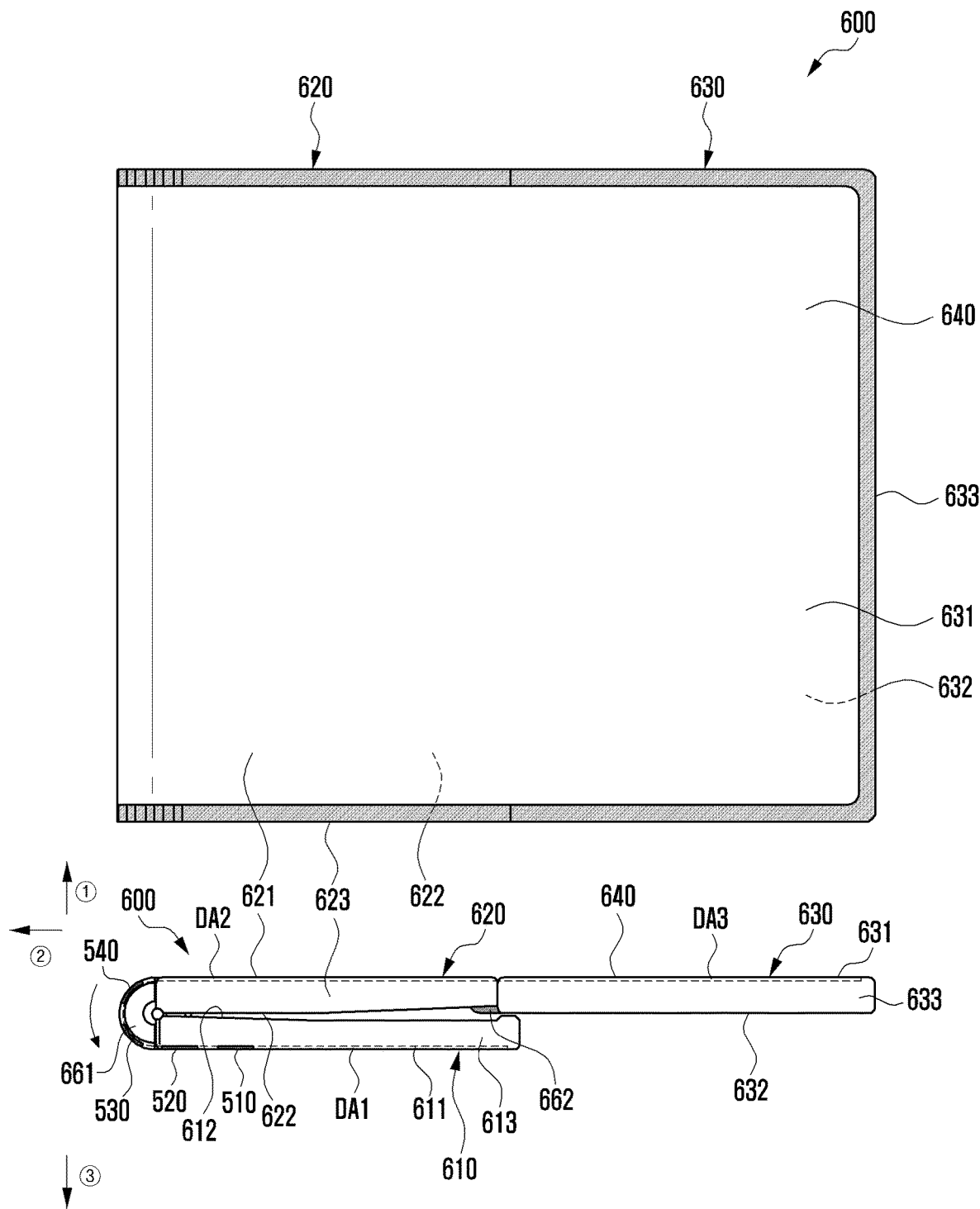
FIG. 16A is a view illustrating the arrangement of the array antenna when the multi-foldable electronic device is in a first folded state according to an embodiment of the disclosure.

FIG. 16A is a view illustrating the arrangement of the array antenna AR when the multi-foldable electronic device 600 is in a first folded state according to an embodiment of the disclosure.

Referring to FIG. 16A, a flexible display 640 of the multi-foldable electronic device 600 may be disposed such that, through a first folding operation (e.g., an out-folding operation) of the first housing 610 and the second housing 620, the first display area DA1 and the DA2 may be disposed to face away from each other to be visible from the outside.

In this case, in the unfolded state of the multi-foldable electronic device 600, the first mesh pattern portion 510 and the second mesh pattern portion 520, which have been oriented in the first direction (direction ①), may be shifted to be oriented in the third direction (direction ③) opposite to the first direction (direction ①) by the first housing 610 rotated 180 degrees via the first hinge structure 661. The positions of the third mesh pattern portion 530 and the fourth mesh pattern portion 540 disposed in the third area 6503 may be changed to be oriented in the second direction (direction ②) perpendicular to the first direction (direction ①). The phase values of the first mesh pattern portion 510 and the second mesh pattern portion 520 may be corrected such that a beam pattern is formed in the second direction (direction ②) in which the third mesh pattern portion 530 and the fourth mesh pattern portion 540 are oriented. In some embodiments, the phase values of the third mesh pattern portion 530 and the fourth mesh pattern portion 540 may be corrected such that a beam pattern is formed in the third direction (direction ③) in which the first mesh pattern portion 510 and the second mesh pattern portion 520 are oriented.

Figure 16B:
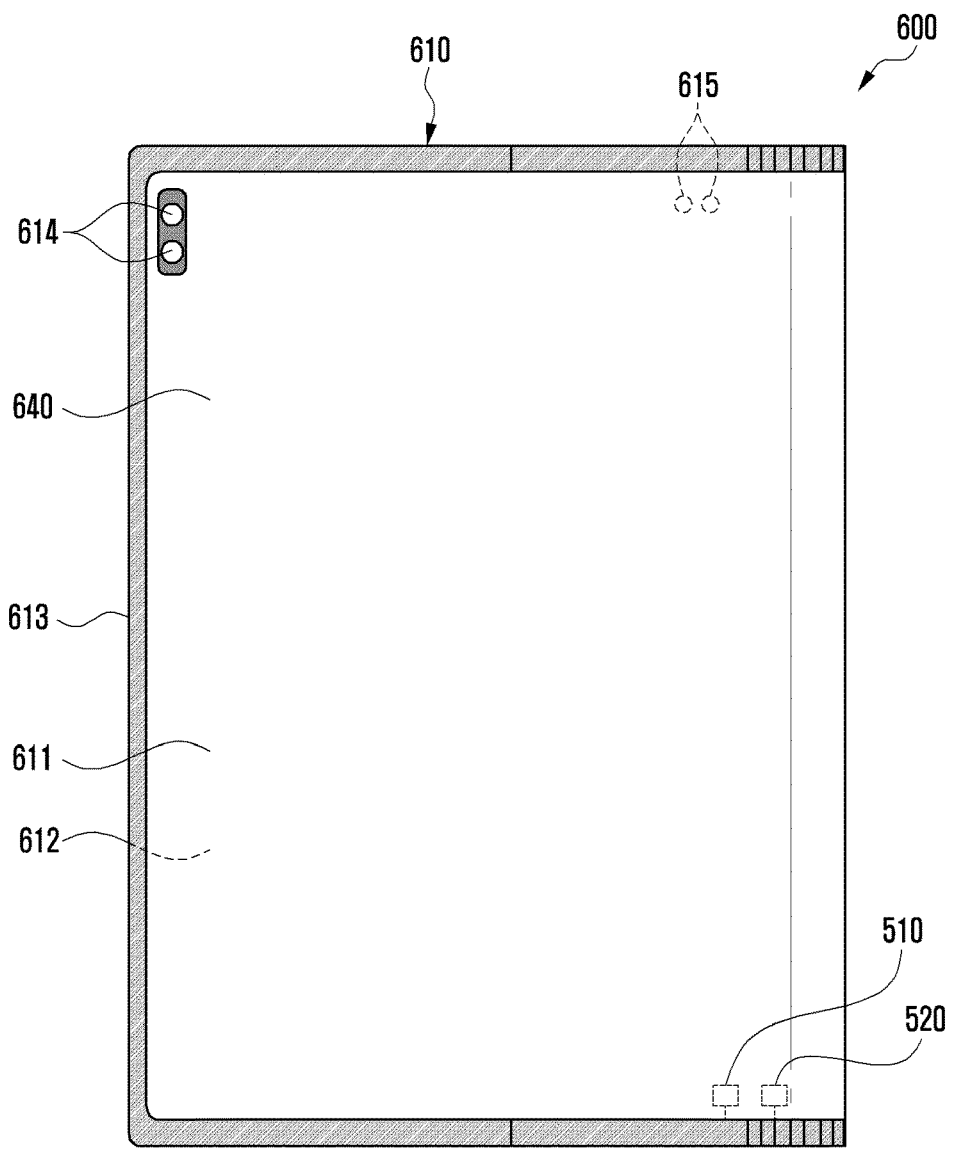
FIG. 16B is a view illustrating the arrangement of the array antenna when the multi-foldable electronic device is in a second folded state according to an embodiment of the disclosure.
Figure 16B:
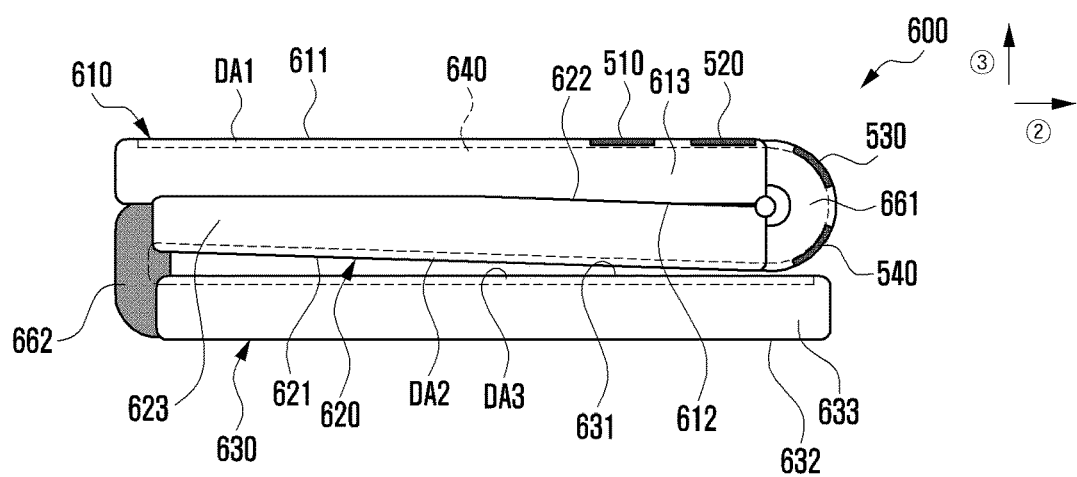

FIG. 16B is a view illustrating the arrangement of the array antenna AR when the multi-foldable electronic device 600 is in a second folded state according to an embodiment of the disclosure.

Referring to FIG. 16B, when the flexible display 640 of the multi-foldable electronic device 600 is in the folded state through the first folding operation, the second housing 620 and the third housing 630 may be disposed such that the first display area DA1 is visible from the outside through a second folding operation (e.g., an in-folding operation) of the second housing 620 and the third housing 630. The second display area DA2 and the third display area DA3 may be disposed in a folded state to face each other and to be substantially invisible from the outside.

When the multi-foldable electronic device 600 is in the second folded state, the first mesh pattern portion 510 and the second mesh pattern portion 520 may be disposed to be oriented in the third direction (direction ③), and the third mesh pattern portion 530 and the fourth mesh pattern portion 540 disposed in the third area 6503 may be disposed to be oriented in the second direction (direction ②) substantially perpendicular to the third direction (direction ③). The phase values of the third mesh pattern portion 530 and the fourth mesh pattern portion 540 may be corrected such that a beam pattern is concentrated in the third direction (direction ③) in which the first mesh pattern portion 510 and the second mesh pattern portion 520 are oriented. In some embodiments, the phase values of the first mesh pattern portion 510 and the second mesh pattern portion 520 may be corrected such that a beam pattern is concentrated in the second direction (direction ②) in which the third mesh pattern portion 530 and the fourth mesh pattern portion 540 are oriented.

According to an embodiment of the disclosure, the array antenna AR may be configured such that a beam pattern is concentrated in a predetermined direction between the second direction (direction ②) and the third direction (direction ③) by applying a corrected phase value to the first mesh pattern portion 510, the second mesh pattern portion 520, the third mesh pattern portion 530, and the fourth mesh pattern portion 540.

FIGS. 17A, 17B, 17C, and 17D are views each illustrating a state in which an array antenna in which at least one mesh pattern portion is replaced with dual pattern portions is applied to a dielectric sheet according to various embodiments of the disclosure.

The dual pattern portions illustrated in FIGS. 17A to 17D may be substantially the same as or similar to the dual pattern portions illustrated in FIG. 12 in arrangement structure.

Figure 17A:
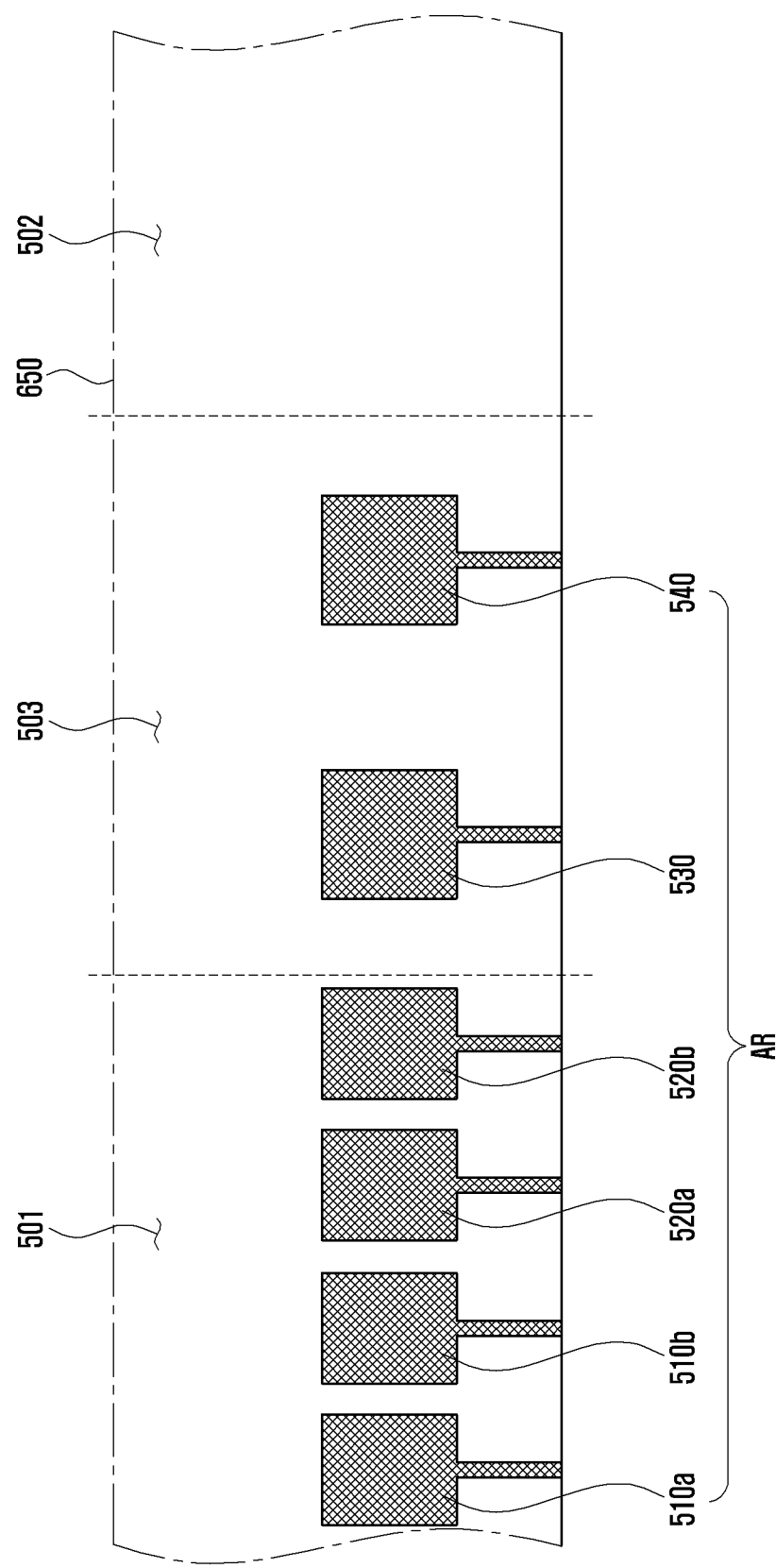
FIGS. 17A, 17B, 17C, and 17D are views each illustrating a state in which an array antenna in which at least one mesh pattern portion is replaced with dual pattern portions is applied to a dielectric sheet according to various embodiments of the disclosure.

Referring to FIG. 17A, the array antenna AR may include first dual pattern portions and third dual pattern portions disposed in the first area 501 (e.g., the first area 6501 of FIG. 15A) of the dielectric sheet 650, and a third mesh pattern portion 530 and/or a fourth mesh pattern portion 540 disposed in the third area 503 (e.g., the third area 6503 of FIG. 15A). The first dual pattern portions may include a first pattern portion 510a and a second pattern portion 510b. The third dual pattern portions may include a fifth pattern portion 520a and a sixth pattern portion 520b. For example, the first, second, fifth, and sixth pattern portions 510a, 510b, 520a, and 520b may be disposed to have a predetermined separation distance (e.g., the second distance d3 of FIG. 12) from each other. The fifth and sixth pattern portions 520a and 520b and the third mesh pattern portion 530 may be disposed to have another predetermined separation distance (e.g., the first separation distance d0 of FIG. 12). The size or area of the first, second, fifth, and sixth pattern portions 510a, 510b, 520a, and 520b may be smaller than that of the third mesh pattern portion 530 and/or the fourth mesh pattern portion 540. The first, second, fifth, and sixth pattern portions 510a, 510b, 520a, and 520b may support substantially the same frequency band as the third mesh pattern portion 530 and/or the fourth mesh pattern portion 540.

Figure 17B:
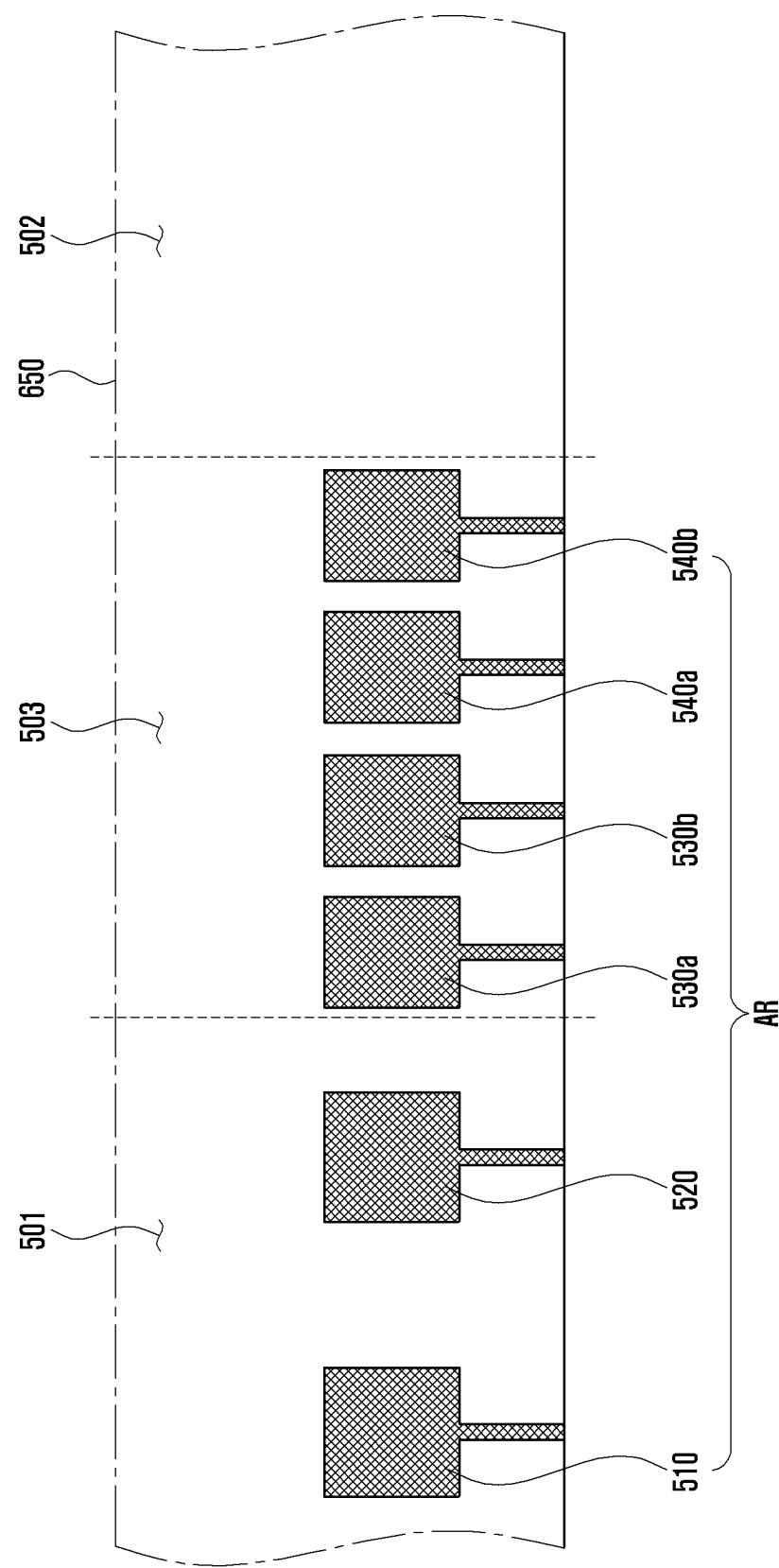

Referring to FIG. 17B, the array antenna AR may include a first mesh pattern portion 510 and a second mesh pattern portion 520 disposed in the first area 501 (e.g., the first area 6501 of FIG. 15A) of the dielectric sheet 650, and fourth dual pattern portions and/or second dual pattern portions disposed in the third area 503 (e.g., the third area 6503 of FIG. 15A). The fourth dual pattern portions may include a seventh pattern portion 530a and an eighth pattern portion 530b. The second dual pattern portions may include the second pattern portion 540a and the third pattern portion 540b. The seventh, eighth, second, and third pattern portions 530a, 530b, 540a, and 540b may be disposed to have a predetermined separation distance (e.g., the second distance d3 of FIG. 12) from each other. The seventh and eighth dual pattern portions 530a and 530b and the second mesh pattern portion 520 may be disposed to have another predetermined separation distance (e.g., the first separation distance d0 of FIG. 12).

Figure 17C:
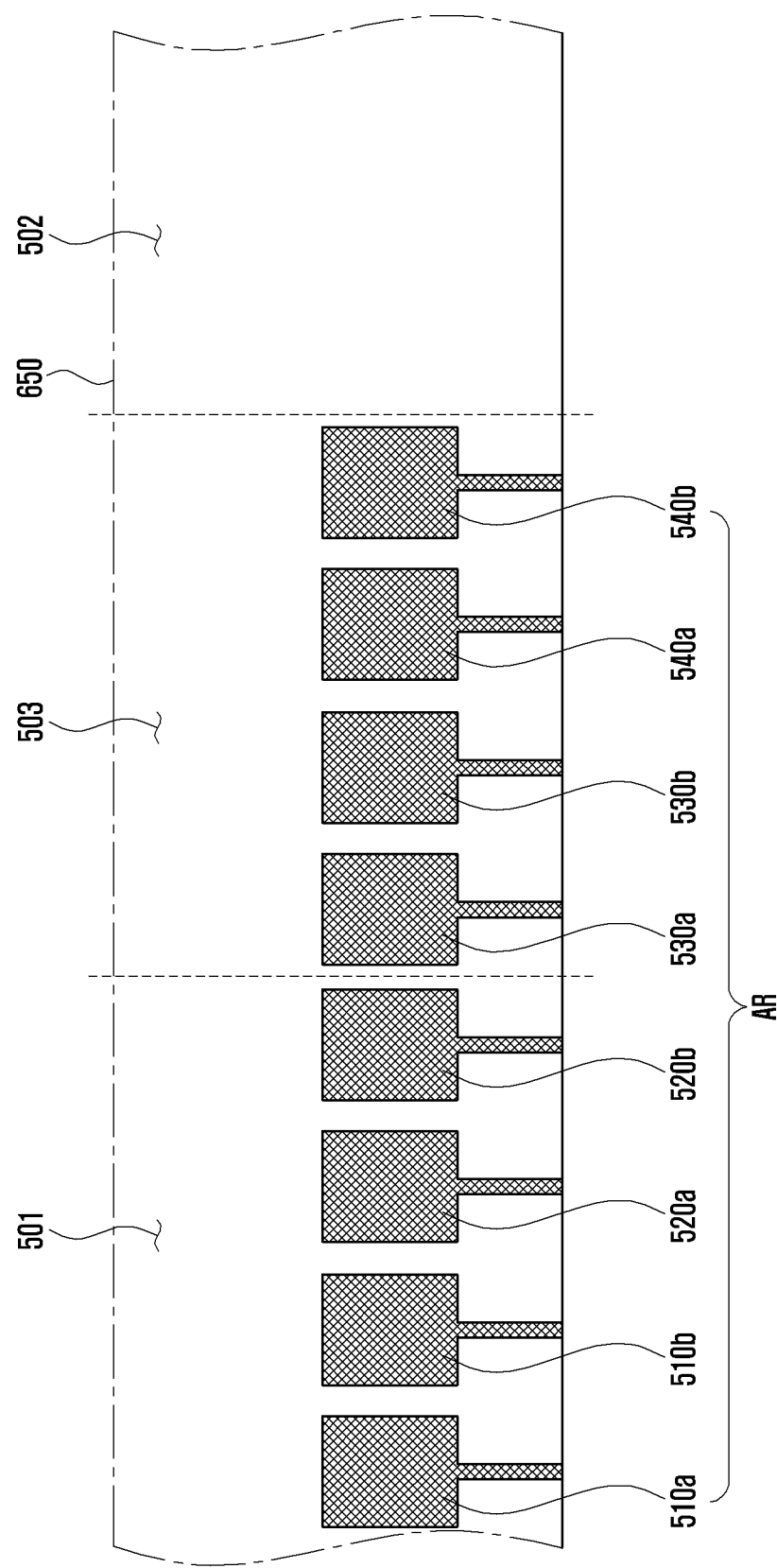

Referring to FIG. 17C, the array antenna AR may include first and second pattern portions 510a and 510b and fifth and sixth pattern portions 520a and 520b disposed in the first area 501 (e.g., the first area 6501 of FIG. 15A) of the dielectric sheet 650, and seventh and eighth pattern portions 530a and 530b and/or second and third pattern portions 540a and 540b disposed in the third area 503 (e.g., the third area 6503 of FIG. 15A). The first dual pattern portions may include a first pattern portion 510a and a second pattern portion 510b. The third dual pattern portions may include fourth pattern portion 520a and a fifth pattern portion 520b. The fourth dual pattern portions 530a and 530b may include seventh pattern portion 530a and eighth pattern portion 530b. The second dual pattern portions may include second pattern portion 540a and third pattern portion 540b. The first, second, third, fourth, fifth, sixth, seventh, and eighth pattern portions 510a, 510b, 540a, 540b, 520a, 520b, 530a, and 530b may be disposed to have a predetermined distance (e.g., the second separation distance d3 of FIG. 12) from each other. The first, second, third, fourth, fifth, sixth, seventh, and eighth pattern portions 510a, 510b, 540a, 540b, 520a, 520b, 530a, and 530b may have substantially the same size or area.

Figure 17D:
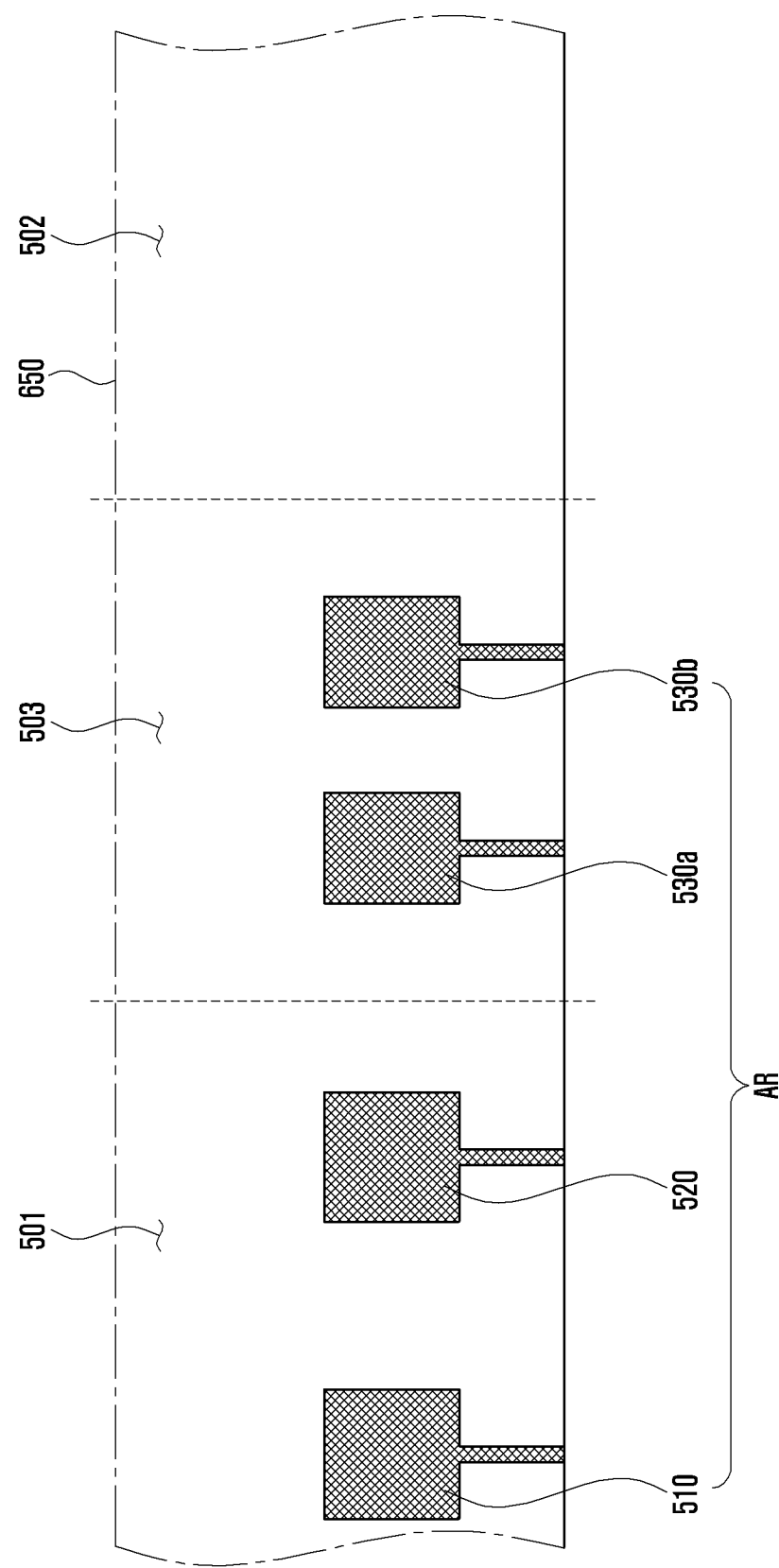

Referring to FIG. 17D, the array antenna AR may include a first mesh pattern portions 510 and a second mesh pattern portion 520 disposed in the first area 501 (e.g., the first area 6501 of FIG. 15A) of the dielectric sheet 650, and fourth dual pattern portions disposed in the third area 503 (e.g., the third area 6503 of FIG. 15A). According to an embodiment, the fourth dual pattern portions 530a and 530b may include seventh pattern portion 530a and eighth pattern portion 530b. The seventh pattern portion 530a and the eighth pattern portion 530b may be disposed to have a predetermined separation distance (e.g., the second separation distance d3 of FIG. 12) from each other. According to an embodiment, the seventh and eighth pattern portions 530a and 530b and the second mesh pattern portion 520 may be disposed to have another predetermined separation distance (e.g., the first separation distance d0 of FIG. 12).

Figure 18A:
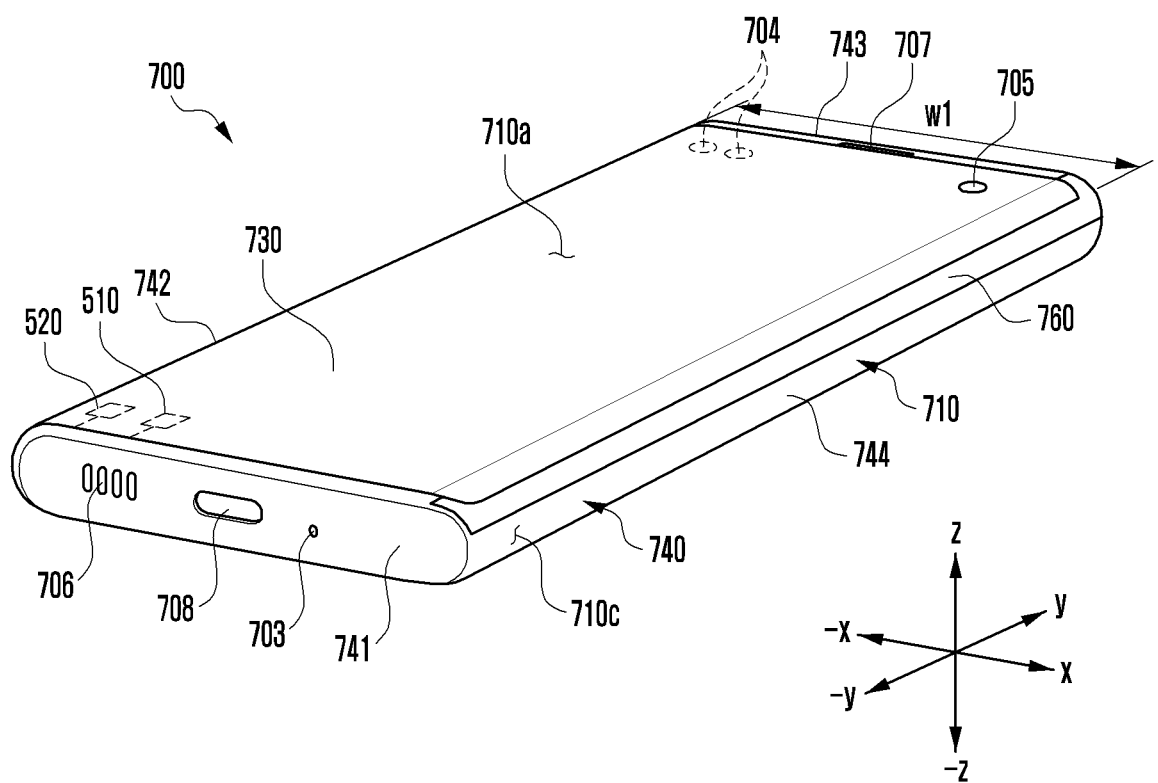
FIGS. 18A and 18B are front perspective views illustrating a slidable electronic device in a closed state and an opened state, respectively according to various embodiments of the disclosure.
Figure 18B:
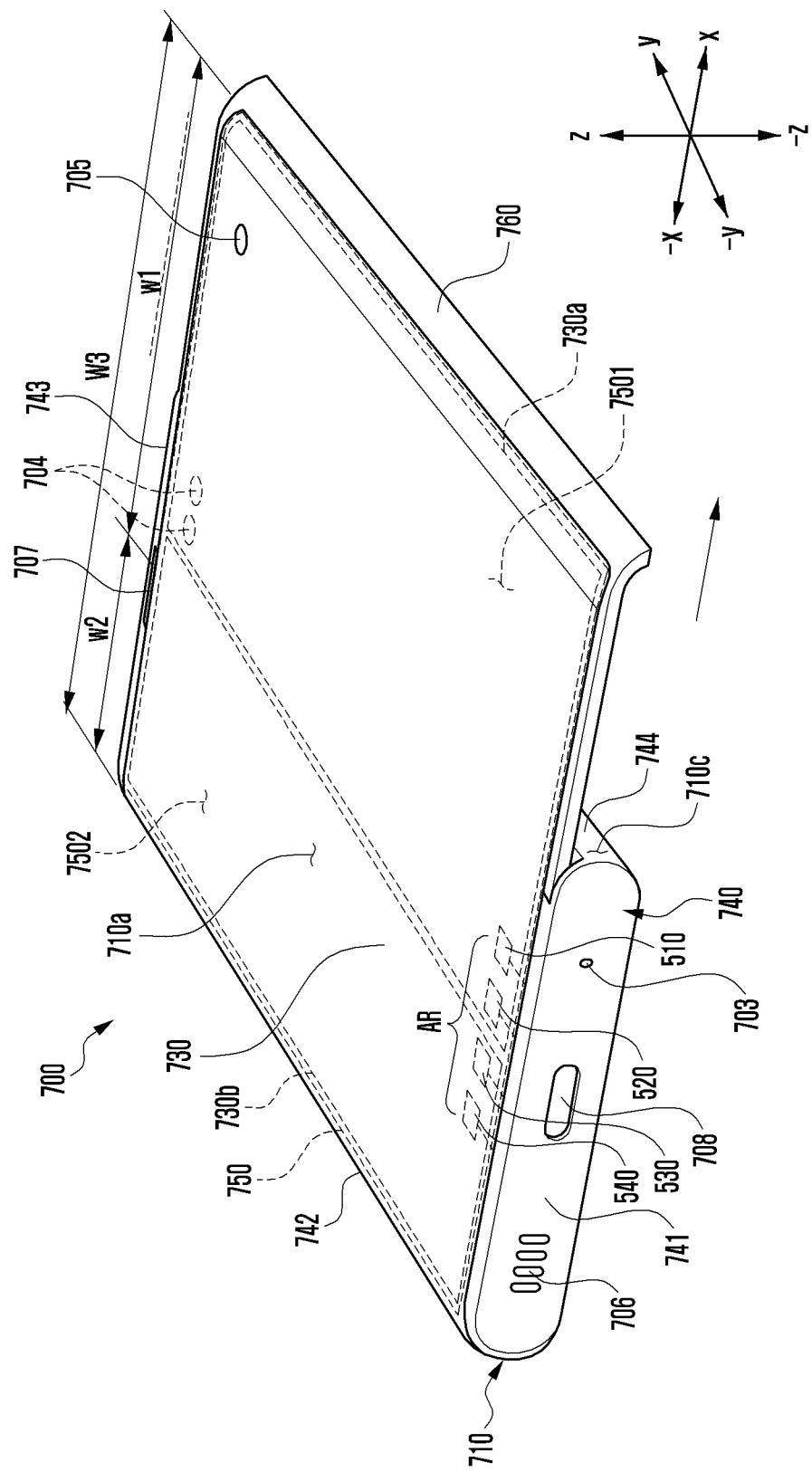

FIGS. 18A and 18B are front perspective views illustrating a slidable electronic device 700 in the closed state (slide-in state) and the opened state (slide-out state), respectively according to various embodiments of the disclosure.

Figure 19A:
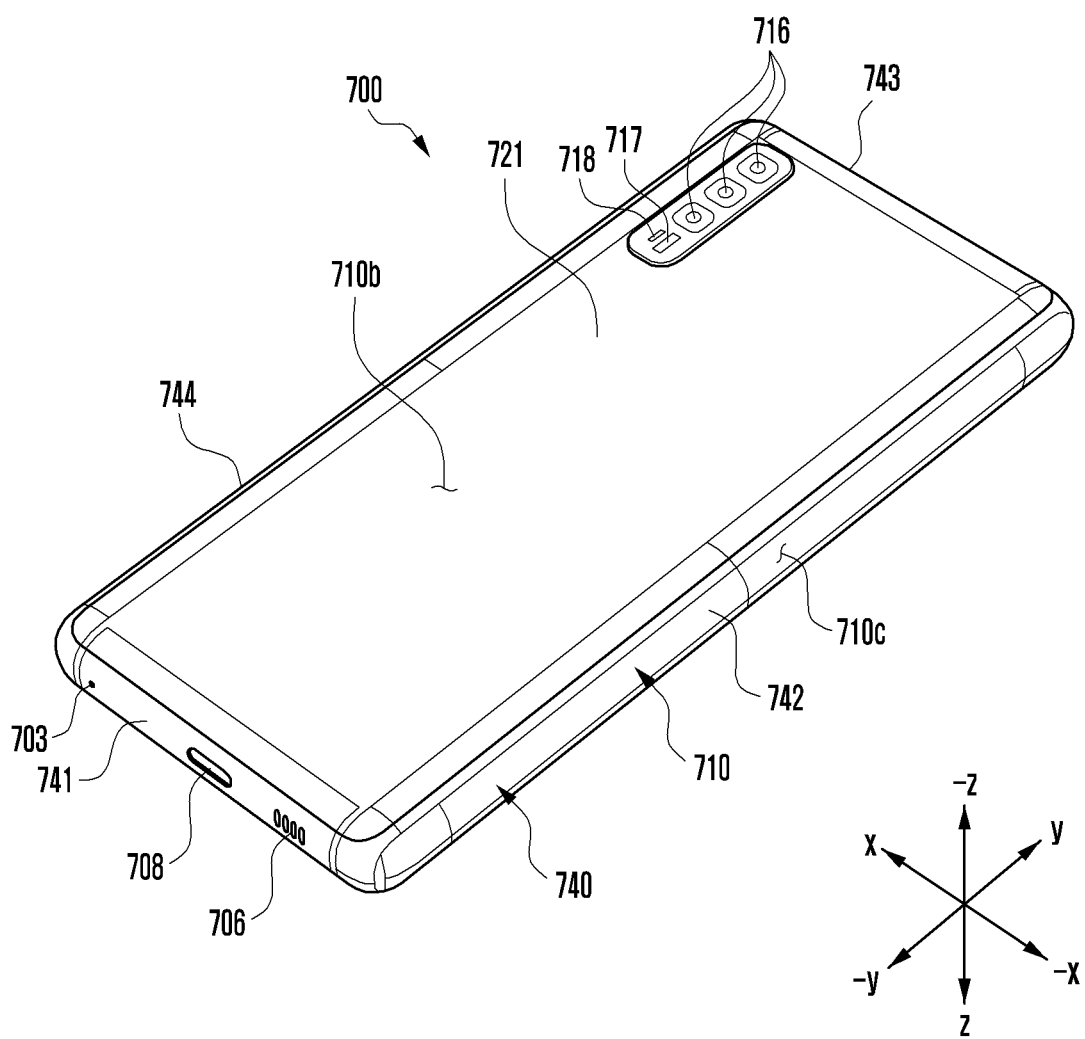
FIGS. 19A and 19B are rear perspective views illustrating a slidable electronic device in the closed state and the opened state, respectively according to various embodiments of the disclosure.
Figure 19B:
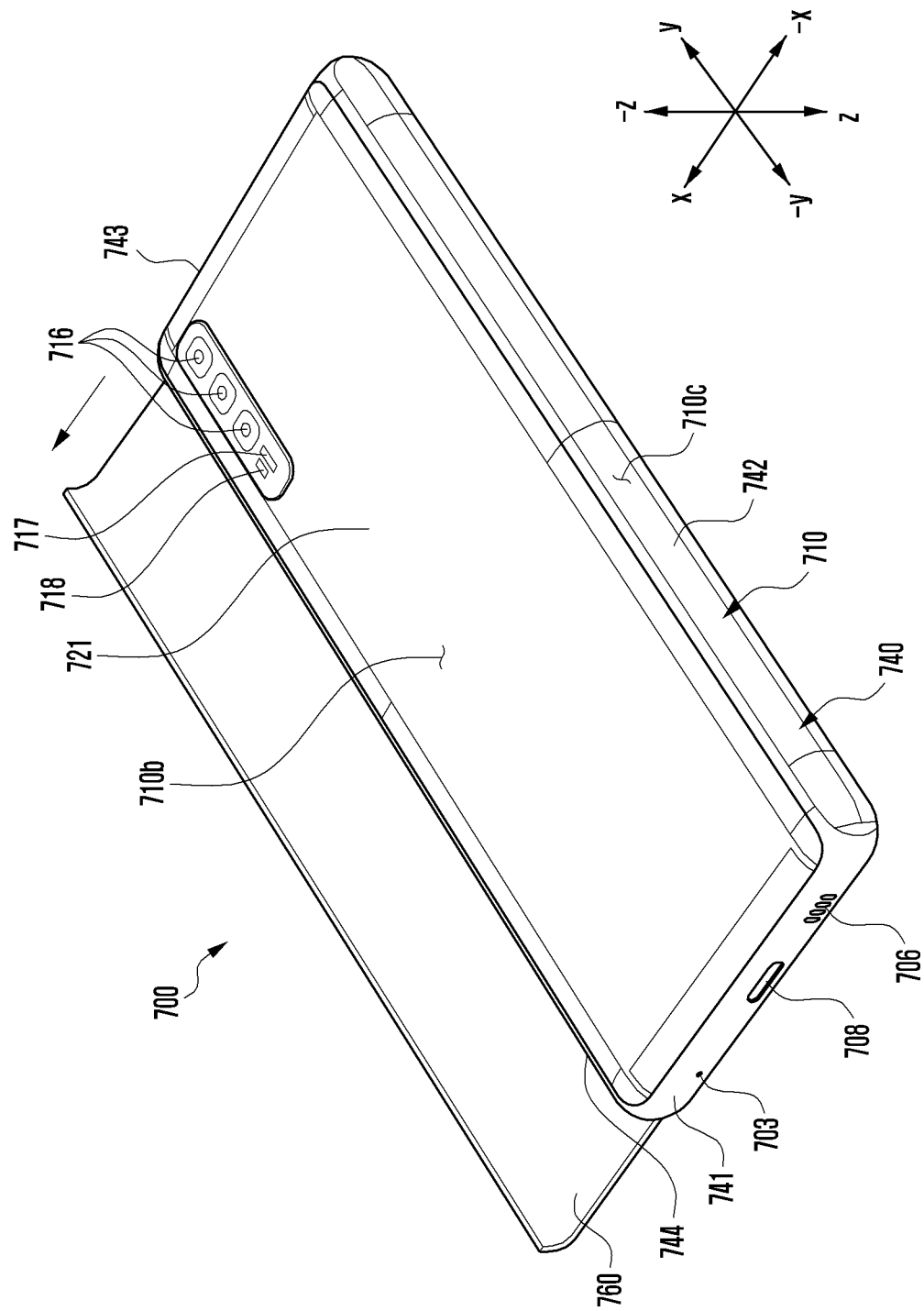

FIGS. 19A and 19B are rear perspective views of the slidable electronic device 700 in the closed state and the opened state, respectively according to various embodiments of the disclosure.

The slidable electronic device 700 of FIGS. 18A, 18B, 19A, and 19B may be at least partially similar to the electronic device 101 of FIG. 1, or may further include other embodiments of the slidable electronic device.

Referring to FIGS. 18A, 18B, 19A, and 19B, the slidable electronic device 700 may include a housing 710 (e.g., a housing structure), and a slide plate 760 coupled to be at least partially movable from the housing 710 and configured to support at least a portion of a flexible display 730. The slide plate 760 may include a bendable hinge rail (e.g., a multi-bar assembly) (not illustrated) coupled to an end of the slide plate 760 and configured to support at least a portion of the flexible display 730. For example, when the slide plate 760 performs a sliding operation in the housing 710, the hinge rail may be at least partially slid into the inner space of the housing 710 or slid out from the inner space while supporting the flexible display 730. The housing 710 (e.g., a housing structure) may include a front surface 710a (e.g., a first surface) oriented in a first direction (e.g., the z-axis direction), a rear surface 710b (e.g., a second surface) oriented in a second direction (e.g., the –z-axis direction) opposite to the first direction, and a side surface member 740 surrounding a space between the front surface 710a and the rear surface 710b and including a side surface 710c at least partially exposed to the outside. The rear surface 710b may be defined by a rear surface cover 721 coupled to the housing 710. The rear surface cover 721 may be made of, for example, polymer, coated or colored glass, ceramic, metal (e.g., aluminum, stainless steel (STS), or magnesium), or a combination of two or more of these materials. At least a portion of the side surface 710c may be disposed to be exposed to the outside through the housing 710. According to an embodiment, at least a portion of the slide plate 760 may configure at least a portion of the side surface 710c.

The side surface 740 may include a first side surface 741 having a first length, a second side surface 742 extending from the first side surface 741 in a direction perpendicular to the first side surface 741 and having a second length greater than the first length, a third side surface 743 extending from the second side surface 742 to be parallel to the first side surface 741 and having the first length, and a fourth side surface 744 extending from the third side surface 743 to be parallel to the second side surface 742 and having the second length. The slide plate 760 supports the flexible display 730 and may slide out from the second side surface 742 toward the fourth side surface 744 (e.g., the x-axis direction) to expand the display area of the flexible display 730, or slide in from the fourth side surface 744 toward the second side surface 742 (e.g., the –x-axis direction) to contract the display area of the flexible display 730.

The slidable electronic device 700 may include a flexible display 730 disposed to be supported by the slide plate 760. The flexible display 730 may include a first portion 730a supported by the slide plate 760 and a second portion 730b extending from the first portion 730a and supported by a hinge rails (not illustrated). The second portion 730b of the flexible display 730 may be disposed not to be exposed to the outside by being slid into the inner space of the housing 710 when the slidable electronic device 700 is in the closed state (e.g., the state in which the slide plate 760 is slid into the housing 710), and may extend from the first portion 730a to be exposed to the outside while being supported by the hinge rail when the slidable electronic device 700 is in the opened state (e.g., the state in which the slide plate 760 is slid out from the housing 710). The flexible display 730 may be configured to be bendable as a whole, and the first portion 730a may maintain the flat shape while being supported by the slide plate 760 in the opened state and the closed state of the slidable electronic device 700. The second portion 730b may provide a flat surface together with the first portion 730a in the opened state of the slidable electronic device 700, and may be bent in the closed state, thereby being slid into the inner space of the housing 710 and disposed not to be exposed to the outside.

The slide plate 760 may be coupled to be movable in a sliding manner so as to be at least partially slid into or slid out from the housing 710. For example, the slidable electronic device 700 may be configured to have a first width w1 from the second side surface 742 to the fourth side surface 744 in the closed state. In the opened state, the slidable electronic device 700 may have a third width W3 greater than a first width W1 by causing the hinge rail having a second width W2 inserted into the housing 710 to move to the outside of the housing 710. For example, the width of the second portion 730b may be the second width W2, and the width of the first portion 730a may be the first width W1.

According to an embodiment of the disclosure, the slide plate 760 may be operated through a user's manipulation. According to another embodiment, the slide plate 760 may be automatically operated by a driving mechanism disposed in the inner space of the housing 710. In this case, the slidable electronic device 700 may be configured to control the operation of the slide plate 760 via the driving mechanism when an event for shifting to the opened/closed state of the slidable electronic device 700 is detected via a processor (e.g., the processor 120 in FIG. 1).

The processor (e.g., the processor 120 of FIG. 1) of the slidable electronic device 700 may display objects in various ways and may perform control to execute an application to correspond to the changed display area of the flexible display 730 according to the opened state, the closed state, or the intermediate state of the slide plate 760.

The slidable electronic device 700 may include at least one of an input device 703, sound output devices 706 and 707, sensor modules 704 and 717, camera modules 705 and 716, a connector port 708, a key input device (not illustrated), or an indicator (not illustrated). At least one of the above-mentioned components may be omitted, or other components may be additionally included.

The input device 703 may include a microphone. In some embodiments, the input device 703 may include a plurality of microphones arranged to detect the direction of sound. The sound output devices 706 and 707 may include speakers. The sound output devices 706 and 707 may include an external speaker 706 and a phone call receiver 707. According to an embodiment of the disclosure, the sound output devices 706 and 707 may include a speaker that is operated without a separate speaker hole (e.g., a piezo speaker).

The sensor modules 704 and 717 may generate electrical signals or data values corresponding to the internal operating state of the slidable electronic device 700 or an external environmental state. The sensor modules 704 and 717 may include, for example, a first sensor module 704 (e.g., a proximity sensor or an illuminance sensor) disposed on the front surface of the slidable electronic device 700 and/or a second sensor module 717 (e.g., a heart rate monitor (HRM) sensor) disposed on the rear surface. The first sensor module 704 may be disposed under the flexible display 730 in the front surface 710a of the slidable electronic device 700. The first sensor module 704 or the second sensor module 717 may include at least one of a proximity sensor, an illuminance sensor, a time-of-flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

The camera modules 705 and 716 may include a first camera module 705 disposed on the front surface 710*a* of the slidable electronic device 700 and/or a second camera module 716 disposed on the rear surface 710*b*. The slidable electronic device 700 may include a flash 718 disposed in the vicinity of the second camera module 716. According to an embodiment, the camera modules 705 and 716 may include one or more lenses, an image sensor, and/or an image signal processor. The first camera module 705 may be disposed under the flexible display 730, and may be configured to photograph a subject through a portion of an active area of the flexible display 730.

An area in which the flexible display 730 and the first camera module 705 correspond to each other may be configured as a transmission area having a predetermined transmittance as a portion of a content display area. The transmission area may have a transmittance ranging from about 5% to about 20%. The transmission area may include an area overlapping an effective area (e.g., a field of view area) of the first camera module 705 through which light imaged by an image sensor to generate an image passes. For example, the transmission area of the flexible display 730 may include an area having a lower pixel density than the periphery. The transmission area may replace the opening.

The flash 718 may include, for example, a light-emitting diode or a xenon lamp. According to an embodiment of the disclosure, two or more lenses (e.g., a wide-angle lens and a telephoto lens) and image sensors may be disposed on one surface of the slidable electronic device 700. For example, the first camera module 705 may include an under-display camera (UDC).

The slidable electronic device 700 may include at least one antenna (not illustrated). The at least one antenna may wirelessly communicate with, for example, an external electronic device (e.g., the electronic device 104 in FIG. 1), or may wirelessly transmit/receive power required for charging. The antenna may include a legacy antenna, a mmWave antenna, a near-field communication (NFC) antenna, a wireless charging antenna, and/or a magnetic secure transmission (MST) antenna.

The housing 710 (e.g., a side surface frame) may be at least partially made of a conductive material (e.g., a metal material). The housing 710 may include a first side surface 741 and/or a third side surface 743, which may be made of a conductive material and may be divided into a plurality of conductive portions, which are electrically insulated from each other through a non-conductive material. The plurality of conductive portions may be electrically connected to a wireless communication circuit (e.g., the wireless communication module 192 of FIG. 1) disposed inside the slidable electronic device 700, thereby being used as antennas operating in various frequency bands.

The slidable electronic device 700 may include a dielectric sheet 750 disposed to at least partially overlap the flexible display 730 in the inner space thereof. The dielectric sheet 750 may have substantially the same size as the flexible display 730. In some embodiments, the dielectric sheet 750 may have a size smaller than that of the flexible display 730. The dielectric sheet 750 may include an array antenna AR (e.g., the array antenna AR1 of FIG. 8 or the array antenna AR of FIG. 12) disposed in at least a partial area thereof. According to an embodiment, the array antenna AR may include a first mesh pattern portion 510 and a second mesh pattern portion 520 disposed in a first area 7501 of the dielectric sheet 750 corresponding to a first portion 730*a* of the flexible display 730, and a third mesh pattern portion 530 and/or a fourth mesh pattern portion 540 disposed in a second area 7502 of the dielectric sheet 750 corresponding to a second portion 730*b* of the flexible display 730. When the slidable electronic device 700 is in the opened state, the first, second, third, and fourth mesh pattern portions 510, 520, 530, and 540 may all be disposed to be oriented in a direction (e.g., the z-axis direction) in which the flexible display 730 is oriented, and may form a beam pattern in a direction (e.g., the z-axis direction) in which the flexible display 730 is oriented. When the slidable electronic device 700 is in the closed state, the first mesh pattern portion 510 and the second mesh pattern portion 520 may be disposed to be oriented in a direction in which the flexible display 730 is oriented (e.g., the z-axis), and the third mesh pattern portion 530 and the fourth mesh pattern portion 540 are oriented in a direction (e.g., the −x axis direction) in which the second side surface 742 of the side member 740 is oriented. In this case, in order to form a beam pattern in the same direction (e.g., the z direction) as a beam pattern formed by the third mesh pattern portion 530 and the fourth mesh pattern portion 540, phase values corrected based on the phase value correction principle presented in FIG. 10 may be applied to the first mesh pattern portion 510 and the second mesh pattern portion 520. In some embodiments, in order to form a beam pattern in the same direction (e.g., the −x axis direction) as a beam pattern formed by the first mesh pattern portion 510 and the second mesh pattern portion 520, phase values corrected based on the phase value correction principle presented in FIG. 10 may be applied to the third mesh pattern portion 530 and the fourth mesh pattern portion 540.

Figure 20A:
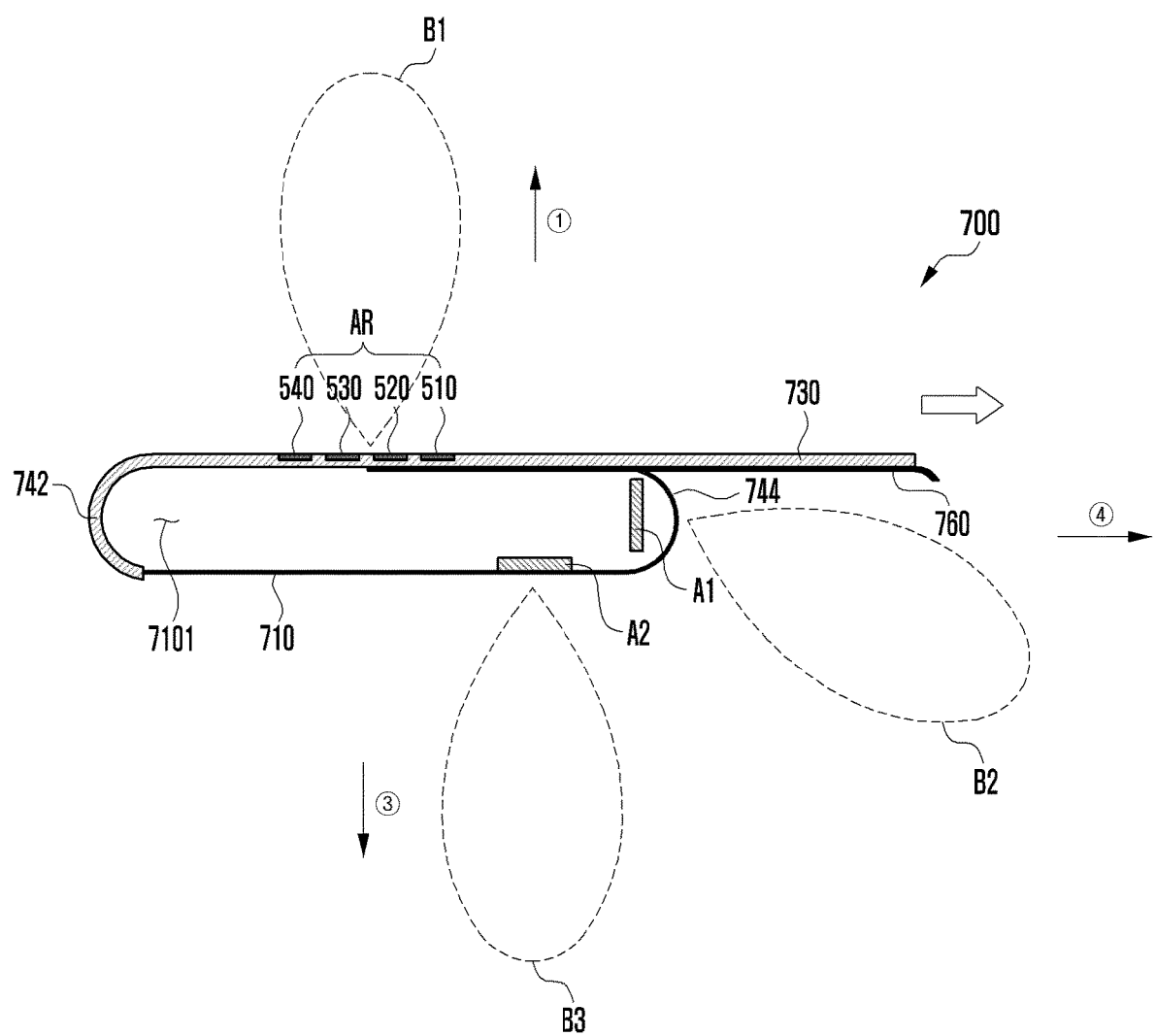
FIGS. 20A and 20B are views illustrating directions of beam patterns of an array antenna and antenna structures when a slidable electronic device is in an unfolded state and a folded state, respectively according to various embodiments of the disclosure.
Figure 20B:
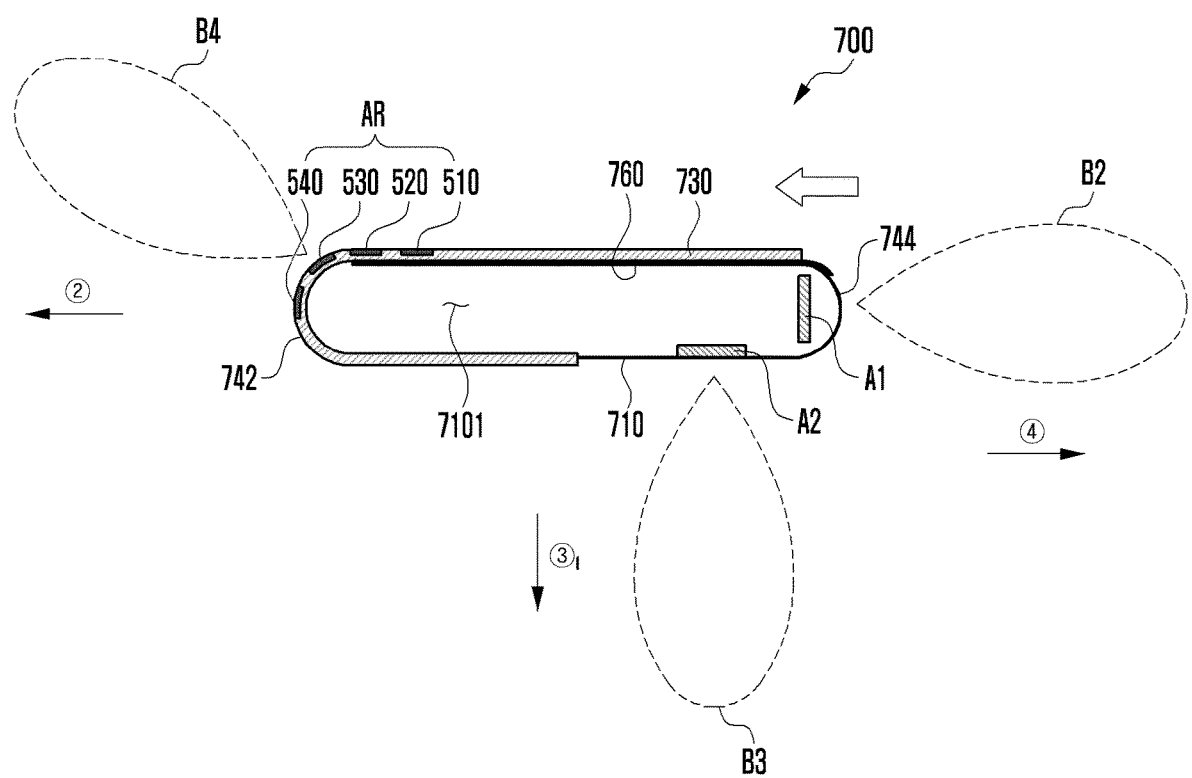

FIGS. 20A and 20B illustrate directions of beam patterns of an array antenna AR and antenna structures A1 and A2 when the slidable electronic device 700 is in the opened state and the closed state, respectively according to various embodiments of the disclosure.

Referring to FIGS. 20A and 20B, the array antenna AR is illustrated on a slide plate 760 for convenience of description, but the array antenna AR may have substantially the same arrangement as the array antenna AR described above with reference to FIG. 18A.

Referring to FIG. 20A, the slidable electronic device 700 may include a first antenna structure A1 and a second antenna structure A2 disposed in an inner space 7101 and/or an array antenna AR (e.g., the array antenna AR1 of FIG. 8 or the array antenna AR of FIG. 12) disposed on a dielectric sheet (e.g., the dielectric sheet 750 of FIG. 18B). The first antenna structure A1 and/or the second antenna structure A2 may include an array antenna including a plurality of antenna elements (e.g., conductive patches and/or conductive patterns) disposed on a substrate. The array antenna AR may include a first mesh pattern portion 510, a second mesh pattern portion 520, a third mesh pattern portion 530, and/or a fourth mesh pattern portion 540 disposed on a dielectric sheet (e.g., the dielectric sheet 750 of FIG. 18B). The first mesh pattern portion 510, the second mesh pattern portion 520, the third mesh pattern portion 530, and/or the fourth mesh pattern portion 540 may be spaced apart from each other by a predetermined interval.

According to various embodiments of the disclosure, the slidable electronic device 700 may secure excellent beam coverage by forming beam patterns in various directions via an array antenna AR including a first antenna structure A1, a second antenna structure A2, and/or a plurality of mesh pattern portions 510, 520, 530, and 540. For example, when the slidable electronic device 700 is in the opened state, the array antenna AR may form a beam pattern B1 in a first direction (direction ①) in which the flexible display (e.g., the flexible display 730 of FIG. 18A) is oriented. The first antenna structure A1 may form a beam pattern B2 in a fourth direction (direction ④) in which the fourth side surface 744 is oriented, and the second antenna structure A2 may form a beam pattern B3 in a third direction (direction ③) opposite to the first direction (direction ①).

Referring to FIG. 20B, when the slidable electronic device 700 is in the closed state, the first antenna structure A1 may form a beam pattern in the fourth direction (direction ④), and the second antenna structure A2 may form a beam pattern in the third direction (direction ③). When the second portion (e.g., the second portion 730b of FIG. 18B) of the flexible display (e.g., the flexible display 730 of FIG. 18A) is slid into the inner space 7101 of the slidable electronic device 700, the first mesh pattern portion 510 and the second mesh pattern portion 520 are oriented in the first direction (direction ①), and the third mesh pattern portion 530 and the fourth mesh pattern portion 540 are oriented in the second direction (direction ②) in which the second side surface 742 is oriented. Thus, beam patterns are dispersed, so that the radiation performance of the array antenna AR may be degraded. In this case, by applying a corrected phase value to the first mesh pattern portion 510 and the second mesh pattern portion 520 by using the phase value correction principle presented in FIG. 10, the array antenna AR may concentrate a beam pattern B4 in the second direction (direction ②). The array antenna AR may be configured such that a beam pattern (e.g., the beam pattern B1 of FIG. 20A) is concentrated in the first direction (direction ①) by applying a corrected phase value to the third mesh pattern portion 530 and the fourth mesh pattern portion 540. The array antenna AR may be configured such that a beam pattern is concentrated in a predetermined direction between the first direction (direction ①) and the second direction (direction ②) by applying a corrected phase value to the first mesh pattern portion 510, the second mesh pattern portion 520, the third mesh pattern portion 530, and the fourth mesh pattern portion 540.

Figure 21A:
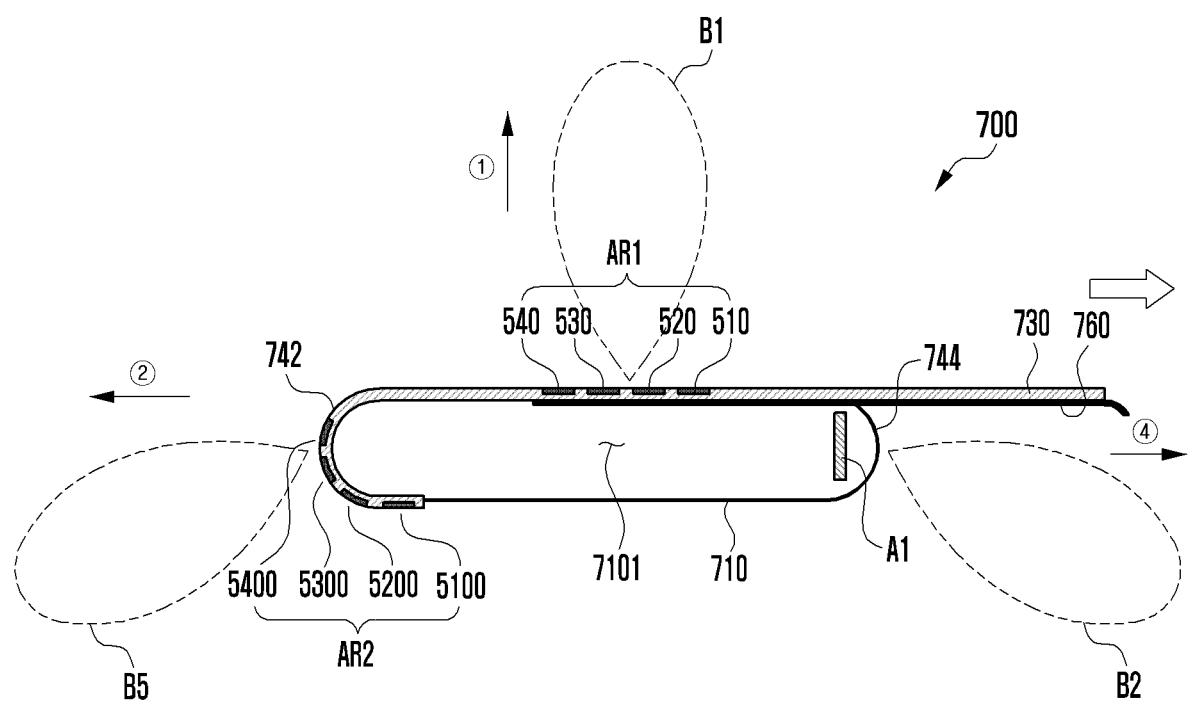
FIGS. 21A and 21B are views illustrating directions of beam patterns of array antennas and an antenna structure when a slidable electronic device is in the opened state and the closed state according to various embodiments of the disclosure.
Figure 21B:
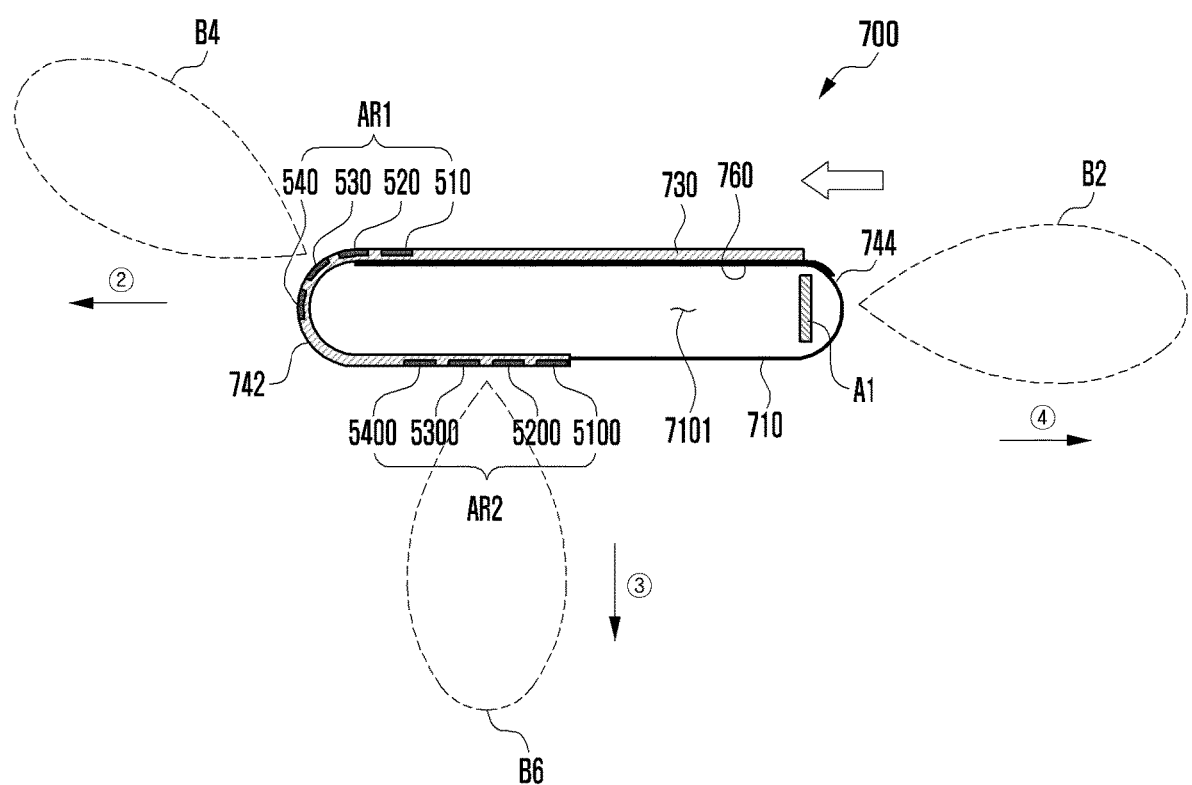

FIGS. 21A and 21B are views illustrating directions of beam patterns of array antennas AR1 and AR2 and an antenna structure A1 when the slidable electronic device 700 is in the opened state and the closed state, respectively according to various embodiments of the disclosure.

Referring to FIG. 21A, the slidable electronic device 700 may include a first array antenna AR1 (e.g., the array antenna AR1 of FIG. 8 or the array antenna AR of FIG. 12) disposed on a dielectric sheet (e.g., the dielectric sheet 750 of FIG. 18B), or a second array antenna AR2 (e.g., the array antenna AR1 of FIG. 8 or the array antenna AR of FIG. 12). The slidable electronic device 700 may include a first antenna structure A1 that is disposed in the inner space 7101 and forms a beam pattern in a fourth direction (direction ④) in which the fourth side surface 744 is oriented. The first array antenna AR1 may include a first mesh pattern portion 510, a second mesh pattern portion 520, a third mesh pattern portion 530, and/or a fourth mesh pattern portion 540 disposed on a dielectric sheet (e.g., the dielectric sheet 750 of FIG. 18B). The second array antenna AR2 may include a fifth mesh pattern portion 5100, a sixth mesh pattern portion 5200, a seventh mesh pattern portion 5300, and/or an eighth mesh pattern portion 5400 disposed on a dielectric sheet (e.g., the dielectric sheet 750 of FIG. 18B).

When the slidable electronic device 700 is in the opened state, the mesh pattern portions 510, 520, 530, and 540 of the first array antenna AR1 may be disposed to be oriented in the first direction (direction ① in which the flexible display (e.g., the flexible display 730 of FIG. 18A) is oriented. Accordingly, the first array antenna AR1 may form a beam pattern B1 in the first direction (direction ①). When the slidable electronic device 700 is in the opened state, the fifth mesh pattern portion 5100 and the sixth mesh pattern portion 5200 of the second array antenna AR2 may be disposed to be oriented in a third direction (direction ③) opposite to the first direction (direction ①), and the seventh mesh pattern portion 5300 and the eighth mesh pattern portion 5400 may be disposed to be oriented in a second direction (direction ②) in which the second side surface 742 is oriented. The second array antenna AR2 may be configured such that a beam pattern B5 is concentrated in the second direction (direction ②) by applying a corrected phase value to the fifth mesh pattern portion 5100 and the sixth mesh pattern portion 5200. The second array antenna AR2 may be configured such that a beam pattern is concentrated in the third direction (direction ③) by applying a corrected phase value to the seventh mesh pattern portion 5300 and the eighth mesh pattern portion 5400. The second array antenna AR2 may be configured such that a beam pattern is concentrated in a predetermined direction between the second direction (direction ②) and the third direction (direction ③) by applying a corrected phase value to the fifth mesh pattern portion 5100, the sixth mesh pattern portion 5200, the seventh mesh pattern portion 5300, and/or the eighth mesh pattern portion 5400.

Referring to FIG. 21B, in the case where the slidable electronic device is in the closed state, when the second portion (e.g., the second portion 730b of FIG. 18B) of the flexible display (e.g., the flexible display 730 of FIG. 18A) is slid into the inner space 7101 of the slidable electronic device 700, the first mesh pattern portion 510 and/or the second mesh pattern portion 520 are oriented in the first direction (direction ①), and the third mesh pattern portion 530 and/or the fourth mesh pattern portion 540 are oriented in the second direction (direction ②) in which the second side surface 742 is oriented. Thus, beam patterns are dispersed, so that the radiation performance of the first array antenna AR1 may be degraded. In this case, by applying a corrected phase value to the first mesh pattern portion 510 and/or the second mesh pattern portion 520 by using the phase value correction principle presented in FIG. 10, the first array antenna AR1 may concentrate a beam pattern B4 in the second direction (direction ②). The array antenna AR1 may be configured such that a beam pattern is concentrated in the first direction (direction ①) by applying a corrected phase value to the third mesh pattern portion 530 and the fourth mesh pattern portion 540. The second array antenna AR2 may be configured to form a beam pattern B6 in the third direction (direction ③) since all of the mesh pattern portions 5100, 5200, 5300, and 5400 are disposed to be oriented in the third direction (direction ③). In this case, a corresponding portion (e.g., a rear surface cover) of the housing 710 corresponding to the second array antenna AR2 may be made of a material that allows a beam pattern to pass therethrough (e.g., a dielectric material).

At least one array antenna AR, AR1, or AR2 may concentrate a beam pattern in a predetermined direction by the mesh pattern portions 510, 520, 530, 540, 5100, 5200, 5300, 5400 appropriately disposed in the first portion (e.g., the first portion 730a of FIG. 18B) and the second portion (e.g., the second portion 730b of FIG. 18B) of the flexible display (e.g., the flexible display 730 of FIG. 18A) and a corrected phase value applied to the at least one array antenna AR, AR1, or AR2, which may help prevent degradation of the radiation performance of the at least one array antenna AR, AR1, or AR2 and secure beam coverage.

Figure 22A:
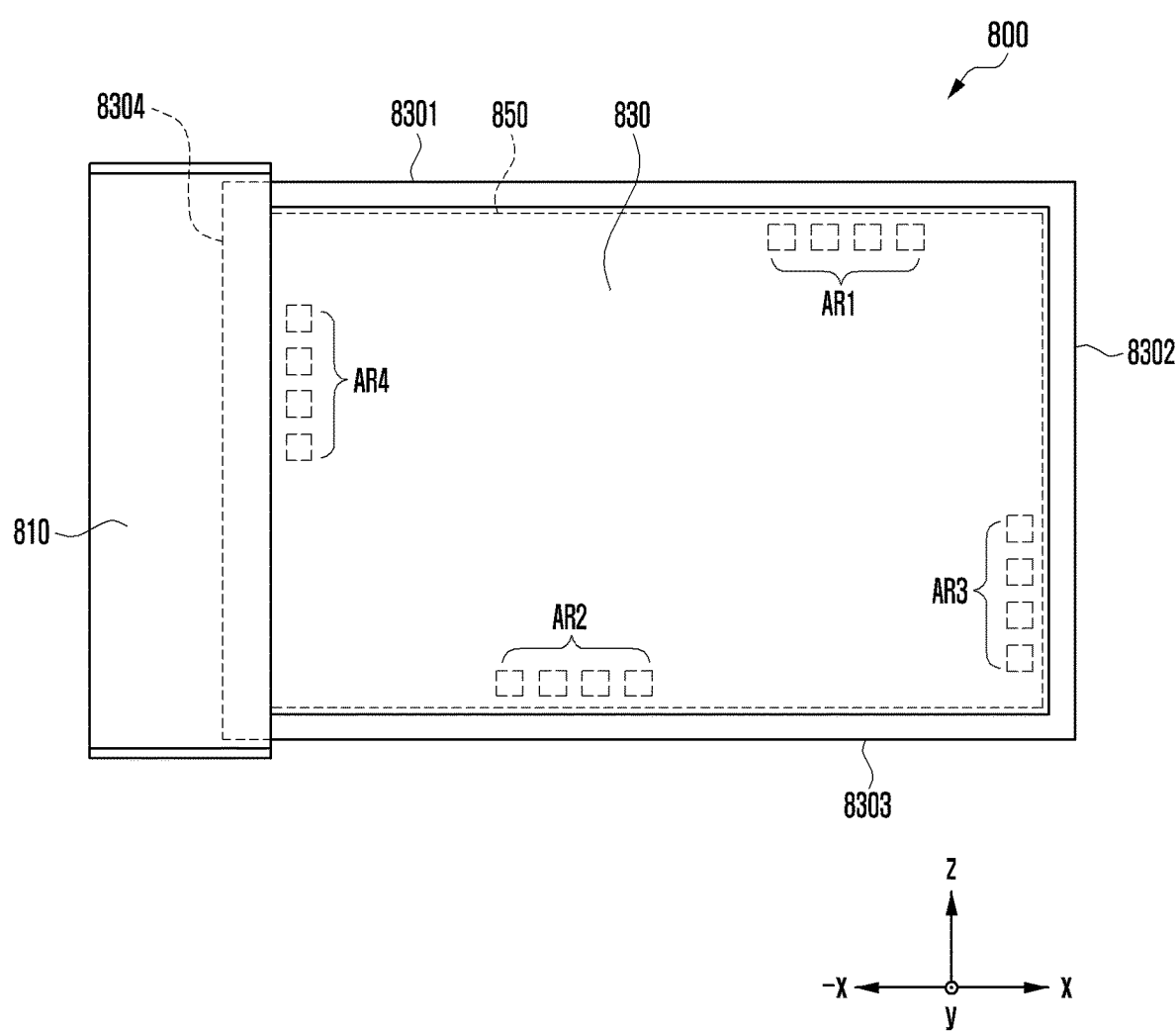
FIGS. 22A, 22B, and 22C are views of a rollable electronic device including a plurality of array antennas viewed from various directions according to various embodiments of the disclosure.
Figure 22B:
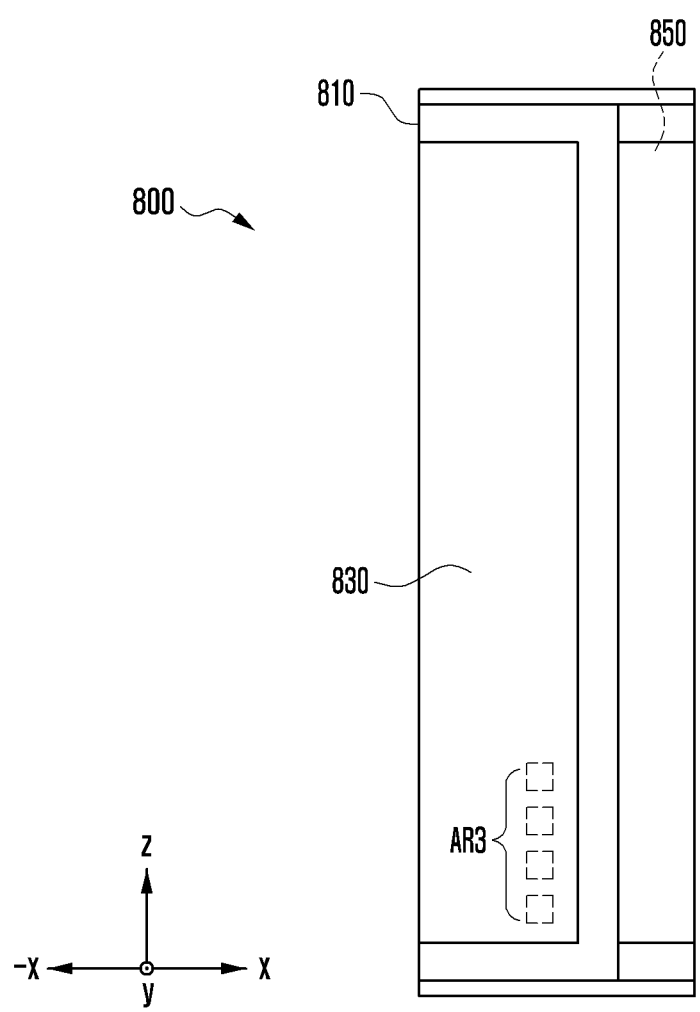
Figure 22C:
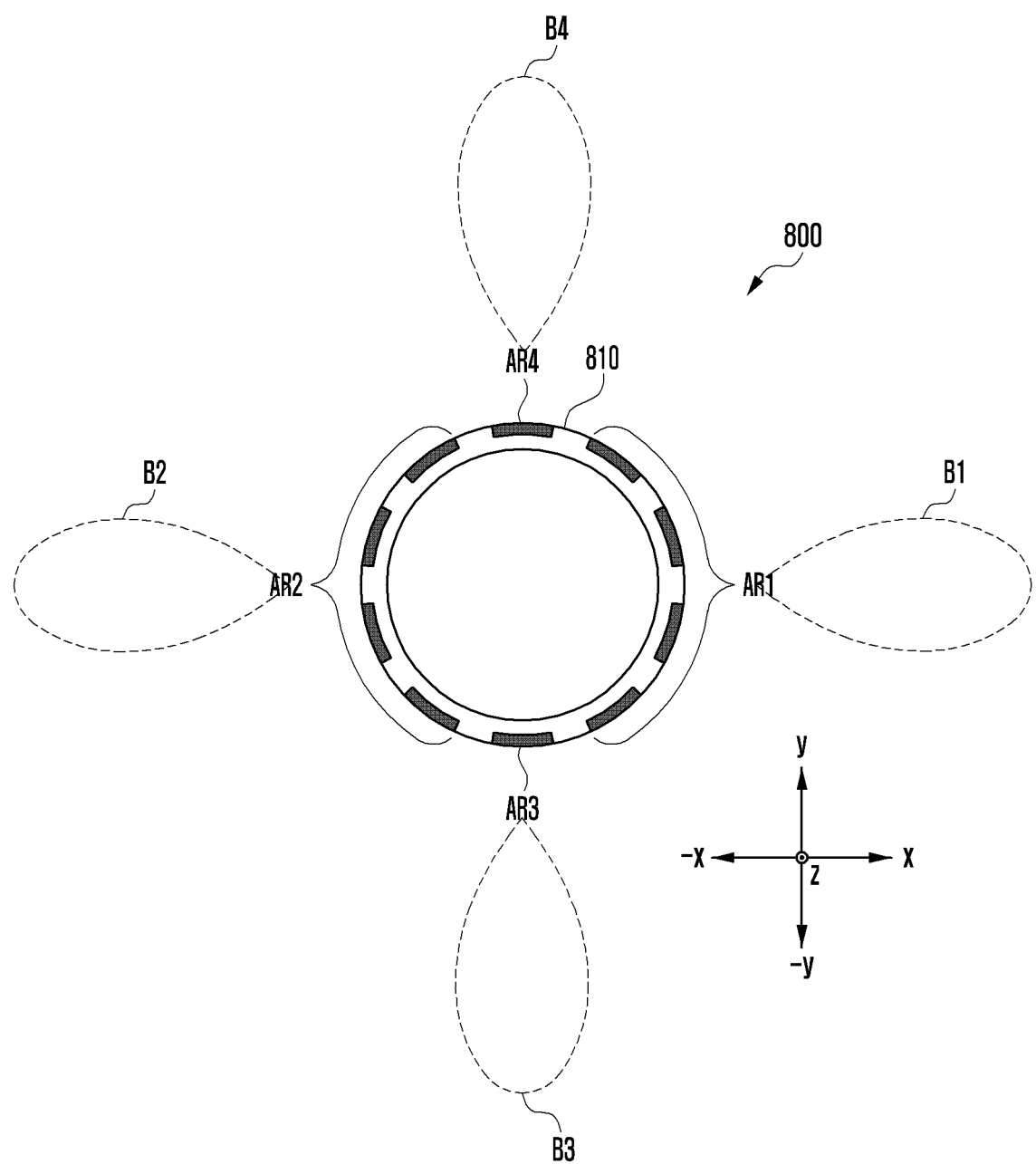

FIGS. 22A, 22B, and 22C are views of a rollable electronic device 800 including a plurality of array antennas AR1, AR2, AR3, and AR4 viewed from various directions, respectively according to various embodiments of the disclosure. FIG. 22A is a front view of the rollable electronic device 800 in the unrolled state, FIG. 22B is a front view of the rollable electronic device 800 in the rolled state, and FIG. 22C is a plan view corresponding to FIG. 22B.

The rollable electronic device 800 of FIGS. 22A and 22B may be at least partially similar to the electronic device 101 of FIG. 1 or may include other embodiments of the electronic device.

Referring to FIGS. 22A to 22C, the rollable electronic device 800 may include a housing 810, and a flexible display 830 that operates to be rolled through the housing 810 or unrolled from the housing 810. For example, the housing 810 may have a cylindrical shape. When in the rolled state, the flexible display 830 may be in close contact with the outer circumferential surface of the housing 810 and may be disposed to be visible from the outside. As another example, when in the rolled state, at least a portion of the flexible display 830 may be slid into the housing 810 and may be in the rolled state inside the housing 810, and another portion of the flexible display 830 may be disposed to be at least partially visible from the outside. The flexible display 830 may include a first edge 8301, a second edge 8302 extending from the first edge 8301 in a direction perpendicular to the first edge 8301 and located at the farthest distance from the housing 810 when in the unfolded state, a third edge 8303 extending from the second edge 8302 in parallel to the first edge 8301 and the second edge 8302, and a fourth edge 8304 fixed in the inner space of the housing 810.

The rollable electronic device 800 may include a dielectric sheet 850 disposed in the flexible display 830 and a plurality of array antennas AR1, AR2, AR3, and AR4 disposed on the dielectric sheet 850. As another example, one or more array antennas may be disposed on the dielectric sheet 850. The array antennas AR1, AR2, AR3, and AR4 may include a first array antenna AR1 disposed in a corresponding area of the dielectric sheet 850 near the first edge 8301 of the flexible display 830, a second array antenna AR2 disposed in a corresponding area of the dielectric sheet 850 near the third edge 8303, a third array antenna AR3 disposed in a corresponding area of the dielectric sheet 850 near the second edge 8302, and/or a fourth array antenna AR4 disposed in a corresponding area of the dielectric sheet 850 near the fourth edge 8304. The plurality of array antennas AR1, AR2, AR3, and AR4 may have substantially the same arrangement structure as the array antenna AR of FIG. 6, the array antenna AR1 of FIG. 8, and/or the array antenna AR of FIG. 12 including a plurality of mesh pattern portions (e.g., the mesh pattern portions 510, 520, 530, and 540) of FIG. 6. The plurality of array antennas AR1, AR2, AR3, and AR4 may be disposed near the edges 8301, 8303, 8302, and 8304 of the flexible display such that the mesh patterns thereof are arranged in a direction parallel to corresponding edges.

The plurality of array antennas AR1, AR2, AR3, and AR4 may be disposed at positions capable of forming beam patterns in different directions in the state in which the flexible display 830 is rolled. For example, in the rolled state, the first array antenna AR1 may be disposed to form a beam pattern B1 in the x-axis direction, the second array antenna AR2 may be disposed to form a beam pattern B2 in the −x-axis direction, the third array antenna AR3 may be disposed arranged to form a beam pattern B3 in the −y-axis direction, and the fourth array antenna AR4 may be disposed to form a beam pattern B4 in the y-axis direction.

Due to the curvature and/or shape of the dielectric sheet 850 rolled together with the flexible display 830 through the housing 810, the mesh pattern portions of the array antennas AR1, AR2, AR3, and AR4 may be located to be oriented in different directions, which may cause the degradation of radiation performance.

According to various embodiments of the disclosure, mesh pattern portions included in each of the array antennas AR1, AR2, AR3, and AR4 may be configured such that a beam pattern is concentrated in one direction by using the phase value correction principle presented in FIG. 10, which may help secure excellent radiation performance and beam coverage.

Figure 23:
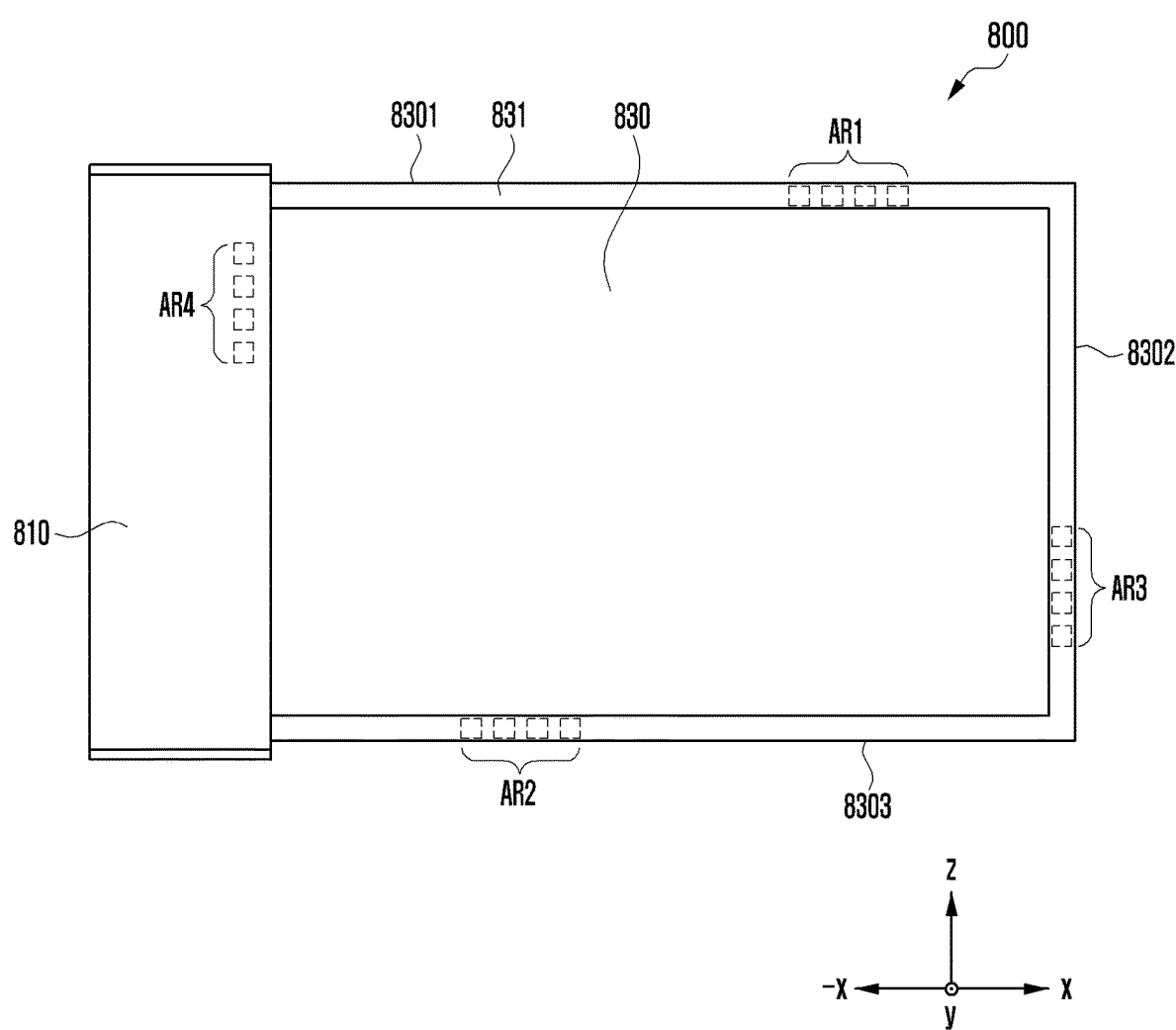
FIG. 23 is a view illustrating a configuration of a rollable electronic device including a plurality of array antennas according to an embodiment of the disclosure.

FIG. 23 is a view illustrating a configuration of a rollable electronic device 800 including a plurality of array antennas AR1, AR2, AR3, and AR4 according to an embodiment of the disclosure.

Referring to FIG. 23, the plurality of array antennas AR1, AR2, and AR3 may be disposed in peripheral area 831 (e.g., a non-active area and/or a bezel area) of the flexible display 830 located near the edges 8301, 8302 and 8303, rather than on a dielectric sheet (e.g., the dielectric sheet 850 of FIG. 22A). In this case, since the fourth array antenna AR4, which is difficult to be disposed near the fourth edge 8304 located inside the housing 810, may be directly disposed on the outer surface of the housing 810 and/or in the inner space of the housing 810. For example, in the rolled state, the fourth array antenna AR4 may be disposed at a position where a beam pattern may be formed in a direction different from the direction of a beam pattern formed by each of the first array antenna AR1, the second array antenna AR2, or the third array antenna AR3.

Figure 24A:
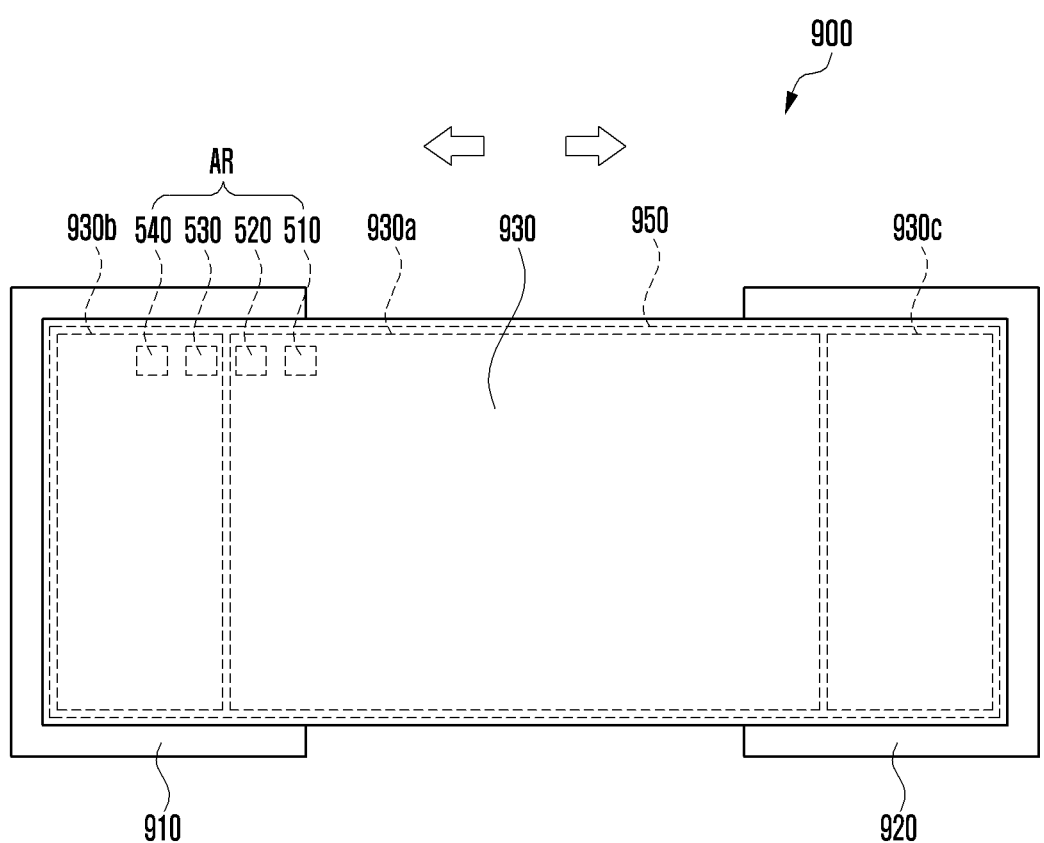
FIGS. 24A and 24B are front and rear views of a bi-directional rollable electronic device in an unrolled state according to various embodiments of the disclosure.
Figure 24B:
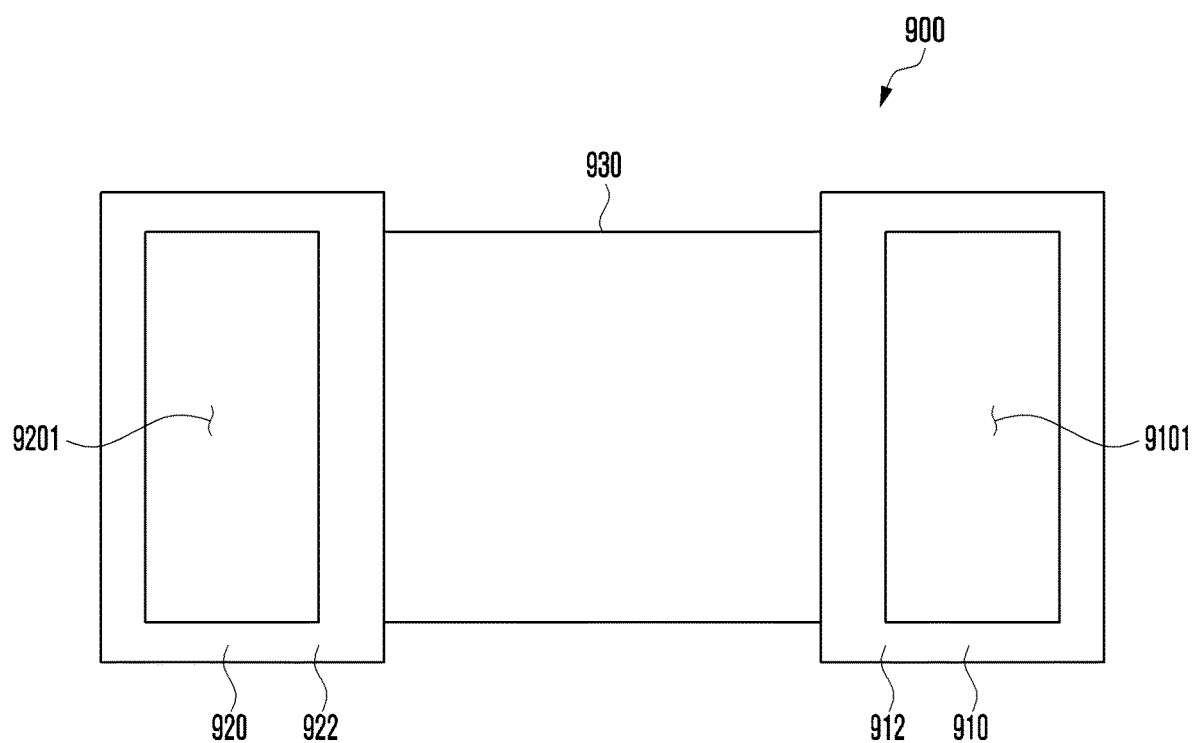

FIGS. 24A and 24B are front and rear views of a bi-directional rollable electronic device 900 in the unrolled state according to various embodiments of the disclosure.

Figure 25A:
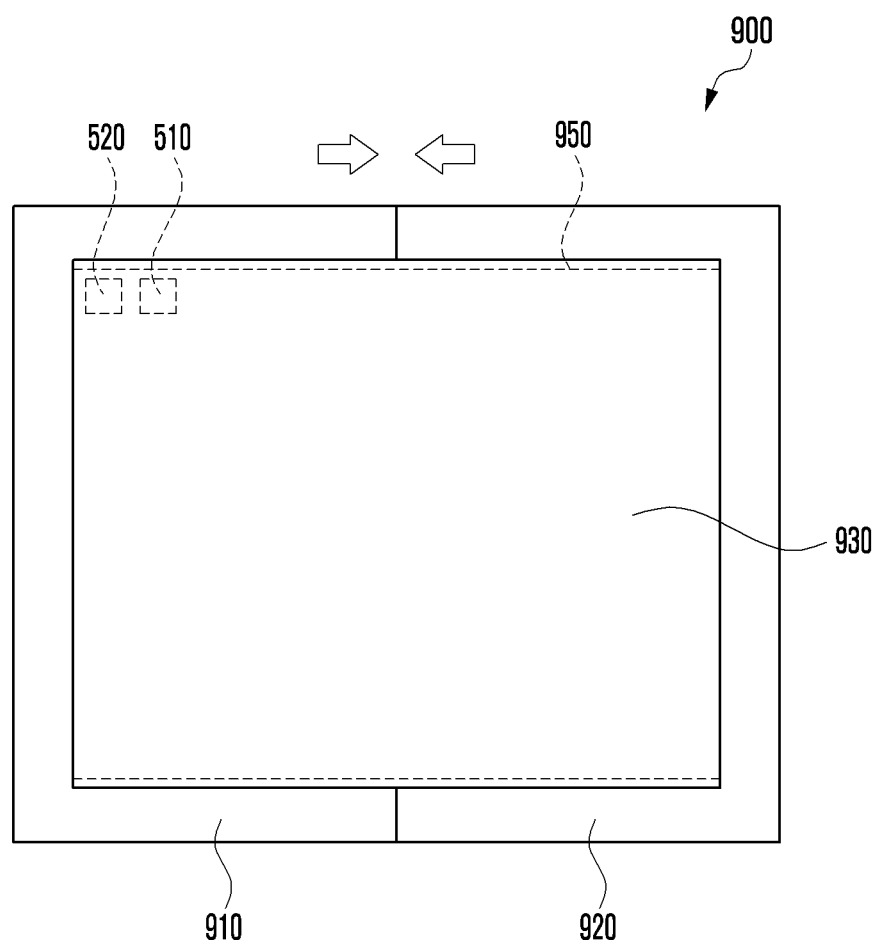
FIGS. 25A and 25B are front and rear views of the bi-directional rollable electronic device viewed from the front and rear sides when in a rolled state according to various embodiments of the disclosure.
Figure 25B:
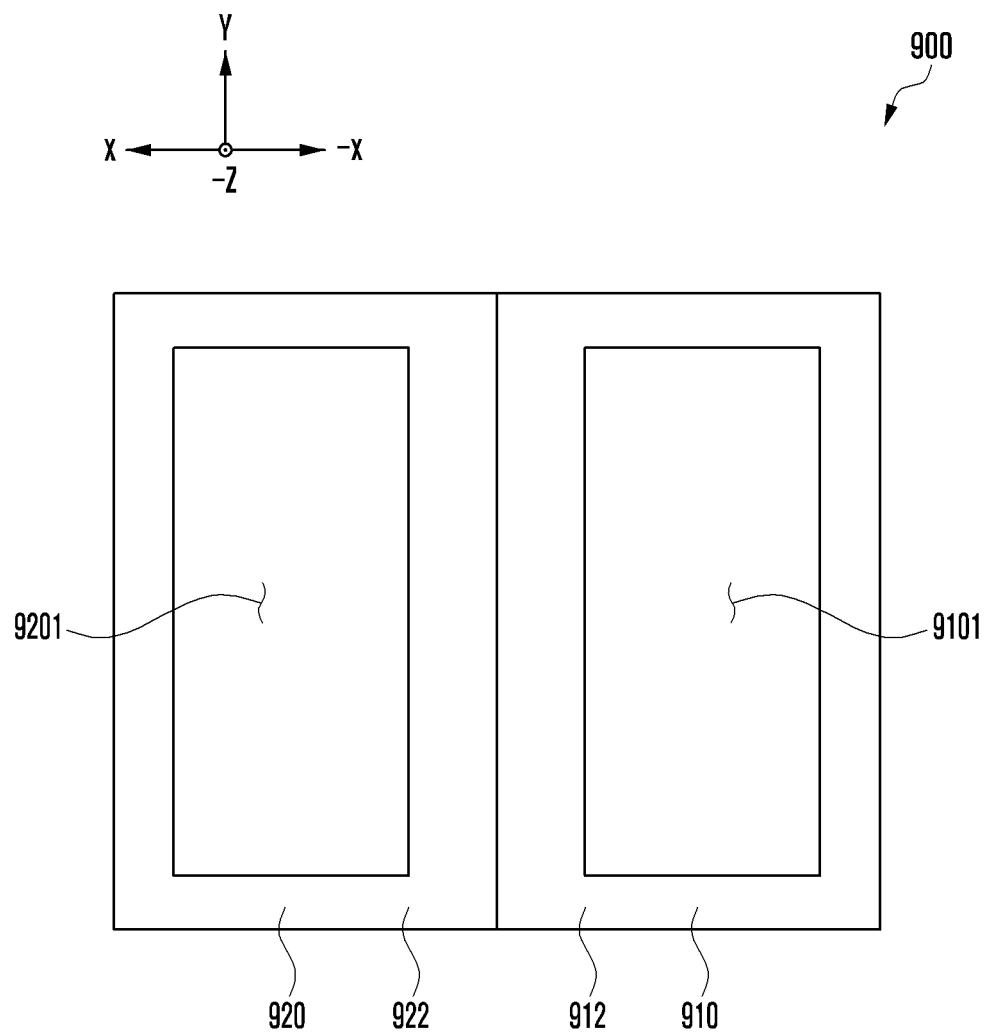

FIGS. 25A and 25B are front and rear views of the bi-directional rollable electronic device 900 in the rolled state according to various embodiments of the disclosure.

The bi-directional rollable electronic device 900 of FIGS. 24A, 24B, 25A, and 25B may be at least partially similar to the electronic device 101 of FIG. 1 or may include other embodiments of the electronic device.

Referring to FIGS. 24A, 24B, 25A, and 25B, the electronic device 900 may include a first housing 910, a second housing 920 disposed to have a predetermined distance from the first housing 910, and a flexible display 930 disposed to be at least partially supported by the first housing 910 and the second housing 920. Positions of the first housing 910 and the second housing 920 may be changed to have a predetermined separation distance depending on an operating state. For example, in the unrolled state (e.g., the opened state), the first housing 910 and the second housing 920 are connected via the flexible display 930 and may be spaced apart from each other. According to an embodiment, in the rolled state (e.g., the rolled state or the closed state), the first housing 910 and the second housing 920 may be coupled to face each other. In this case, the first housing 910 and/or the second housing 920 may have coupling structures to be coupled to each other.

In the rolled state, the flexible display 930 may include a flat portion 930a disposed to be visible from the outside, a first bendable portion 930b extending from the other side of the flat portion 930a and slid into the first housing 910, and/or a second bendable portion 930c extending from the other side of the flat portion 930a and slide into the second housing 920. In the electronic device 900, as the separation distance between the first housing 910 and the second housing 920 increases in the unrolled state, the first bendable portion 930b and/or the second bendable portion 930c may be at least partially exposed to the outside along with the flat portion 930a, so that the display area may be expanded. In the rolled state, at least a portion of the first bendable portion 930b may be disposed to be visible from the outside through a first opening 9101 provided in the rear surface 912 of the first housing 910, and at least a portion of the second bendable portion 930c may also be disposed to be visible from the outside through a second opening 9201 provided in the rear surface 922 of the second housing 920.

The electronic device 900 may include a dielectric sheet 950 disposed to at least partially overlap the flexible display 930. The dielectric sheet 950 may include an array antenna AR (e.g., the array antenna AR1 of FIG. 8 or the array antenna AR of FIG. 12) including a plurality of mesh pattern portions 510, 520, 530, and 540. When the flexible display 930 is viewed from above, the array antenna AR may include a first mesh pattern portion 510 and/or a second mesh pattern portion 520 disposed in an area overlapping the flat portion 930a of the dielectric sheet 950, and may include a third mesh pattern portion 530 and/or a fourth mesh pattern portion 540 disposed in an area overlapping the first bendable portion 930b. In the unrolled state, the first mesh pattern portion 510, the second mesh pattern portion 520, the third mesh pattern portion 530, and/or the fourth mesh pattern portion 540 may form a beam pattern in a direction in which the flexible display 930 is oriented (e.g., the z-axis direction), as the array antenna AR. In the rolled state, the first mesh pattern portion 510 and/or the second mesh pattern portion 520 may be disposed to form a beam pattern in a direction (the z-axis direction) in which the flat portion 930a of the flexible display 930 is oriented, and the third mesh pattern portion 530 and the fourth mesh pattern portion 540 may be disposed to form a beam pattern in a direction (the −x-axis direction) in which the side surface of the first housing 910 is oriented through the first opening 9101.

In some embodiments, the array antenna AR may be disposed to at least partially form a beam pattern through the second opening 9201 of the second housing 920 so that the second housing 920 is capable of operating in substantially the same manner as the first housing 910 described above.

In the rolled state, the third mesh pattern portion 530 and the fourth mesh pattern portion 540 are disposed in a direction (the −x axis direction) in which the side surface of the first housing 910 is oriented, and the array antenna AR may be configured such that a beam pattern is concentrated in a direction (the −x-axis direction) in which the side surface of the first housing 910 is oriented, a direction (the z-axis direction) in which the flat portion 930a of the flexible display 930 is oriented, and/or a predetermined direction by applying a corrected phase value to at least some mesh pattern portions by using the phase value correction principle of FIG. 10.

Figure 26A:
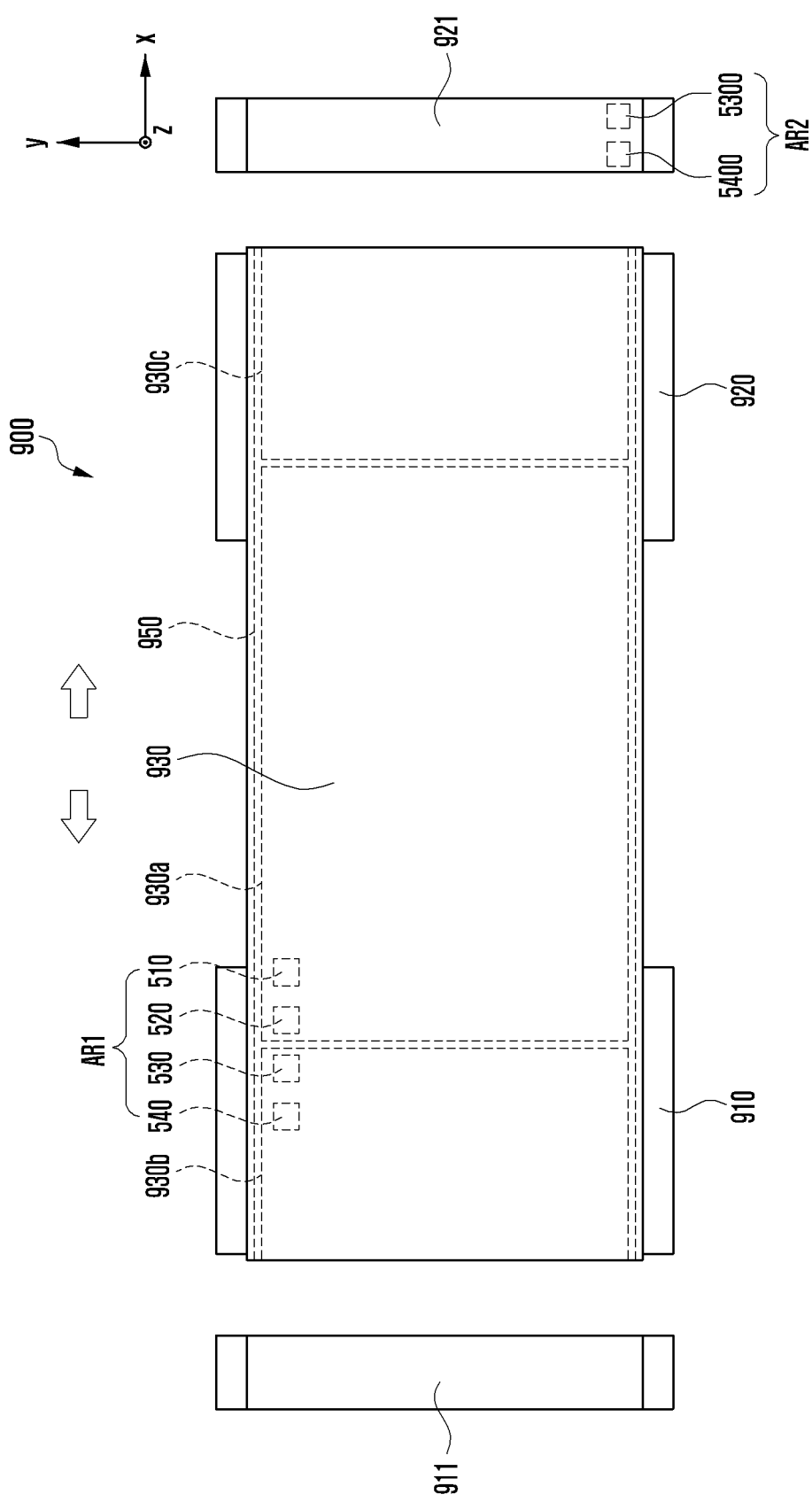
FIGS. 26A and 26B are front and rear views of a bi-directional rollable electronic device viewed from the front and rear sides when in an unrolled state according to various embodiments of the disclosure.
Figure 26B:
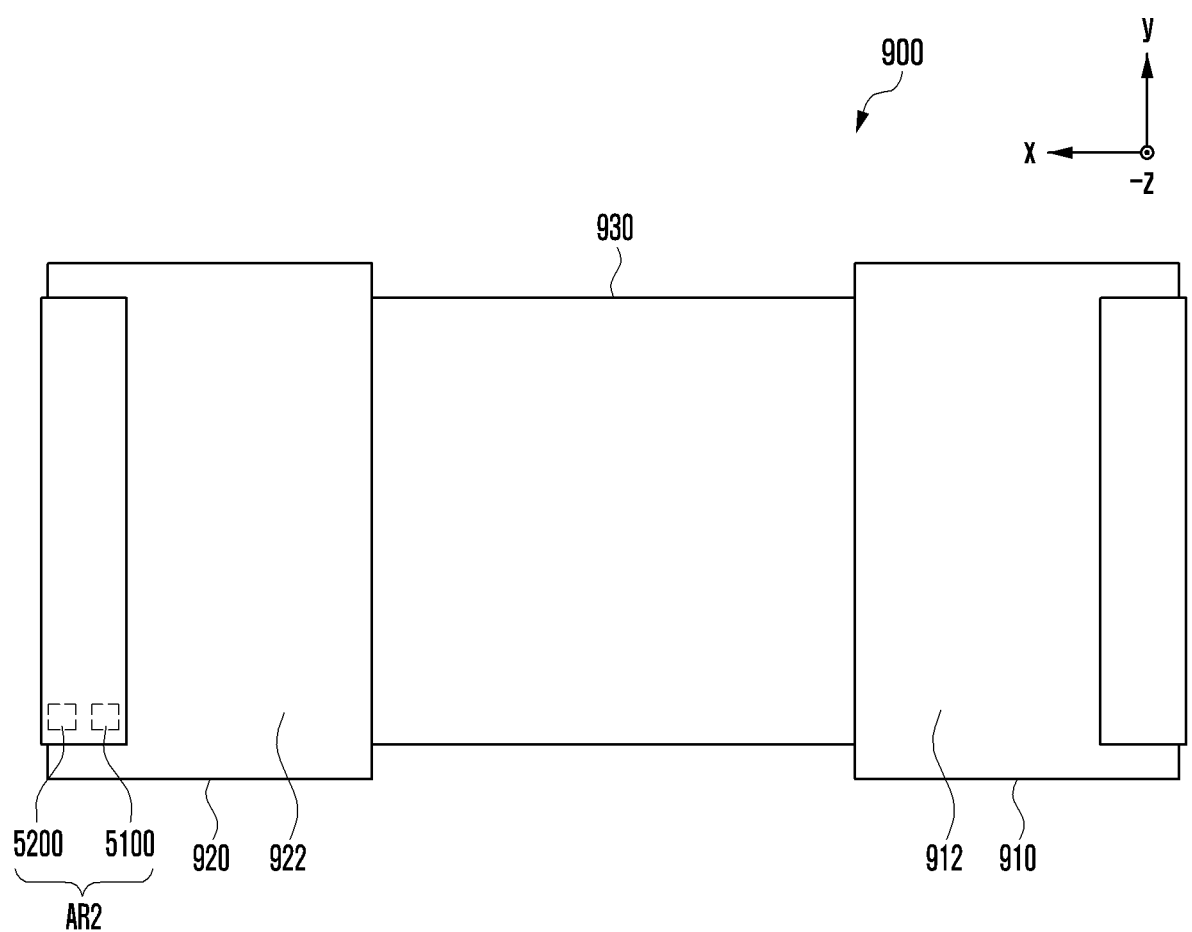

FIGS. 26A and 26B are front and rear views of a bi-directional rollable electronic device 900 in the unrolled state according to various embodiments of the disclosure.

Figure 27A:
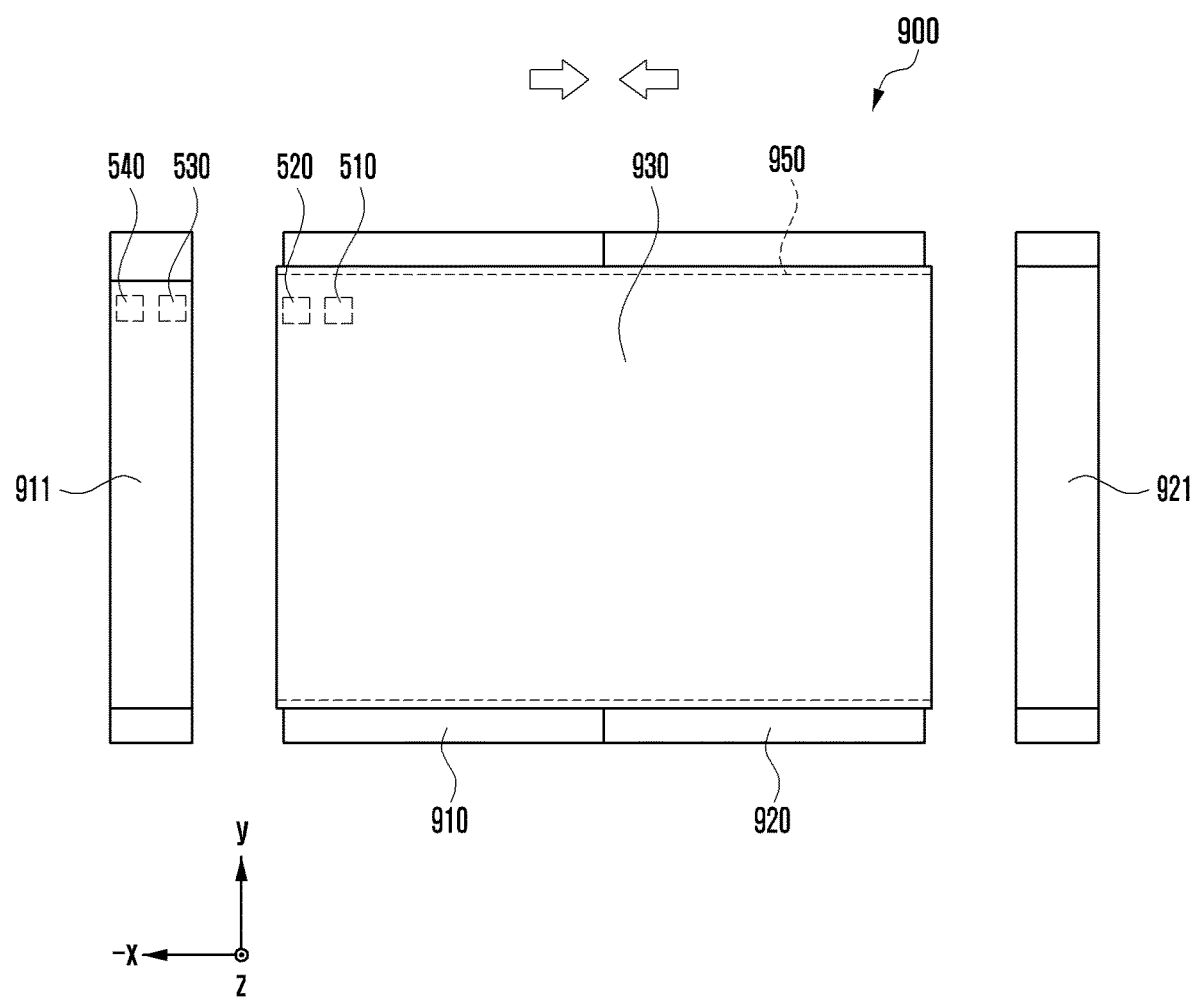
FIGS. 27A and 27B are front and rear views of the bi-directional rollable electronic device viewed from the front and rear sides when in a folded state according to various embodiments of the disclosure.
Figure 27B:
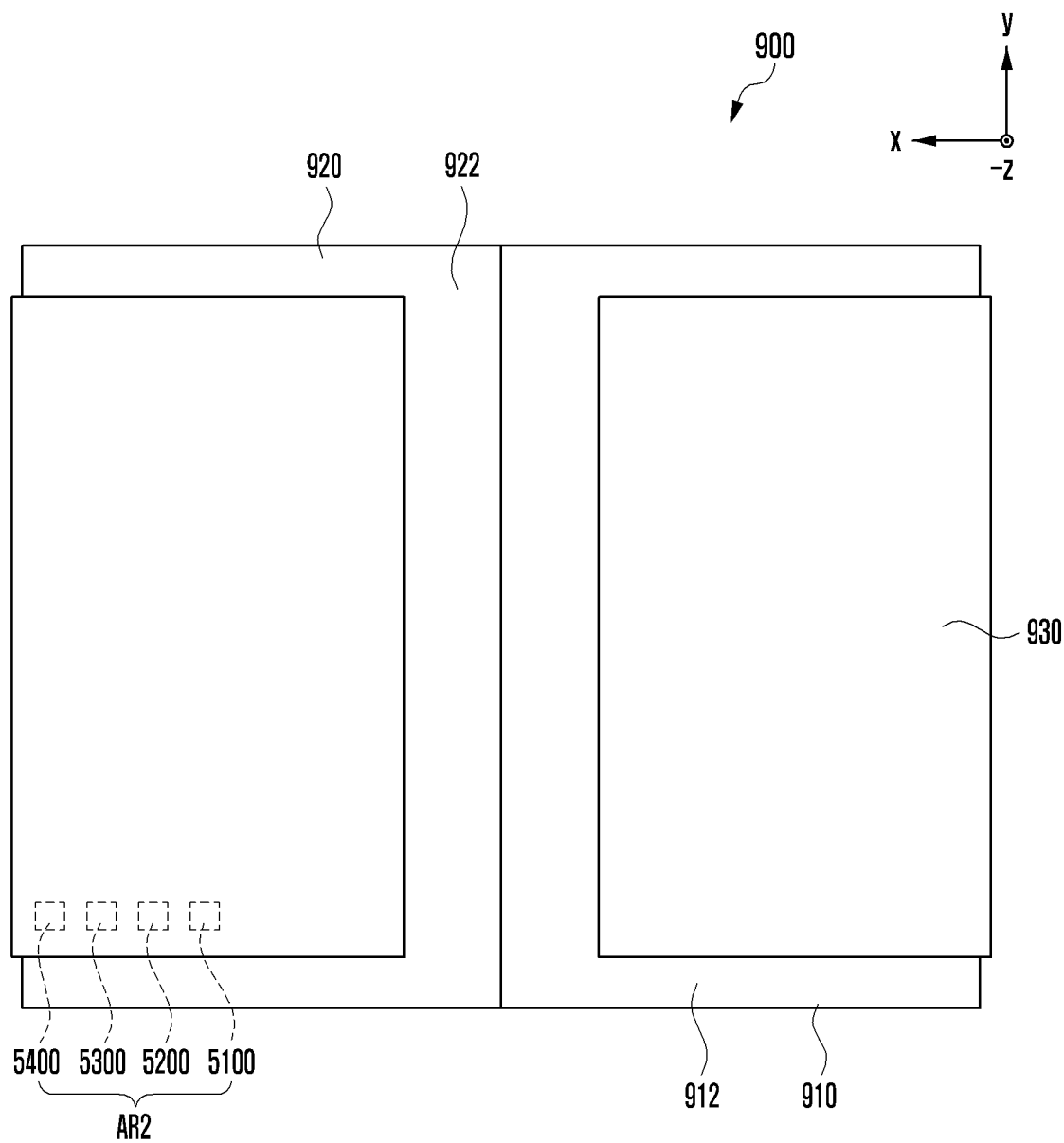

FIGS. 27A and 27B are front and rear views of the bi-directional rollable electronic device 900 in the folded state according to various embodiments of the disclosure.

The bi-directional rollable electronic device 900 of FIGS. 26A,26B, 27A, and 27B may be at least partially similar to the electronic device 101 of FIG. 1 or may include other embodiments of the electronic device.

In describing the electronic device 900 of FIGS. 26A, 26B, 27A, and 27B, the same reference numerals are assigned to components that are substantially the same as those of the electronic device 900 of FIGS. 25A,25B, 26A, and 26B, and a detailed description thereof may be omitted.

Referring to FIGS. 26A and 27B, the electronic device 900 may include a flexible display 930 disposed to surround a portion of the outer surface of the first housing 910 and a portion of the outer surface of the second housing 920. When in the unrolled state and/or the rolled state, the flexible display 930 may be disposed to be visible from the outside while being at least partially supported by the first housing 910 and/or the second housing 920.

According to various embodiments, the electronic device 900 may include a first array antenna AR1 and/or a second array antenna AR2. When the flexible display 930 is viewed from above, the first array antenna AR1 may include a first mesh pattern portion 510 and/or a second mesh pattern portion 520 disposed in an area overlapping the flat portion 930a of the dielectric sheet 950, and may include a third mesh pattern portion 530 and/or a fourth mesh pattern portion 540 disposed in an area overlapping the first bendable portion 930b. For example, in the unrolled state, the first mesh pattern portion 510, the second mesh pattern portion 520, the third mesh pattern portion 530, and/or the fourth mesh pattern portion 540 may form a beam pattern in a direction in which the flexible display 930 is oriented (e.g., the z-axis direction), as the first array antenna AR1. In the rolled state, the first mesh pattern portion 510 and/or the second mesh pattern portion 520 may form a beam pattern in a direction (e.g., the z-axis direction) in which the flat portion 930a of the flexible display 930 is oriented, and the third mesh pattern portion 530 and the fourth mesh pattern portion 540 may form a beam pattern in a direction (e.g., the −x-axis direction) in which the first side surface 911 of the first housing 910 is oriented. By applying a corrected phase value to the first mesh pattern portion 510 and/or the second mesh pattern portion 520 by using the phase value correction principle presented in FIG. 10, the first array antenna AR1 may concentrate a beam pattern in the x-axis direction. The first array antenna AR1 may be configured such that a beam pattern is concentrated in the z-axis direction by applying a corrected phase value to the third mesh pattern portion 530 and/or the fourth mesh pattern portion 540.

The second array antenna AR2 may include a fifth mesh pattern portion 5100, a sixth mesh pattern portion 5200, a seventh mesh pattern portion 5300, and/or an eighth mesh pattern portion 5400 disposed in an area corresponding to the second bendable portion 930c of the dielectric sheet 950. In the unrolled state, the fifth mesh pattern portion 5100 and/or the sixth mesh pattern portion 5200 may form a beam pattern in a direction (e.g., the −z-axis direction) in which the rear surface of the second housing 920 is oriented, and the seventh pattern portion 5300 and/or the eighth mesh pattern portion 5400 may form a beam pattern in a direction (e.g., the x-axis direction) in which the second side surface 921 of the second housing 920 is oriented. The second array antenna AR2 may be configured such that a beam pattern is concentrated in the x-axis direction by applying a corrected phase value to the fifth mesh pattern portion 5100 and the sixth mesh pattern portion 5200. The second array antenna AR2 may be configured such that a beam pattern is concentrated in the −z-axis direction by applying a corrected phase value to the seventh mesh pattern portion 5300 and the eighth mesh pattern portion 5400. In the rolled state, the fifth mesh pattern portion 5100, the sixth mesh pattern portion 5200, the seventh mesh pattern portion 5300, and/or the eighth mesh pattern portion 5400 may form a beam pattern in a direction (e.g., the −z-axis direction) in which the rear surface of the second housing 920 is oriented, as the second array antenna AR2.

The mesh pattern portions included in an array antennas according to various embodiments of the disclosure may be at least partially replaced with the dual pattern portions of FIG. 12, and a beam pattern may be formed in a predetermined direction by applying a corrected phase value by using the phase value correction principle of FIG. 10. Since the aforementioned mesh pattern portions (e.g., the first mesh pattern portion 510, the second mesh pattern portion 520, the third mesh pattern portion 530, or the fourth mesh pattern portion 540) may)) include two feed lines extending along imaginary lines that pass through the center and intersect each other, the array antenna may operate as a dual polarization array antenna.

According to various embodiments of the disclosure, an array antenna may form a beam pattern in a predetermined direction by applying different corrected phase values to one or more mesh pattern portions among the plurality of mesh pattern portions depending on the state of the electronic device (e.g., a folded angle, an opened or closed degree, and/or a rolled degree).

An array antenna according to various embodiments of the disclosure may detect the degree unfolded from the folded stage of a foldable electronic device via a folding detector (a folded angle detection mechanism (e.g., a gyro sensor)), and may change phase values to be applied to one or more mesh pattern portions among the plurality of mesh pattern portions. For example, a processor (e.g., the processor 120 of FIG. 1) of an electronic device receives folded angle information between a folded state and an unfolded state of the electronic device via a folding detector, and may control, based on the folded angle information, a wireless communication circuit (e.g., the wireless communication module 192 of FIG. 1) to change the direction of a beam pattern of an array antenna via a phase conversion mechanism (e.g., a phase converter). The processor (e.g., processor 120 of FIG. 1) may change the direction of a beam pattern to correspond to a folded angle based on a lookup table including phase values corresponding to folded angles stored in a memory (e.g., the memory 130 of FIG. 1) of an electronic device. According to an embodiment, the folded angles may include, for example, at least one of 0 degrees, 30 degrees, 60 degrees, 90 degrees, 120 degrees, 150 degrees, 180 degrees, or 210 degrees. In some embodiments, the folded angles may include predetermined angle ranges.

In an array antenna according to various embodiments of the disclosure, a plurality of mesh pattern portions may be arranged to enable not only a 1×n array, but also a 2×2 array, a 4×4 array, and/or a 6×4 array.

According to various embodiments, an electronic device (e.g., the electronic device 300 of FIG. 3A) may include a first housing (e.g., the first housing 310 of FIG. 3A), a second housing (e.g., the second housing 320 of FIG. 3A) foldably connected to the first housing via a hinge module (e.g., the hinge module 360 of FIG. 3A), a flexible display (e.g., the flexible display 400 of FIG. 3A) disposed to be supported by the first housing and the second housing, wherein the flexible display includes a display panel (e.g., the display panel 430 of FIG. 4) that includes a first portion (e.g., the first portion h1 in FIG. 3A) corresponding to the first housing, a second portion (e.g., the second portion h2 in FIG. 3A) corresponding to the second housing, and a third portion (e.g., the third portion h3 in FIG. 3A) extending from the first portion to the second portion and corresponding to the hinge module, and is disposed to be at least partially visible in a folded state, an array antenna (e.g., the array antenna AR of FIG. 6) provided on a dielectric sheet (e.g., the dielectric sheet 500 of FIG. 4) disposed on the display panel, wherein the array antenna includes a first mesh pattern portion (e.g., the first mesh pattern portion 510 in FIG. 6) disposed at a position corresponding to the first portion, a second mesh pattern portion (e.g., the second mesh pattern portion 520 in FIG. 6) disposed at a position corresponding to the third portion, and at least one third mesh pattern portion (e.g., the third mesh pattern portion 530) provided at a position spaced apart by a first separation distance (the first separation distance d0) from the first mesh pattern portion disposed at the position corresponding to the first portion, a wireless communication circuit (e.g., the third RFIC 226 of FIG. 2) configured to transmit and/or receive a wireless signal via the array antenna, and a phase conversion mechanism disposed in an electrical path between the wireless communication circuit and the array antenna.

Phase values applied to the array antenna via the phase conversion mechanism may be set to be different from each other depending on the folded and unfolded states of the electronic device.

The wireless communication circuit may be configured to cause, via the phase conversion mechanism, to cause the array antenna to operate such that, depending on the folded state and the unfolded state, a direction of a beam pattern formed by the first mesh pattern portion and the third mesh pattern portion and a direction of a beam pattern formed by the second mesh pattern portion are substantially equal to each other.

In the folded state, the beam patterns may be formed in a first direction in which the first mesh pattern and the third mesh pattern portion are oriented, in a second direction in which the second mesh pattern portion is oriented, or in a predetermined direction between the first direction and the second direction.

The first mesh pattern portion, the second mesh pattern portion, and the third mesh pattern portion may be arranged to have an equal center-to-center distance.

The first separation distance may be provided from the center between the first mesh pattern portion and the third mesh pattern portion to the center of the second mesh pattern portion.

The first mesh pattern portion may be disposed such that a second separation distance is provided between the center of the first mesh pattern portion and the center of the third mesh pattern portion, and the second separation distance may be smaller than the first separation distance.

The second separation distance may have an electrical length of $\lambda/4$.

The electronic device may further include a fourth mesh pattern portion disposed at a position corresponding to the third portion, and a third separation distance between the center of the fourth mesh pattern portion and the center of the second mesh pattern portion may be equal to the first separation distance.

The beam pattern may be formed in a second direction in which the second mesh pattern portion is oriented in the folded state, formed in a third direction in which the fourth mesh pattern portion is formed, or formed in a predetermined direction between the second direction and the third direction.

The electronic device may further include at least one processor, wherein the processor may be configured to receive folded angle information between the folded state and the unfolded state via a folding detector and to control the wireless communication circuit to change the direction of the beam pattern via the phase conversion mechanism based on the folded angle information.

The processor may be configured to control the direction of the beam pattern based on a phase value stored in a memory and corresponding to the received folded angle information.

The folded angle may include at least one of 0 degrees, 30 degrees, 60 degrees, 90 degrees, 120 degrees, 150 degrees, 180 degrees, or 210 degrees.

Each of the first mesh pattern portion and the third mesh pattern portion may be provided with, via a power divider, ½ of the power applied to the second mesh pattern portion.

The first mesh pattern portion, the second mesh pattern portion, and the third mesh pattern portion may be configured in a mesh structure with a plurality of conductive lines disposed on the dielectric sheet.

The first mesh pattern portion, the second mesh pattern portion, and the third mesh pattern portion may be arranged in a direction parallel to an edge of the flexible display in the dielectric sheet.

According to various embodiments of the disclosure, an electronic device may include at least one housing, a flexible display disposed to be at least partially visible from the outside through the at least one housing, wherein the flexible display includes a display panel including a first portion, and a second portion extending from the first portion and configured to be transformable when the at least one housing is changed from a first state to a second state, and the display panel is disposed such that the first portion and the second portion are visible from the outside in the first state, a dielectric sheet disposed on the display panel, an antenna array provided on the dielectric sheet, wherein the antenna array includes a first mesh pattern portion disposed at a position corresponding to the first portion, a second mesh pattern portion disposed at a position corresponding to the second portion, and at least one third mesh pattern portion provided at a position spaced apart by a first separation distance from the first mesh pattern portion disposed at the position corresponding to the first portion, a wireless communication circuit configured to transmit and/or receive a wireless signal via the array antenna, and a phase conversion mechanism disposed in an electrical path between the wireless communication circuit and the array antenna.

The wireless communication circuit may be configured to cause, via the phase conversion mechanism, the array antenna to operate such that, depending on the folded state and the unfolded state, a direction of a beam pattern formed by the first mesh pattern portion and the third mesh pattern portion and a direction of a beam pattern formed by the second mesh pattern portion are substantially equal to each other.

A predetermined first separation distance may be provided from the center between the first mesh pattern portion and the third mesh pattern portion to the center of the second mesh pattern portion, the first mesh pattern portion may be disposed such that a second separation distance is provided between the center of the first mesh pattern portion and the center of the third mesh pattern portion, and the second separation distance may be smaller than the first separation distance.

The at least one housing may include a first housing and a second housing disposed to be at least partially slidable from the first housing, in the first state (slide-out state), the flexible display may be disposed such that the second portion is visible side by side with the first portion, and in the second state (slide-in state), the second portion may be slid into the inner space of the first housing or the second housing to be invisible.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first housing;
   a second housing foldably connected to the first housing via a first hinge module;
   a flexible display disposed to be supported by the first housing and the second housing, wherein the flexible display includes:
   a first portion corresponding to the first housing,
   a second portion corresponding to the second housing,
   a third portion extending from the first portion to the second portion and corresponding to the first hinge module, and
   a display panel disposed to be at least partially visible in a folded state;
   an array antenna provided on a dielectric sheet disposed on the display panel, wherein the array antenna includes:
   a first mesh pattern portion disposed at a position corresponding to the first portion,
   a second mesh pattern portion disposed at a position corresponding to the third portion, and
   at least one third mesh pattern portion provided at a position spaced apart by a first separation distance from the first mesh pattern portion;
   a wireless communication circuit configured to transmit and/or receive a wireless signal via the array antenna; and
   a phase conversion mechanism disposed in an electrical path between the wireless communication circuit and the array antenna,
   wherein the dielectric sheet disposed on the display panel is disposed between a window layer and the display panel, and
   wherein a beam pattern formed by the array antenna is radiated to an outside of the electronic device through the window layer, opposite to the display panel.

2. The electronic device of claim 1, wherein phase values applied to the array antenna via the phase conversion mechanism may be set to be different from each other depending on the folded and unfolded states of the electronic device.

3. The electronic device of claim 1, wherein the wireless communication circuit is configured to cause, via the phase conversion mechanism, the array antenna to operate such that, depending on the folded state and an unfolded state, a direction of a beam pattern formed by the first mesh pattern portion and the third mesh pattern portion and a direction of a beam pattern formed by the second mesh pattern portion are substantially equal to each other.

4. The electronic device of claim 3, wherein, in the folded state, the beam patterns are formed in a first direction in which the first portion is oriented, in a second direction in which the third portion is oriented, or in a predetermined direction between the first direction and the second direction.

5. The electronic device of claim 1, wherein the first mesh pattern portion, the second mesh pattern portion, and the third mesh pattern portion are arranged to have an equal center-to-center distance.

6. The electronic device of claim 1, wherein a predetermined first separation distance is provided from a center between the first mesh pattern portion and the third mesh pattern portion to the center of the second mesh pattern portion.

7. The electronic device of claim 6,
wherein the first mesh pattern portion is disposed such that a second separation distance is provided between the center of the first mesh pattern portion and the center of the third mesh pattern portion, and
wherein the second separation distance is smaller than the first separation distance.

8. The electronic device of claim 7, wherein the second separation distance has an electrical length of $\lambda/4$, wherein $\lambda$ is a wavelength of the wireless signal.

9. The electronic device of claim 6, further comprising:
a fourth mesh pattern portion disposed at a position corresponding to the third portion,
wherein a third separation distance between the center of the fourth mesh pattern portion and the center of the second mesh pattern portion is equal to the first separation distance.

10. The electronic device of claim 9, wherein a beam pattern is formed in a second direction in which the second mesh pattern portion is oriented in the folded state, in a third direction in which the fourth mesh pattern portion is formed, or in a predetermined direction between the second direction and the third direction.

11. The electronic device of claim 1, further comprising:
at least one processor,
wherein the processor is configured to:
receive folded angle information between the folded state and an unfolded state via a folding detector, and
control the wireless communication circuit to change a direction of a beam pattern via the phase conversion mechanism based on the folded angle information.

12. The electronic device of claim 11, wherein the processor is configured to control the direction of the beam pattern based on a phase value stored in a memory and corresponding to the received folded angle information.

13. The electronic device of claim 1, wherein each of the first mesh pattern portion and the third mesh pattern portion is provided with ½ of the power applied to the second mesh pattern portion.

14. The electronic device of claim 1, wherein the first mesh pattern portion, the second mesh pattern portion, and the third mesh pattern portion are configured in a mesh structure with a plurality of conductive lines disposed on the dielectric sheet.

15. The electronic device of claim 1, wherein the first mesh pattern portion, the second mesh pattern portion, and the third mesh pattern portion are arranged in a direction parallel to an edge of the flexible display in the dielectric sheet.

16. The electronic device of claim 11, wherein the folded angle includes at least one of 0 degrees, 30 degrees, 60 degrees, 90 degrees, 120 degrees, 150 degrees, 180 degrees, or 210 degrees.

17. The electronic device of claim 1, wherein the array antenna is disposed at a position that at least partially overlaps a display area of the display panel when the flexible display is viewed from above.

* * * * *